United States Patent
Shiner et al.

(10) Patent No.: US 10,898,826 B2
(45) Date of Patent: Jan. 26, 2021

(54) COMPACT CONTAINERIZED SYSTEM AND METHOD FOR SPRAY EVAPORATION OF WATER

(71) Applicant: Energy Water Solutions, LLC, Spring, TX (US)

(72) Inventors: Stephen M. Shiner, Spring, TX (US); Chuck Hanebuth, Spring, TX (US)

(73) Assignee: Energy Water Solutions, LLC, The Woodlands, TX (US)

( * ) Notice: Subject to any disclaimer, the term of this patent is extended or adjusted under 35 U.S.C. 154(b) by 0 days.

(21) Appl. No.: 16/395,376

(22) Filed: Apr. 26, 2019

(65) Prior Publication Data

US 2019/0299114 A1    Oct. 3, 2019

Related U.S. Application Data

(63) Continuation-in-part of application No. 15/177,519, filed on Jun. 9, 2016, now abandoned.

(Continued)

(51) Int. Cl.
*B01D 1/14*    (2006.01)
*C02F 1/02*    (2006.01)
(Continued)

(52) U.S. Cl.
CPC .............. *B01D 1/14* (2013.01); *B01D 1/0082* (2013.01); *B01D 1/20* (2013.01); *B01D 1/305* (2013.01);
(Continued)

(58) Field of Classification Search
CPC .......... B01D 1/0082; B01D 1/14; B01D 1/20; B01D 1/305; B01D 19/04; B05B 1/26;
(Continued)

(56) References Cited

U.S. PATENT DOCUMENTS 3,181,593 A * 5/1965 Lindley .................. B01D 1/305
159/28.1
3,245,883 A * 4/1966 Loebel .................... C02F 1/045
203/7

(Continued)

FOREIGN PATENT DOCUMENTS

FR    2450785    10/1980
WO    WO-2014/006741 A1    1/2014

OTHER PUBLICATIONS

Benjamin Franklin Plumbing. (2015). How to Drain Pipes for the Winter: Avoid Frozen and Burst Pipes! (Year: 2015).*

(Continued)

*Primary Examiner* — Jonathan Miller
*Assistant Examiner* — Gabriel E Gitman
(74) *Attorney, Agent, or Firm* — Foley & Lardner LLP

(57) ABSTRACT

A wastewater evaporation system for spray evaporating water comprising: a wastewater feed inlet; a pump, wherein the wastewater feed inlet is fluidly connected to the pump and wherein the pump is fluidly connected to a manifold; a drip orifice, wherein the manifold is fluidly connected to the drip orifice; a container, wherein an upper portion of the container is enclosed with a demister element; a packing and/or tray system disposed within the container, wherein the drip orifice discharges water droplets onto the packing and/or tray system; a discharge outlet, wherein a bottom of the container is fluidly connected to the discharge outlet; and an air system, wherein the air system discharges air flow counter to the water droplets from the drip orifice. A method of spray evaporating water while limiting emission of particles regulated as pollutants is also disclosed.

**

US 10,898,826 B2

Page 2

Related U.S. Application Data

(60) Provisional application No. 62/173,509, filed on Jun. 10, 2015.

(51) Int. Cl.
```
C02F 1/12      (2006.01)
B01D 1/20      (2006.01)
B01D 1/30      (2006.01)
B01D 19/04     (2006.01)
B05B 1/26      (2006.01)
C02F 1/00      (2006.01)
C02F 1/04      (2006.01)
C02F 1/50      (2006.01)
C02F 1/66      (2006.01)
C02F 5/08      (2006.01)
B01D 1/00      (2006.01)
```

(52) U.S. Cl.
CPC .......... B01D 19/04 (2013.01); B05B 1/26 (2013.01); C02F 1/008 (2013.01); C02F 1/042 (2013.01); C02F 1/048 (2013.01); C02F 1/12 (2013.01); C02F 1/50 (2013.01); C02F 1/66 (2013.01); C02F 5/08 (2013.01); C02F 2201/005 (2013.01); C02F 2209/006 (2013.01); C02F 2209/008 (2013.01); C02F 2209/02 (2013.01); C02F 2209/03 (2013.01); C02F 2209/05 (2013.01); C02F 2209/06 (2013.01); C02F 2209/38 (2013.01); C02F 2209/40 (2013.01); C02F 2303/04 (2013.01); C02F 2303/12 (2013.01); C02F 2303/22 (2013.01); C02F 2303/26 (2013.01)

(58) Field of Classification Search
CPC .......... C02F 1/008; C02F 1/042; C02F 1/048; C02F 1/12; C02F 1/50; C02F 1/66; C02F 5/08; C02F 2201/005; C02F 2209/006; C02F 2209/008; C02F 2209/02; C02F 2209/03; C02F 2209/05; C02F 2209/06; C02F 2209/38; C02F 2209/40; C02F 2303/04; C02F 2303/12; C02F 2303/22; C02F 2303/26
See application file for complete search history.

(56) References Cited

U.S. PATENT DOCUMENTS

| | | | |
|---|---|---|---|
| 3,488,261 A | 1/1970 | Loebel | |
| 3,637,195 A * | 1/1972 | Blazer | F01K 9/003 261/30 |
| 4,064,047 A | 12/1977 | Bernreiter et al. | |
| 4,217,176 A * | 8/1980 | Antony | B01D 1/2856 202/173 |
| 4,310,382 A * | 1/1982 | Gress | B01D 1/14 159/16.1 |
| 4,738,695 A * | 4/1988 | Carr | B01D 53/26 261/113 |
| 4,769,186 A * | 9/1988 | Raybon | B01J 19/32 261/109 |
| 4,950,430 A * | 8/1990 | Chen | B01J 19/32 261/112.2 |
| 5,102,503 A * | 4/1992 | Silinski | C02F 1/048 202/83 |
| 5,192,517 A * | 3/1993 | Spink | B01D 53/34 423/243.08 |
| 5,628,901 A * | 5/1997 | Lawrence | B01D 1/22 159/13.1 |
| 6,722,588 B1 | 4/2004 | Elkas | |
| 6,821,095 B2 * | 11/2004 | Dooley | F04D 25/08 415/126 |
| 8,460,509 B2 | 6/2013 | Lakatos et al. | |
| 2005/0005772 A1 * | 1/2005 | Spani | B01D 1/16 96/200 |
| 2005/0109697 A1 | 5/2005 | Olivier | |
| 2006/0197238 A1 * | 9/2006 | Forstmanis | B01D 1/305 261/78.2 |
| 2007/0137482 A1 * | 6/2007 | Xu | B01D 3/324 95/198 |
| 2007/0235146 A1 * | 10/2007 | Haslem | B01D 1/16 159/47.3 |
| 2008/0110417 A1 * | 5/2008 | Smith | B01D 1/0058 122/379 |
| 2008/0277263 A1 * | 11/2008 | Swenholt | B01D 1/28 203/11 |
| 2009/0127867 A1 * | 5/2009 | Yuri | F02D 29/06 290/40 R |
| 2009/0294074 A1 | 12/2009 | Forstmanis | |
| 2009/0320689 A1 * | 12/2009 | Krell | F28C 1/16 96/299 |
| 2010/0176042 A1 * | 7/2010 | Duesel, Jr. | B01D 1/14 210/179 |
| 2010/0230831 A1 * | 9/2010 | Rasmussen | B01D 1/14 261/23.1 |
| 2010/0288619 A1 | 11/2010 | Yabe et al. | |
| 2011/0023485 A1 | 2/2011 | Schubert | |
| 2011/0100924 A1 | 5/2011 | Duesel et al. | |
| 2011/0139378 A1 * | 6/2011 | Lakatos | C02F 9/00 159/4.01 |
| 2011/0140457 A1 | 6/2011 | Lakatos et al. | |
| 2011/0168808 A1 * | 7/2011 | Mitch | B05B 1/044 239/163 |
| 2011/0226605 A1 * | 9/2011 | Thiers | B01D 3/007 203/10 |
| 2011/0265474 A1 | 11/2011 | Schubert | |
| 2011/0266132 A1 | 11/2011 | Takezaki | |
| 2011/0309162 A1 * | 12/2011 | Rock | B01D 1/14 239/289 |
| 2012/0080363 A1 * | 4/2012 | Evanovich | C10G 33/00 210/86 |
| 2012/0160660 A1 * | 6/2012 | Karlstrom | B01D 1/0058 203/3 |
| 2012/0247942 A1 * | 10/2012 | Curlett | B01D 53/92 203/10 |
| 2013/0037223 A1 * | 2/2013 | Duesel, Jr. | B01D 1/14 159/4.01 |
| 2014/0014584 A1 | 1/2014 | Cone et al. | |
| 2014/0166467 A1 * | 6/2014 | Clegg | B01D 1/14 203/10 |
| 2014/0262055 A1 | 9/2014 | Noel et al. | |
| 2016/0130157 A1 | 5/2016 | Govindan et al. | |

OTHER PUBLICATIONS

Caloris. (2014). Caloris Cubix Evaporators. (Year: 2014).*
Romtec. (2013). Pump Station Heat Tracing with Romtec Utilities. (Year: 2013).*
Simons, Stefaan J.R.. (2007). Concepts of Chemical Engineering 4 Chemists—5.5.1 Trays and Packing. Royal Society of Chemistry. (Year: 2007).*
Genemco. (2006). Evaporator pumps. Accessed Apr. 8, 2020 at https://web.archive.org/web/20061015170500/http://www.genemco.com/catalog/evaporatorpumps.html (Year: 2006).*
Centrifugal Pumps 170-500 gpm. (2009) PumpBiz.com. Accessed Apr. 3, 2019 at https://pumpbiz.com/manufacturer/amt/centrifugal-pumps-170-500-gpm (Year: 2009).*
Tinto, J., & Solomon, R. (Oct. 2011). Water Recovery via Thermal Evaporative Processes for High Saline Frac Water Flowback. In International Water Conference paper IWC-10-66, San Antonio. (Year: 2011).*
Bete. (2005). TF Nozzles. Accessed May 2, 2018 at http://www.bete.com/products/tf.html (Year: 2005).*
BETE. (2005) TF Nozzles. Accessed May 2, 2018 at https://www.bete.com/products/tf.html (Year: 2005).
Centrifugal Pumps 170-500 gpm. PumpBiz.com. Accessed Apr. 3, 2019 at https://pumpbiz.com/manufacturer/amt/centrifugal-pumps -170-500-gmp (Year: 2009).

(56) References Cited

OTHER PUBLICATIONS

Final Office Action on U.S. Appl. No. 15/177,519 dated Nov. 9, 2018.
FR2450785A1_ENG (Espacenet machine translation of Hebert, accessed Nov. 5, 2018).
Non-Final Office Action on U.S. Appl. No. 15/177,519 dated Apr. 16, 2019.
PCT Sep. 9, 2016 International Search Report and Written Opinion mailed in International Patent Application No. PCT/US16/36804 filed Jun. 10, 2016.
SNP. (2013) Fog nozzles and misting nozzles. Accessed on May 2, 2018 at http://www.spray-nozzle.co.uk/spray-nozzles/fog-misting-nozzles (Year: 2013).
Tinto et al. (2012). Water Recovery via Thermal Evaporative Processes for High Saline Frac Water Flowback. Lenntech. Accessed May 7, 2018 at https://www.lenntech.com/Data-sheets/GE-Osmonics-IWC-10-66-mobile-evaporator-L.pdf (Year: 2012).
Tinto, Joseph, et al. (Oct. 2011). Water recovery via thermal evaporative processes for high saline frac water flowback. In International Water Conference paper IWC-10-66, San Antonio (Year: 2011).
U.S. Office Action on U.S. Appl. No. 15/177,519 dated May 14, 2018.
Erbil, H.Y. (2012), Evaporation of pure liquid sessile and spherical drops: A review. Advances in colloid and interface science, 170(1-2), 67-86. (Year: 2012).
Final Office Action on U.S. Appl. No. 15/177,519 dated Sep. 9, 2019.
Foreign Search Report on PCT PCT/US2020/023165 dated Jul. 28, 2020.

\* cited by examiner

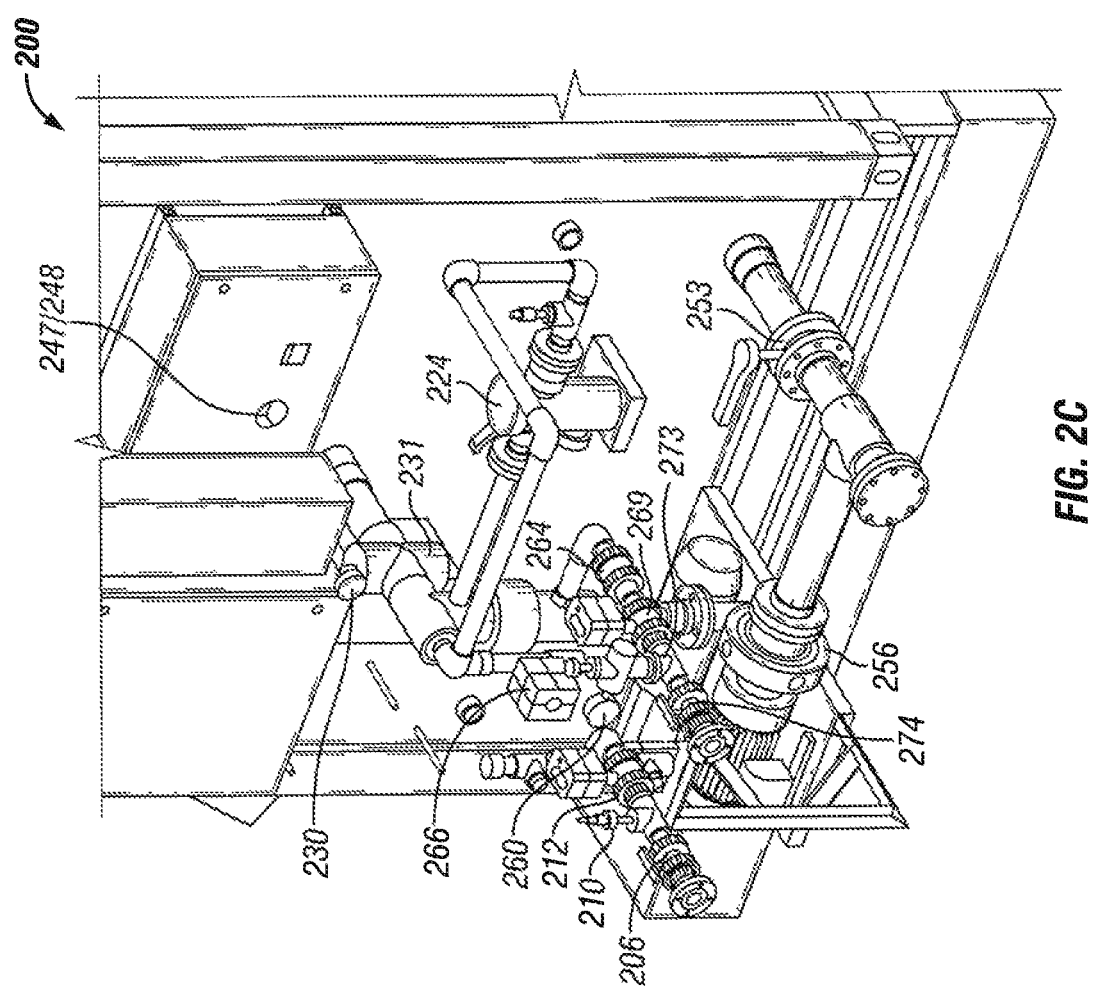

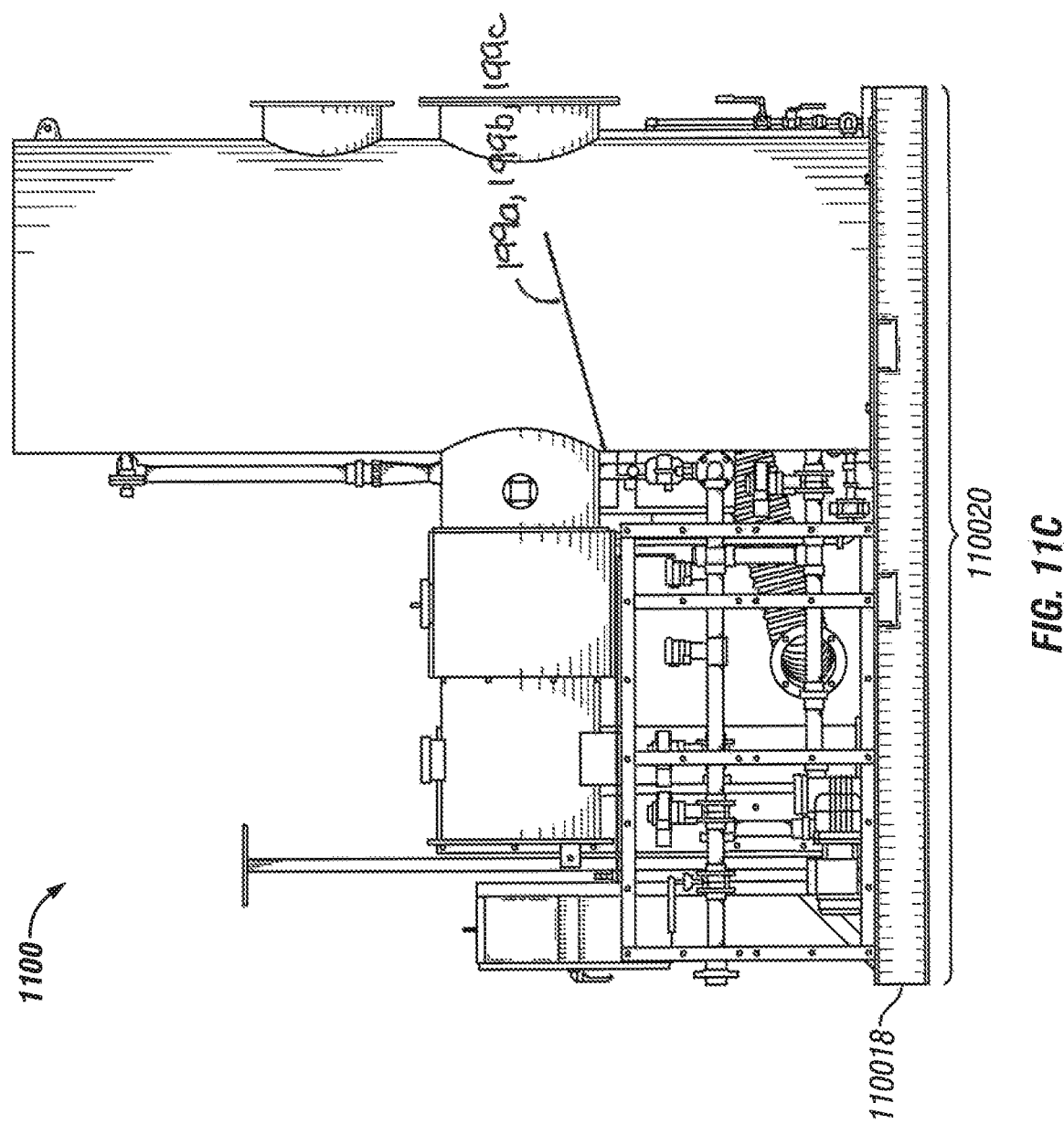

COMPACT CONTAINERIZED SYSTEM AND METHOD FOR SPRAY EVAPORATION OF WATER

PRIOR RELATED APPLICATIONS

This application is a continuation-in-part of U.S. Non-provisional patent application Ser. No. 15/177,519, filed on Jun. 9, 2016, which claims benefit of U.S. Provisional Patent Application Ser. No. 62/173,509, filed on Jun. 10, 2015, entitled "Containerized System and Method for Spray Evaporation of Water."

FEDERALLY SPONSORED RESEARCH STATEMENT

Not Applicable (N/A)

REFERENCE TO MICROFICHE APPENDIX

N/A

FIELD OF INVENTION

The invention relates generally to spray evaporation of water and, in particular, to a containerized system and method for spray evaporation of water by controlling pump pressure and/or water droplet size sprayed within a closed container by optimizing air and water volumetric flow and droplet size sprayed within the container.

BACKGROUND OF THE INVENTION

Current methods for evaporation of undesired water (e.g., landfill leachate, produced water, mining wastewater, and wastewater) typically involve large surface area ponds, floating or land-based atomizing sprayers which spray back into a pond, or multi-stage flash evaporation (MSF). These methods have numerous problems. The large surface area solar-evaporation or spray ponds are slow to remove water, require large capital investments, and pose a risk of leakage. The floating or land-based sprayers improve the efficiency of the ponds but permit water droplets and aerosolized dissolved solids (e.g., salts) to be carried by the wind to contaminate other areas. MSF is a complex energy intensive process with high resultant capital and operating costs as well as problematic air emissions. The alternative to not evaporating the water on or near the point of generation is removal via vacuum truck. The vacuum trucks remove water from storage tanks or ponds but require transportation for disposal or treatment of the undesired water elsewhere. This can be quite expensive.

Therefore, there is a need for a compact containerized system and method for spray evaporation of undesired water to speed removal of the water, to contain the water droplets during evaporation and to reduce the cost of water transportation and disposal.

SUMMARY OF THE INVENTION

The invention relates generally to spray evaporation of water and, in particular, to a compact containerized system and method for efficient spray evaporation of water by controlling pump pressure and/or water droplet size sprayed within a closed container and by optimizing water volumetric flow and droplet size sprayed within the container The invention permits evaporation of large volumes of undesired water within a containerized, mobile system, which eliminates requirements for large evaporation ponds or vacuum truck disposal. More specifically, the invention maximizes the evaporation rate of undesired water by reducing water droplet size sprayed within a closed container and by optimizing water droplet size and volume sprayed within the container. The evaporated water exits the container as water vapor through a mist arresting system, leaving behind un-evaporated water droplets and dissolved minerals to collect in the sump (bottom) of the container. The condensed water is recirculated through the system and, once sufficiently concentrated, the concentrated water is diverted to external waste disposal storage.

A system for spray evaporating water comprises a wastewater inlet; a pump, where an outlet of the wastewater inlet is fluidly connected to an inlet of the pump and wherein an outlet of the pump is fluidly connected to an inlet of a manifold; a spray nozzle, wherein an outlet of the manifold is fluidly connected to an inlet of the spray nozzle; a container, wherein upper and side portions of the container are enclosed with a demister element and wherein the outlet of the spray nozzle discharges into the container; and a discharge outlet, wherein a bottom of the container is fluidly connected to the discharge outlet.

In an embodiment, the pump produces a water flow rate from about 50 gallons per minute (GPM) to about 800 GPM (and any range or value there between). In an embodiment, the pump produces a water flow rate from about 15 GPM to about 100 GPM.

A system for spray evaporating water comprising a wastewater inlet comprises wastewater; a first valve, wherein an outlet of the wastewater inlet is fluidly connected to an inlet of the first valve; a first pump, wherein an outlet of the first valve is fluidly connected to an inlet of the first pump; a container, wherein upper and side portions of the container are enclosed with a demister element and wherein the demister element retains un-evaporated water inside the container; a spray nozzle, wherein an outlet of the first pump is fluidly connected to a first inlet of a manifold, wherein an outlet of the manifold is fluidly connected to an inlet of the spray nozzle, and wherein an outlet of the spray nozzle discharges into the container; a second pump, wherein an outlet of the sump is fluidly connected to an inlet of the second pump; a second valve; wherein an outlet of the second pump is fluidly connected to a second inlet of a manifold and wherein a first outlet of the manifold is fluidly connected to the inlet of the spray nozzle; and a third valve, wherein a second outlet of the manifold is fluidly connected to an inlet of the third valve and wherein an outlet of the third valve is fluidly connected to a discharge outlet.

In an embodiment, the system further comprises an air blower, wherein air flow from the air blower disperses water droplets from the spray nozzle. In an embodiment, the air blower is disposed through a wall of the container such that air flow from the air blower is counter to water droplets from the spray nozzle. In an embodiment, the air blower is disposed through a wall of the container such that air flow from the air blower is crossways to water droplets from the spray nozzle. In an embodiment, the air blower produces an air flow rate from about 60,000 cubic feet per minute (CFM) to about 150,000 CFM (and any range or value there between).

In an embodiment, the system further comprises an air heater, wherein an air flow outlet of the air heater is fluidly connected to an air flow inlet of the air blower.

In an embodiment, the spray system comprises a spray manifold, wherein the outlet of the pump is fluidly connected to an inlet of the spray manifold; and a spray nozzle, wherein an inlet of the spray nozzle is connected to an outlet of the spray manifold, and wherein an outlet of the spray nozzle discharges into the container. In an embodiment, the spray nozzle is selected from the group consisting of plain-orifice nozzles, shaped-orifice nozzles, surface impingement spray nozzles, spiral spray nozzles, and pressure swirl spray nozzles. In an embodiment, the spray nozzle produces water droplet sizes from about 50 μm to about 1,000 μm (and any range or value there between).

In an embodiment, the system further comprises a programmable logic controller (PLC) or other computing device, wherein the PLC or other computing device controls the air flow rate from the air blower and the water droplet size from the spray nozzle.

In an embodiment, the system further comprises an acid conditioning system, wherein the acid conditioning system adds an acid solution to the wastewater.

In an embodiment, the system further comprises a bactericide conditioning system, wherein the bactericide conditioning system adds bactericide to the wastewater.

In an embodiment, the system further comprises a scale inhibition conditioning system, wherein the scale inhibition conditioning system adds scale inhibitor to the wastewater.

In an embodiment, the system further comprises a defoamer system, wherein the defoamer system adds defoamer to the wastewater.

In an embodiment, the first pump produces a water flow rate from about 50 gallons per minute (GPM) to about 100 GPM (and any range or value there between).

In an embodiment, the second pump produces a water flow rate from about 500 GPM to about 800 GPM (and any range or value there between).

In an embodiment, the demister element retains unevaporated water inside the container.

A wastewater evaporation system for spray evaporating water comprises a wastewater inlet; a pump, wherein an outlet of the wastewater inlet is fluidly connected to an inlet of the pump and wherein an outlet of the pump is fluidly connected to an inlet of a manifold; a spray nozzle, wherein an outlet of the manifold is fluidly connected to an inlet of the spray nozzle; a horizontal container, wherein an upper portion of the container is enclosed with a demister element and wherein the outlet of the spray nozzle discharges water droplets into the container; a discharge outlet, wherein a bottom of the container is fluidly connected to the discharge outlet; an air system comprising an air blower and optionally an air heater, wherein the air system is disposed through a wall of the container and wherein the air system discharges air flow counter to the water droplets from the spray nozzle; and a deflector or a diffuser, wherein the deflector or diffuser is disposed within the container to redirect air flow from a center region of the container to a wall of the container.

In an embodiment, the system further comprises a tapered insert, wherein the tapered insert is disposed within the container to redirect the air flow from the wall of the container to the center region of the container.

In an embodiment, the system further comprises a vane, wherein the vane is disposed within the container to redirect the air flow in the container. In an embodiment, the vane extends across a cross-section of the container.

A wastewater evaporation system for spray evaporating water comprises a wastewater feed inlet; a pump, wherein an outlet of the wastewater inlet is fluidly connected to an inlet of the pump and wherein an outlet of the pump is fluidly connected to an inlet of a manifold; a drip orifice, wherein an outlet of the manifold is fluidly connected to an inlet of the drip orifice; a container, wherein an upper portion of the container is enclosed with a demister element; a packing system and/or a tray system disposed within the container, wherein the outlet of the drip orifice discharges water droplets onto the packing system and/or the tray system; a discharge outlet, wherein a bottom of the container is fluidly connected to the discharge outlet; and an air system comprising an air blower and optionally an air preheater, wherein the air system is disposed through a wall of the container and wherein the air system discharges air flow counter to the water droplets from the drip orifice.

In an embodiment, the system is capable of evaporating from about 30 to about 1000 barrels of wastewater per day. In an embodiment, the system is capable of evaporating from about 30 to about 60 barrels of wastewater per day.

In an embodiment, the pump produces a water flow rate into the system from about 15 GPM to about 100 GPM.

In an embodiment, the demister element is from about 4-inches to about 12-inches thick. In an embodiment, the demister element is about 10-inches thick.

In an embodiment, the packing system and/or the tray system comprises random packing, structured packing, or combinations thereof. In an embodiment, the packing system and/or tray system comprises containerized packing. In an embodiment, the packing system and/or tray system comprises pall rings.

In an embodiment, the packing is made from different materials (e.g., ceramics, plastics, stainless steel) to improve performance at high temperatures.

In an embodiment, the packing system and/or the tray system comprises a porous tray.

In an embodiment, the packing system comprises: a porous tray; and a packing, wherein the packing is disposed on the porous tray. In an embodiment, the packing is selected from random packing, structured packing, and combinations thereof. In an embodiment, the packing is random packing. In an embodiment, the packing is structured packing. In an embodiment, the packing is containerized packing. In an embodiment, the packing is pall rings.

In an embodiment, the packing is made from different materials (e.g., ceramics, plastics, stainless steel) to improve performance at high temperatures.

In an embodiment, the tray system comprises: a first porous tray; and a second porous tray, wherein the first porous tray discharges water droplets onto the second porous tray.

In an embodiment, the air preheater comprises a natural gas burner. In an embodiment, the air preheater comprises a natural gas burner, wherein the natural gas burner is adapted to be moved relative to the drip orifice.

In an embodiment, the air preheater comprises a natural gas burner and a natural gas powered electric generator.

In an embodiment, the air preheater comprises a natural gas burner and a natural gas control valve, wherein the natural gas control valve is capable of providing fixed flow or modulated flow.

In an embodiment, air flow from the air blower disperses wastewater and/or water droplets from the drip orifice.

In an embodiment, the air blower produces an air flow rate from about 2,500 CFM to about 6,500 CFM.

In an embodiment, an air flow inlet of the air preheater is fluidly connected to an air flow outlet of the air blower.

In an embodiment, the air preheater produces an air heating rate from about 0 million BTU per hour to about 2.1 million BTU per hour.

In an embodiment, the air preheater produces air temperatures from about 50° F. to about 400° F.

In an embodiment, the air system is disposed through the wall of the container upstream of the demister element.

In an embodiment, the air system is disposed through the wall of the container downstream of the demister element.

In an embodiment, the system further comprises a deflector or a diffuser, wherein the deflector or diffuser is disposed within the container to redirect air flow in the container.

In an embodiment, the system further comprises a vane, wherein the vane is disposed within the container to redirect the air flow in the container. In an embodiment, the vane extends across a cross-section of the container.

In an embodiment, the system further comprises a vane, wherein the vane is disposed in an air duct between an air discharge outlet of air system and an air inlet to the container.

In an embodiment, the system further comprises a programmable logic controller (PLC) or other computing device, wherein the PLC or other computing device controls the air flow rate from the air blower.

In an embodiment, the system further comprises an acid conditioning system, wherein the acid conditioning system adds an acid solution to the wastewater.

In an embodiment, the system further comprising a bactericide conditioning system, wherein the bactericide conditioning system adds bactericide to the wastewater.

In an embodiment, the system further comprises a scale inhibition conditioning system, wherein the scale inhibition conditioning system adds scale inhibitor to the wastewater.

In an embodiment, the system further comprises a defoamer system, wherein the defoamer system adds defoamer to the wastewater.

In an embodiment, the system further comprises a skid, wherein the wastewater evaporation system is mounted on the skid.

In an embodiment, the system further comprises a skid mounted on or removably secured to a trailer or a truck, wherein the wastewater evaporation system is mounted on the skid.

In an embodiment, the system further comprises a containment system, wherein the containment system comprises a skid surrounded by a liner and wherein the wastewater evaporation system is mounted on the skid. In an embodiment, the system further comprises a draw line, wherein an inlet of the draw line is disposed in the liner and an outlet of the draw line is fluidly connected to an inlet of the container. In an embodiment, the system further comprises a draw line, wherein an inlet of the draw line is disposed in the liner and an outlet of the draw line is fluidly connected to the inlet of the pump.

In an embodiment, the system further comprises insulation and/or heat tracing disposed around the pump. In an embodiment, the system further comprises insulation and/or heat tracing around the pump, the first valve, the second valve, the third valve and the fourth valve.

In an embodiment, the system further comprises a heated enclosure disposed around the pump.

In an embodiment, the system further comprises an air, argon or nitrogen purge system comprising an air, argon or nitrogen source, wherein an outlet of the air, argon or nitrogen system is fluidly connected to the inlet of the pump.

A method for spray evaporating water comprises selecting predetermined parameters for a system for spray evaporating water; drawing wastewater into the system from an external water source using a pump; diverting wastewater to a spray nozzle; spraying the wastewater through the spray nozzle to create water droplets; dispersing the water droplets into a container of the system; collecting condensed water in the sump of the container; recycling the condensed water from the sump of the container, and diverting concentrated waste to a waste outlet.

In an embodiment, the method further comprises monitoring conductivity of condensed water using a conductivity meter.

In an embodiment, the predetermined parameters comprise air flow rate, air heating rate, maximum conductivity, and water flow rate, and wherein the concentrated water is discharged to the waste outlet when conductivity of the condensed water reaches the maximum conductivity.

In an embodiment, the air flow rate is from about 60,000 CFM to about 150,000 CFM (and any range or value there between).

In an embodiment, the pump produces a water flow rate from about 50 GPM to about 800 GPM (and any range or value there between). In an embodiment, the pump produces a water flow rate from about 15 GPM to about 100 GPM.

In an embodiment, the water droplet size is from 50 μm to about 1,000 μm (and any range or value there between).

In an embodiment, the method further comprises monitoring ambient air temperature using a temperature sensor, wherein the predetermined parameters further comprise minimum air temperature. In an embodiment, the system is shut down when the ambient air temperature reaches the minimum air temperature.

In an embodiment, the method further comprises monitoring the pH of the condensed water using a pH meter and adding acid solution to the condensed water to maintain the pH at about 6.5 or below, if required, based on waste water quality.

In an embodiment, the method further comprises adding bactericide to the condensed water.

In an embodiment, the method further comprises adding scale inhibitor to the condensed water. In an embodiment, the method further comprising monitoring the pH of the condensed water using a pH meter and adding acid solution to the condensed water to maintain the pH at about 6.5 or below, if required, based on waste water quality.

In an embodiment, the method further comprises adding defoamer to the condensed water.

In an embodiment, the method further comprises using a programmable logic controller or other computing device to control the system.

A method for spray evaporating water comprising: providing a wastewater evaporation system as discussed herein; selecting predetermined parameters for the system; drawing wastewater into the system from an external water source using a pump; diverting wastewater to a drip orifice; flowing the wastewater through the drip orifice to create water droplets; flowing the water droplets onto a packing system and/or a tray system disposed within a container of the system; blowing air into the container counter to the water droplets from the drip orifice using an air blower; collecting condensed water in a bottom of the container; recycling the condensed water from the bottom of the container, and diverting concentrated waste to a discharge outlet.

In an embodiment, the method further comprises monitoring conductivity of condensed water using a conductivity meter.

In an embodiment, the predetermined parameters comprise air flow rate, air heating rate, maximum conductivity, and water flow rate, and wherein the concentrated water is discharged to the discharge outlet when conductivity of the condensed water reaches the maximum conductivity.

In an embodiment, the method further comprises monitoring ambient air temperature using a temperature sensor, wherein the predetermined parameters further comprise minimum air temperature. In an embodiment, the system is shut down when the ambient air temperature reaches the minimum air temperature.

In an embodiment, the method further comprises monitoring the pH of the condensed water using a pH meter and adding acid solution to the condensed water to maintain the pH at about 6.5 or below.

In an embodiment, the method further comprises adding bactericide to the condensed water.

In an embodiment, the method further comprises adding scale inhibitor to the condensed water. In an embodiment, the method further comprises monitoring the pH of the condensed water using a pH meter and adding acid solution to the condensed water to maintain the pH at about 6.5 or below.

In an embodiment, the method further comprises adding defoamer to the condensed water.

In an embodiment, the method further comprises using a programmable logic controller or other computing device to control the system.

In an embodiment, the method further comprises pretreating wastewater to reduce or remove volatile organic compounds upstream of a wastewater inlet of the system.

In an embodiment, the method further comprises discharging evaporated water through the evaporated water outlet. In an embodiment, the method further comprises collecting the evaporated water from the evaporated water outlet and condensing the evaporated water in a low pressure conduit.

In an embodiment, the method further comprises discharging evaporated water through the evaporated water outlet. In an embodiment, the method further comprises further comprising heating the evaporated water upstream of the evaporated water outlet.

In an embodiment, the method further comprises discharging evaporated water through the evaporated water outlet. In an embodiment, the method further comprises heating the evaporated water downstream of the evaporated water outlet.

These and other objects, features and advantages will become apparent as reference is made to the following detailed description, preferred embodiments, and examples, given for the purpose of disclosure, and taken in conjunction with the accompanying drawings and appended claims.

BRIEF DESCRIPTION OF THE DRAWINGS

For a further understanding of the nature and objects of the present invention, reference should be made to the following detailed disclosure, taken in conjunction with the accompanying drawings, in which like parts are given like reference numerals, and wherein:

FIG. 2C illustrates a drawing of a front, right perspective view of the exemplary system in FIG. 2A;

FIG. 11C illustrates a drawing of front view of the exemplary system of FIGS. 11A-11B;

DETAILED DESCRIPTION OF EMBODIMENTS OF THE INVENTION

Figure 1A:
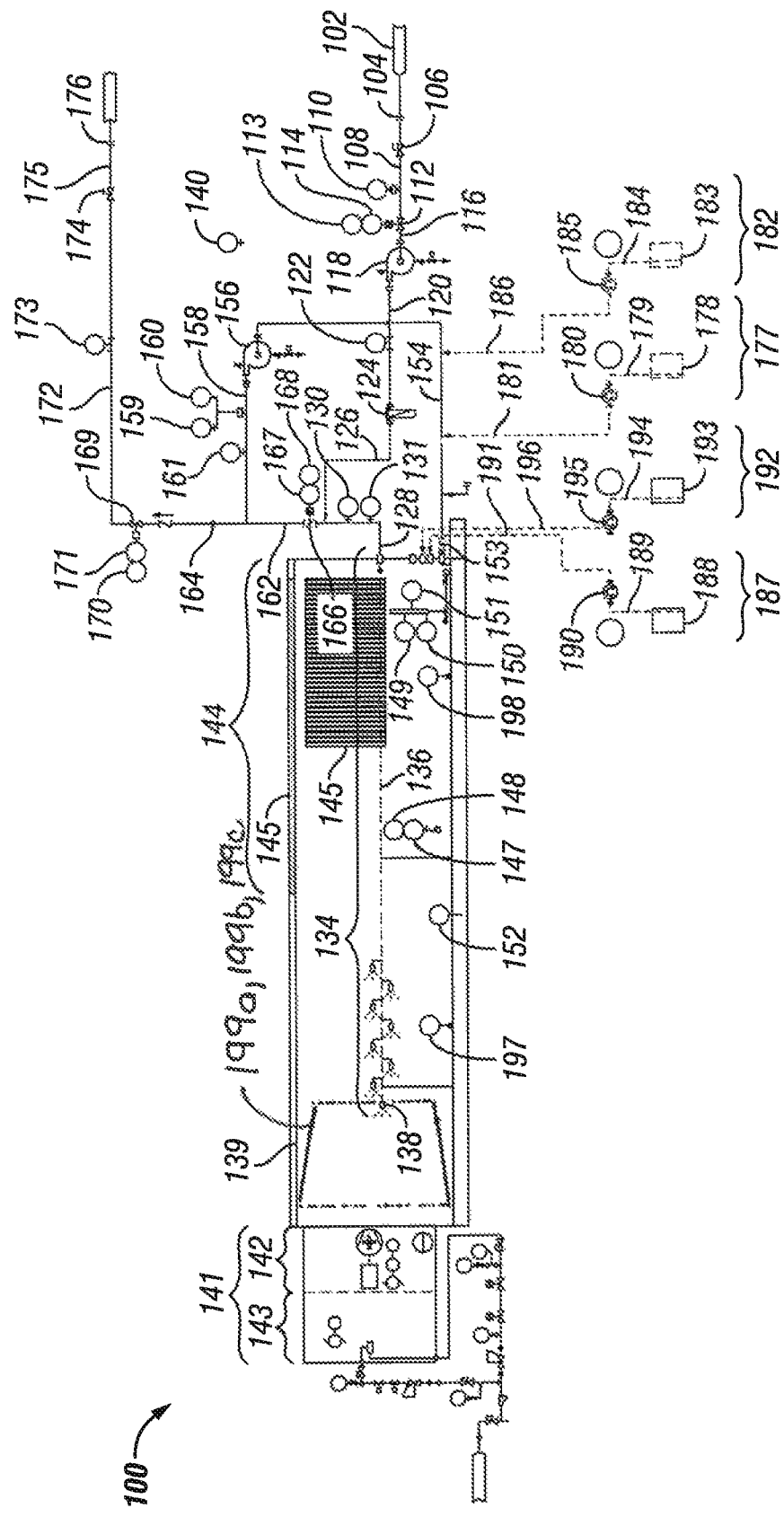
FIG. 1A illustrates a schematic of an exemplary system for spray evaporation of water according to an embodiment of the present invention.

The following detailed description of various embodiments of the present invention references the accompanying drawings, which illustrate specific embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled.

System for Spray Evaporation of Water

A schematic of an exemplary alternative system 100, 200, 300 for spray evaporation of water according to an embodiment of the present invention is shown in FIGS. 1A-3. The system 100, 200, 300 comprises a wastewater inlet 104, 204, a first (feed) pump 118, 218, a first manifold 128, 228, a spray system 136, 236, 336, a container 139, 239, 339, a demister element 145, 245, 345, an air blower 142, 242 and a discharge outlet 176, 276.

In an embodiment, the system 100, 200, 300 is capable of evaporating between about 2,000 to about 10,000 gallons of wastewater per day (see FIGS. 1A-3). If a higher throughput is desired, a plurality of the system 100, 200, 300 may be used in parallel to treat the wastewater.

Inlet System

In an embodiment, the system 100, 200 may further comprise a first (feed) shut-off valve 106, 206 and/or a first (feed) valve 112, 212. The wastewater inlet 104 may be connected to an inlet of a first shut-off valve 106 via a pipe 108. An outlet of the first shut-off valve 106 may be connected to an inlet of the pump 118 via a pipe 116

The wastewater inlet 104 may be any suitable wastewater inlet that can handle up to about 40 psi. Suitable wastewater inlets include, but are not limited to, flange connections, cam-lock fittings and hammer unions. In an embodiment, the wastewater inlet 104 is a flange connection (see FIGS. 1A-3). The wastewater inlet 104 permits connection to an external wastewater source via a wastewater suction header 102. The water inlet 104 may be connected to the external wastewater source via a hose, pipe or other means customary in the art.

In an embodiment, the system 100, 200 may further comprise a first (feed) valve 112, 212. The first (feed) valve 112 may be any suitable switching valve. Suitable first (feed) valves 112 include, but are not limited to, ball valves. For example, a suitable first (feed) valve 112 is available from GF Piping Systems. In an embodiment, the first (feed) valve 112 may be a GF Piping System Type 546 Electric Actuated Ball Valve from GF Piping Systems. In an embodiment, the first (feed) valve 112 may be automatic or manual. In an embodiment, the first (feed) valve 112 may be electric or pneumatic actuation. In an embodiment, the first (feed) valve 112 may be normally CLOSED.

In an embodiment, the system 100 may further comprise a first limit switch 113 and a second limit switch 114. In an embodiment, the first limit switch 113 confirms that the first (feed) valve 112 is OPEN; and the second limit switch 114 confirms that the first (feed) valve 112 is CLOSED.

In an embodiment, the first (feed) valve 112 may have 2-inch connections.

In an embodiment, the system 100, 200, 300 may further comprise a first (feed) shut-off valve 106, 206, 306. The first (feed) shut-off valve 106 may be any suitable shut-off valve. Suitable first (feed) shut-off valves 106 include, but are not limited to, ball valves and butterfly valves. For example, a suitable first (feed) shut-off valve 106 is available from GF Piping Systems. In an embodiment, the first (feed) shut-off valve 106 may be a GF Piping Systems Type 546 Ball Valve from GF Piping Systems. In an embodiment, the first (feed) shut-off valve 106 may be automatic or manual. In an embodiment, the first (feed) shut-off valve 106 may be normally CLOSED.

In an embodiment, the first (feed) shut-off valve 106 may have 2-inch connections.

The first (feed) shut-off valve 106 may be made of any suitable corrosion-resistant material. The first (feed) shut-off valve 106 may be made of any suitable corrosion-resistant metals or plastics. Suitable metals include, but are not limited to, plastic-coated carbon steel, stainless steel, Hastelloy® alloy, Monel® alloy and combinations thereof and suitable plastic include, but are not limited to, polyvinylchloride (PVC) polymers, chlorinated polyvinyl chloride (CPVC) polymers, fiberglass reinforced plastic (FRP), Kynar® polyvinylidene fluoride (PVDF) polymers, polyethylene polymers, polypropylene polymers, Teflon® perfluoroalkoxy (PFA) polymers, Teflon® polytetrafluroethylene (PTFE) polymers, and combinations thereof. In an embodiment, the first (feed) shut-off valve 106 (wetted components) may be made of polyvinyl chloride (PVC) and ethylene propylene diene monomer (EPDM) rubber.

An outlet of the first (feed) shut-off valve 106 may be connected to an inlet of the first (feed) valve 112 via pipe 108. An outlet of the first (feed) valve 112 may be connected to an inlet of a first (feed) pump 118 via a pipe 116.

The pipe 108, 116 may be made of any suitable corrosion-resistant pipe. The pipe 108, 116 may be any suitable corrosion-resistant metals or plastics. Suitable metals include, but are not limited to, plastic-coated carbon steel, stainless steel, super-duplex stainless steel, AL-6XN alloy, Ni—Al—Brz alloy, Hastelloy® alloy, Monel® alloy and combinations thereof and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the pipe 108, 116 may be made of plastic-coated carbon steel. In an embodiment, the pipe 108, 116 may be made of Plasite 7159 HAR-coated carbon steel. In an embodiment, the pipe 108, 116 may be made of 316 stainless steel.

In an embodiment, the pipe 108, 116 may be 2-inch pipe.

The first (feed) pump 118 may be any suitable pump. Suitable first (feed) pumps 118 include, but are not limited to, centrifugal pumps. For example, a suitable first (feed) pump 118 is available from MP Pumps Inc. In an embodiment, the first (feed) pump 118 may be a FLOMAX® 8 Self-Priming Centrifugal Pump from MP Pumps Inc. In an embodiment, the first (feed) pump 118 may be about 3 to about 5 HP centrifugal pump.

In an embodiment, the first (feed) pump 118 may have 2-inch connections.

The first (feed) pump 118 may be made of any suitable corrosion-resistant material. The first (feed) pump 118 may be made of any suitable corrosion-resistant metals or plastics. Suitable metals include, but are not limited to, cast iron, stainless steel, super-duplex stainless steel, AL-6XN alloy, Ni—Al—Brz alloy, Hastelloy® alloy, Monel® alloy and combinations thereof and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. For example, the first (feed) pump 118 (wetted components) may be made of stainless steel, super-duplex stainless steel, AL-6XN alloy, Ni—Al—Brz alloy, Hastelloy® alloy, Monel® alloy or FRD. In an embodiment, the first (feed) pump 118, including internal wetted components, was made of 316 stainless steel. In an embodiment, the first (feed) pump 118 may be made of cast iron if a shorter service life is acceptable.

In an embodiment, the system 100, 200, 300 may further comprise a basket strainer 124, 224 and an optional pressure sensor (not shown). An inlet of the basket strainer 124 may be fluidly connected to an outlet of pipe 120, and an outlet of the basket strainer 124 may be fluidly connected to an inlet of pipe 126. The basket strainer 124 retains debris in the water feed to prevent clogging of the spray nozzles 138, 338. An obstruction in the basket strainer 124 may be detected via a decreased feed rate at the first flow meter 122.

The basket strainer 124 may be any suitable basket strainer, and may contain a reusable or disposable mesh or synthetic fiber bag. A suitable basket strainer 124 includes, but is not limited to, ⅛-inch perforated baskets, contained within a simplex or duplex housing. For example, a suitable basket strainer 124 is available from Hayward or Rosedale. In an embodiment, the basket strainer 124 may be a ⅛-inch perforated basket from Hayward or Rosedale.

The basket strainer 124 may be made of any suitable corrosion-resistant material. The basket strainer 124 may be made of any suitable corrosion-resistant metals or plastics. The basket strainer 124 may be any suitable metal or plastic basket strainer. Suitable metals include, but are not limited to, stainless steel, Hastelloy® alloy, Monel® alloy and combinations thereof; and suitable plastics include, but are not limited to, chlorinated polyvinyl chloride (CPVC) polymers, Kynar® polyvinylidene fluoride (PVDF) polymers, polyvinyl chloride (PVC) polymers, Teflon® perfluoroalkoxy (PFA) polymers, Teflon® polytetrafluroethylene (PTFE) polymers, and combinations thereof. In an embodiment, the basket strainer 124 (basket) may be made of 316 stainless steel.

In an embodiment, the optional pressure sensor (not shown) may be fluidly connected to either the pipe 120 or the inlet of the basket strainer 124. An obstruction in the basket strainer 124 may also be detected via an increase in pressure at the optional pressure sensor (not shown).

The optional pressure sensor (not shown) may be any suitable pressure sensor. For example, a suitable pressure sensor is available from Rosemount, Inc. In an embodiment, the pressure sensor may be a Rosemount 2088 Absolute and Gage Pressure Transmitter from Rosemount, Inc.

An outlet of the first (feed) pump 118 may be connected to an inlet of a basket strainer 124 via pipe 120. An outlet of the basket strainer 124 may be connected to a first inlet to a first manifold 128 via a pipe 126.

The pipe 120, 126, 128 may be made of any suitable corrosion-resistant pipe. The pipe 120, 126, 128 may be any suitable metal or plastic pipe. Suitable metals include but are not limited to, plastic-coated carbon steel, stainless steel, super-duplex stainless steel, AL-6XN alloy, Ni—Al—Brz alloy, Hastelloy® alloy, Monel® alloy and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the pipe 120, 126, 128 may be made of plastic-coated carbon steel. In an embodiment, the pipe 120, 126, 128 may be made of Plasite 7159 HAR-coated carbon steel. In an embodiment, the pipe 120, 126, 128 may be made of 316 stainless steel.

In an embodiment, the pipe 120, 126, 128 may be 2-inch pipe.

An outlet of the first manifold 128 may be connected to an inlet of a spray system 134, 334. In an embodiment, the spray system 134, 334 comprises a spray manifold 136, 336 and a spray nozzle 138, 338, wherein the spray nozzle 138, 338 may be connected to an outlet of the spray manifold 136, 336. In an embodiment, the spray system 134, 334 is disposed inside the container 139, 339.

An outlet of the spray nozzle 138, 338 discharges water droplets inside the container 139, 339. An upper portion or top side of the container 139, 339 is enclosed with the demister element 145, 345 to retain the water droplets inside the container 139, 339. In an embodiment, a side portion of the container 139, 339 is also enclosed with the demister element 145, 345 to retain the water droplets inside the container 139, 339. The demister element 145, 345 is secured to and supported by the container 139, 339 in a manner customary in the art.

At least some of the water droplets evaporate to form water vapor. The water vapor passes through the demister element 145, 345 and out the evaporated water outlet 146, 346. Any un-evaporated water is retained by the demister element 145, 345 and falls to a sump (bottom) of the container 139, 339.

In an embodiment, the spray system 134, 334 comprises a spray manifold 136, 336 and a plurality of spray nozzles 138', 138" wherein each of the plurality of spray nozzles 138', 138" may be connected to an outlet of the spray manifold 136, 336. Outlets of the plurality of spray nozzles 138', 138" discharge water droplets inside the container 139, 339. An upper portion or top side of the container 139, 339 is enclosed with the plurality of demister elements 145', 145" to retain the water droplets inside the container 139, 339. In an embodiment, a side portion of the container 139, 339 is also enclosed with the demister element 145, 345 to retain the water droplets inside the container 139, 339. The plurality of demister elements 145', 145" are secured to and supported by the container 139, 339 in a manner customary in the art.

At least some of the water droplets evaporate to form water vapor. The water vapor passes through pores (tortuous paths) in the plurality of demister elements 145', 145" and out the evaporated water outlet 146, 346. Any un-evaporated water is retained by the plurality of demister elements 145', 145" and falls to the sump (bottom) of the container 139, 339.

The evaporated water outlet 146, 346 comprises a plurality of outlet pores (not shown) in the plurality of demister elements 145', 145".

The spray nozzle 138, 338 may be any suitable spray nozzle. Suitable spray nozzles 138, 338 include, but are not limited to, plain-orifice nozzles, shaped-orifice nozzles, surface impingement spray nozzles, spiral spray nozzles, and pressure swirl spray nozzles. For example, a suitable spray nozzle 138, 338 is available from BETE Fog Nozzle, Inc. In an embodiment, the spray nozzle 138, 338 may be a Type TF spiral spray nozzle from BETE Fog Nozzle, Inc. In an embodiment, the spiral spray nozzle 138, 338 may be 30, 60, 90, 120, 150 and 170 degrees. In an embodiment, the spiral spray nozzle may be capable from about 50 gallons per minute (GPM) to about 70 GPM per spray head (and any range or value there between). In an embodiment, the rotary atomizer produces water droplet sizes from about 50 μm to about 1,000 μm. In an embodiment, the spray nozzles 138, 338 are positioned inside the container.

The spray nozzle 138, 338 may be made of any suitable corrosion-resistant material. The spray nozzle 138, 338 may be made of any suitable corrosion-resistant metals or plastics. Suitable metals, include, but are not limited to, brass, Cobalt Alloy 6, reaction bonded silicon carbide (RBSC) ceramic, stainless steel, Hastelloy® alloy, Monel® alloy, and combinations thereof; and suitable plastics, include, but are not limited to, polypropylene, polytetrafluroethylene (PTFE), polyvinyl chloride (PVC), and combinations thereof. In an embodiment, the spray nozzle 138, 338 (spray head) may be made of PVC. In an embodiment, the spray nozzle 138, 338 (wetted component) may be made of PVC. In an embodiment, the spray nozzle 138, 338 (wetted component) may be made of Cobalt Alloy 6 and/or RBSC ceramic.

The container 139, 339 may be any suitable container. The container 139, 339 may be mobile or it may be stationary. Suitable containers 139, 339 include, but are not limited to, intermodal containers and frac tanks (see FIGS. 2A-2F). For example, a suitable frac tank container 139, 339 is available from PCI Manufacturing, LLC. In an embodiment, the container 139, 339 may be a 500BBL, V-bottom frac tank from PCI Manufacturing, LLC. For example, a suitable intermodal container 139, 339 is available from West Gulf Container Company. In an embodiment, the container 139, 339 may be a 40-foot high bay container from West Gulf Container Company.

Alternatively, the container 139, 339 may be made of any suitable corrosion-resistant material. The container 139, 339 may be made of coated metal, corrosion-resistant metals or plastics. Suitable coated metals include, but are not limited to, epoxy-coated carbon steels, plastic-coated carbon steels, and combinations thereof; suitable corrosion-resistant metals include, but are not limited to, stainless steel, Hastelloy® alloy, Monel® alloy, and combinations thereof; and suitable plastics include, but are not limited to, polyethylene, polypropylene, polyvinyl chloride (PVC), and combinations thereof. In an embodiment, the container 139, 339 may be made of epoxy-coated carbon steel and/or plastic-coated carbon steel. In an embodiment, the container 139, 339 may be made of Plasite 7159 HAR-coated carbon steel.

The container 139, 339 may be any suitable shape. Suitable shapes include, but are not limited to, cylindrical, cubic, cuboid, prism, pyramid, spherical and combinations thereof. In an embodiment, the container 139, 339 may be approximately a cuboid shape.

The demister element 145, 345 may be any suitable demister element. Suitable demister elements 145, 345 include, but are not limited to, crossflow cellular drift eliminators (see FIGS. 2A-2F). For example, a suitable demister element 145, 345 is available from Brentwood Industries, Inc. In an embodiment, the demister element 145, 345 may be an Accu-Pac® Crossflow Cellular Drift Eliminator from Brentwood Industries, Inc.

Alternatively, the demister element 145, 345 may be made of any suitable corrosion-resistant material. The demister element 145, 345 may be any suitable corrosion-resistant metals or plastics. The demister element 145, 345 may be made of metal or plastic mesh or baffled, torturous-path chevron-type plates. Suitable metal mesh includes, but is not limited to, stainless steel, Hastelloy® alloy, Monel® alloy and combinations thereof; suitable plastic mesh includes, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof; and suitable chevron-type plates include, but are not limited to, polyethylene, polypropylene, polyvinylchloride (PVC), stainless steel, Teflon® perfluoroalkoxy (PFA) polymers, Teflon® polytetrafluroethylene (PTFE) polymers. In an embodiment, the demister element 145, 345 may be made of 316 stainless steel. In an embodiment, the demister element 145, 345 may be made of PVC.

The demister element 145, 345 may be any suitable shape to enclose an upper portion and/or a side portion of the container 139, 339. Suitable shapes include, but are not limited to, cylindrical, cubic, cuboid, prism, pyramid, spherical, and portions and combinations thereof. In an embodiment, the demister element 145, 345 (e.g., upper portion and/or side portion) may be a cuboid shape about 4-feet wide by about 8-feet long and about 4-inches to about 6-inches thick.

Figure 1B:
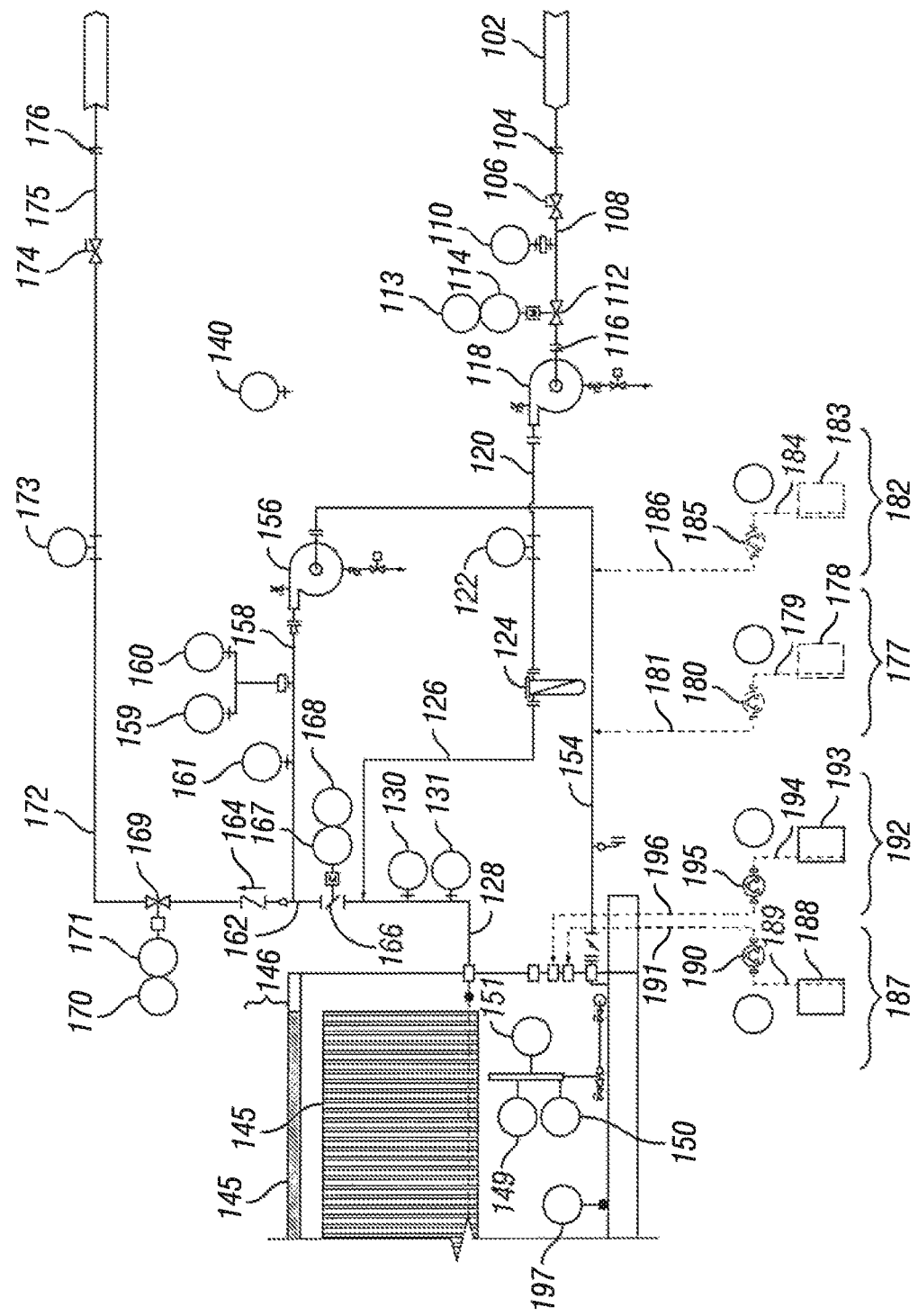
FIG. 1B illustrates a schematic of a front view of the exemplary system of FIG. 1A.
Figure 1C:
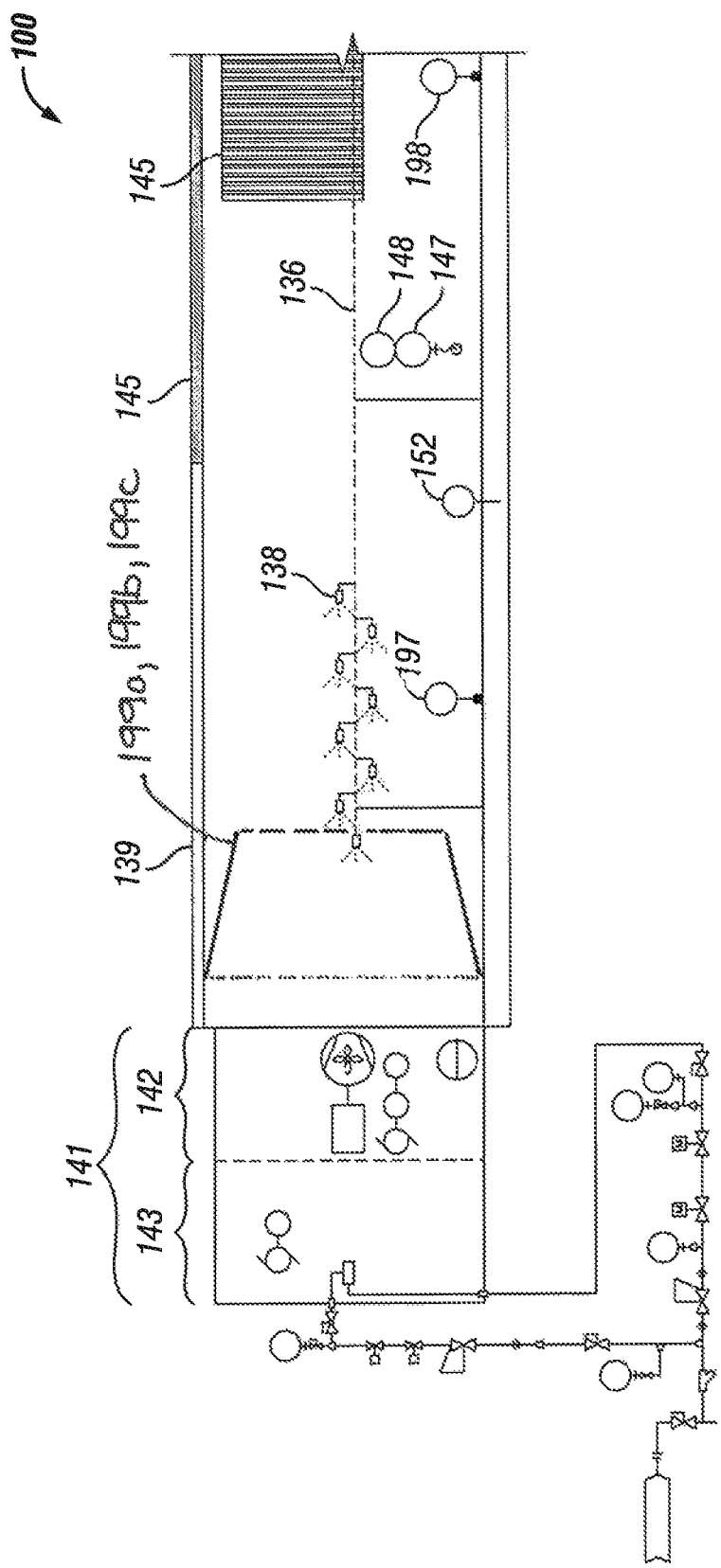
FIG. 1C illustrates a schematic of a rear view of the exemplary system of FIG. 1A.
Figure 2A:
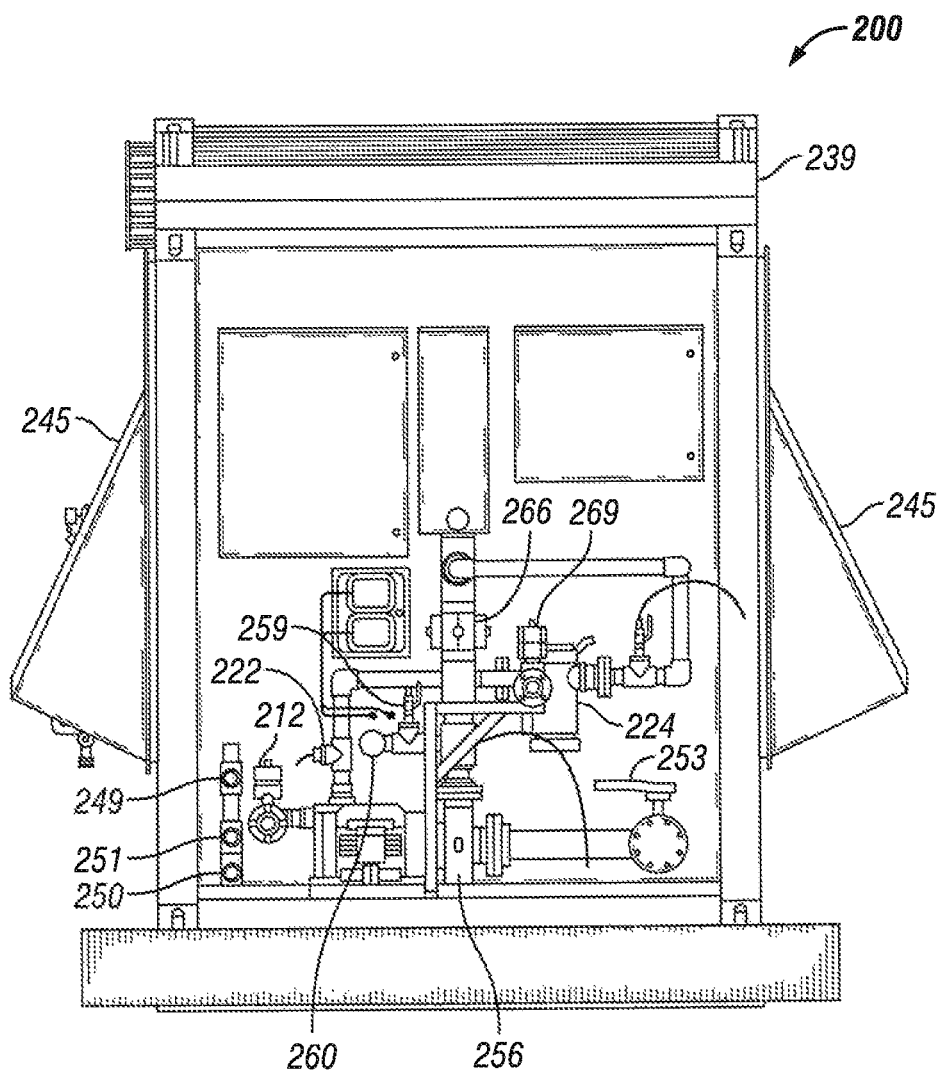
FIG. 2A illustrates a drawing of a front view of an exemplary system for spray evaporation of water according to an embodiment of the present invention.
Figure 2B:
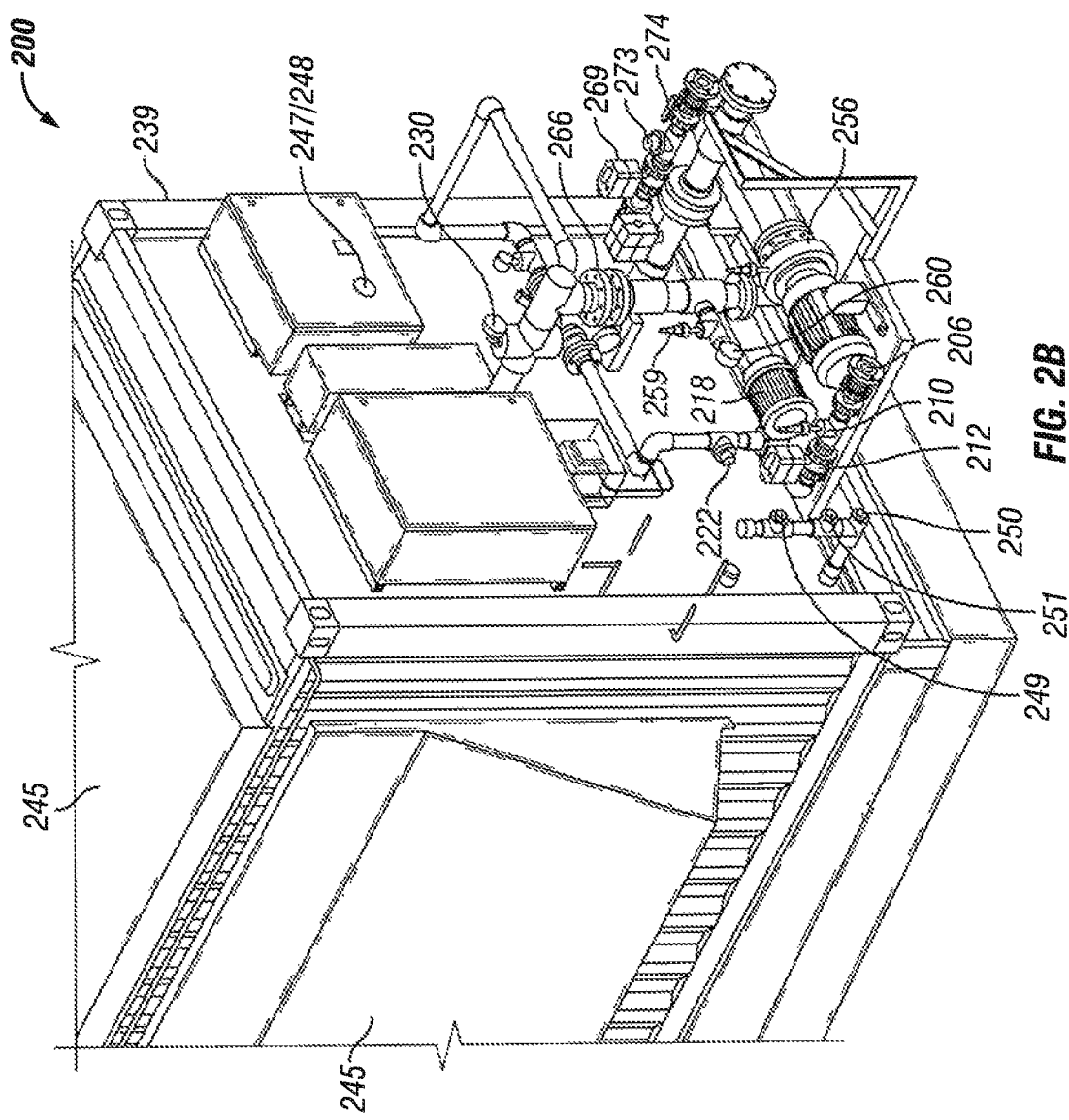
FIG. 2B illustrates a drawing of a front, left perspective view of the exemplary system in FIG. 2A.
Figure 2D:
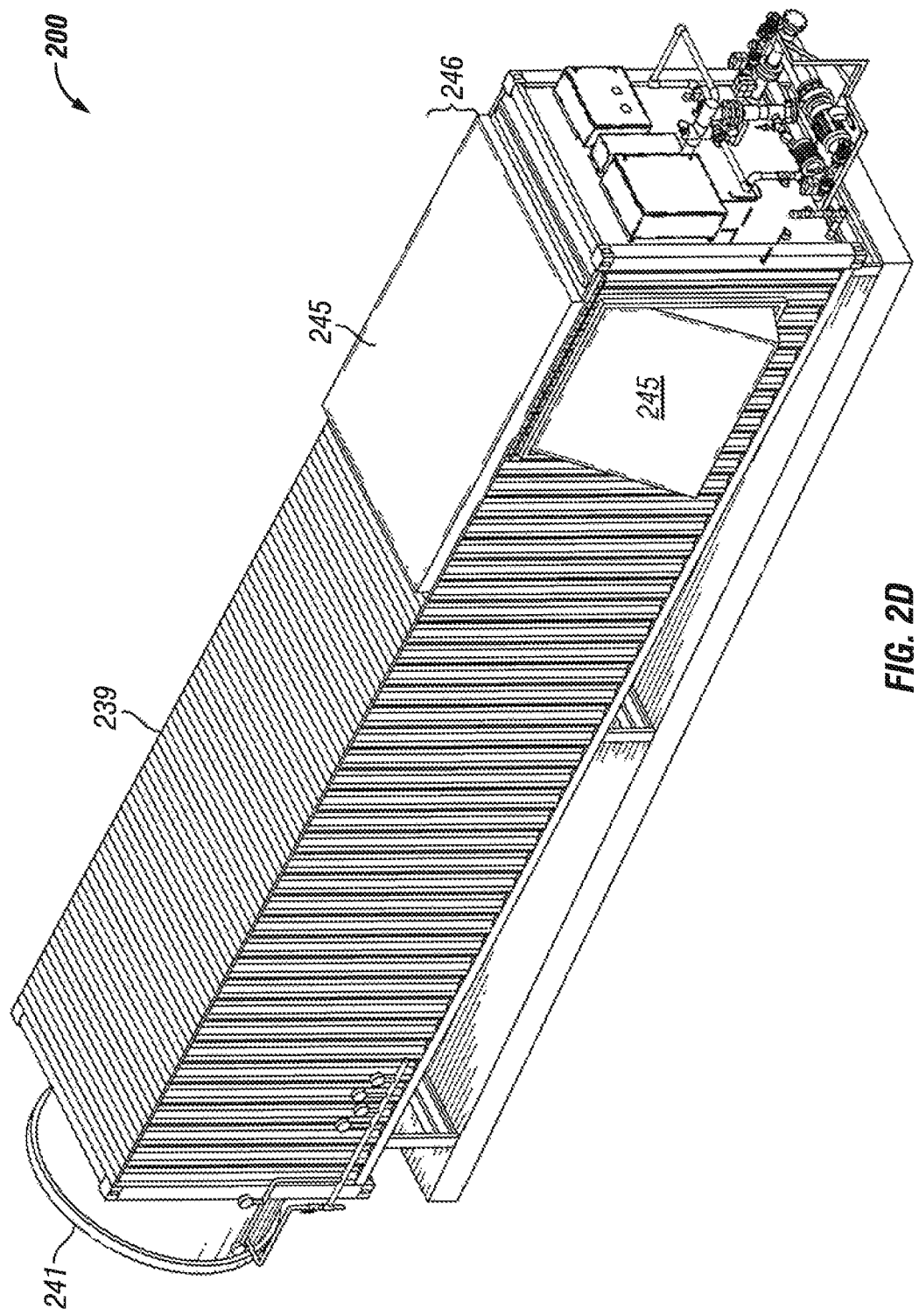
FIG. 2D illustrates a drawing of a front, left perspective view of an exemplary system for spray evaporation of water according to an embodiment of the present invention.
Figure 2E:
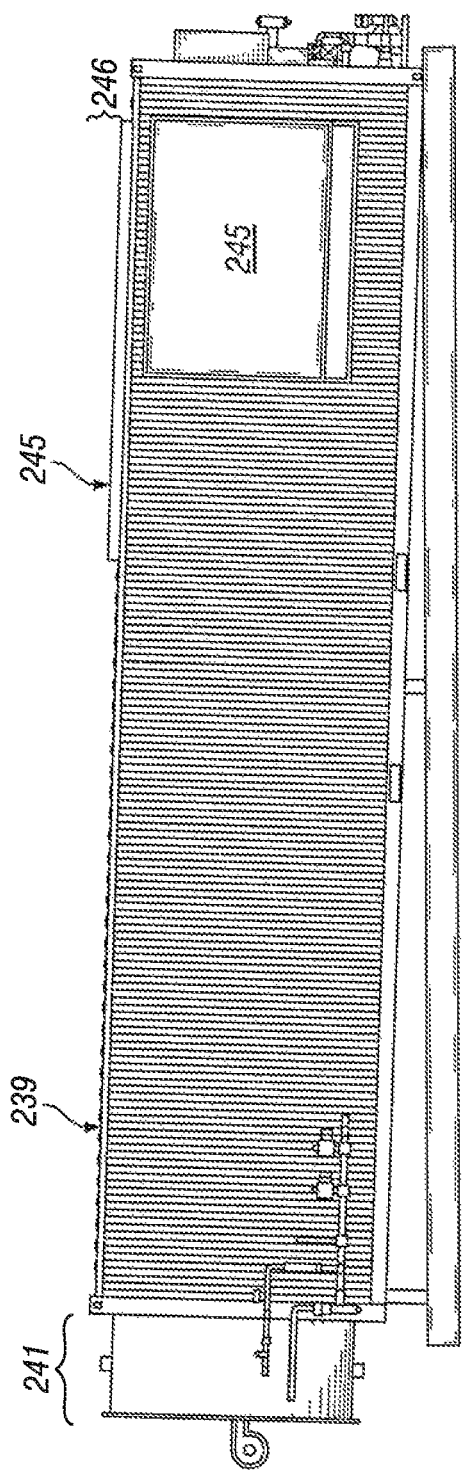
FIG. 2E illustrates a drawing of a left side view of an exemplary system for spray evaporation of water according to an embodiment of the present invention.
Figure 2F:
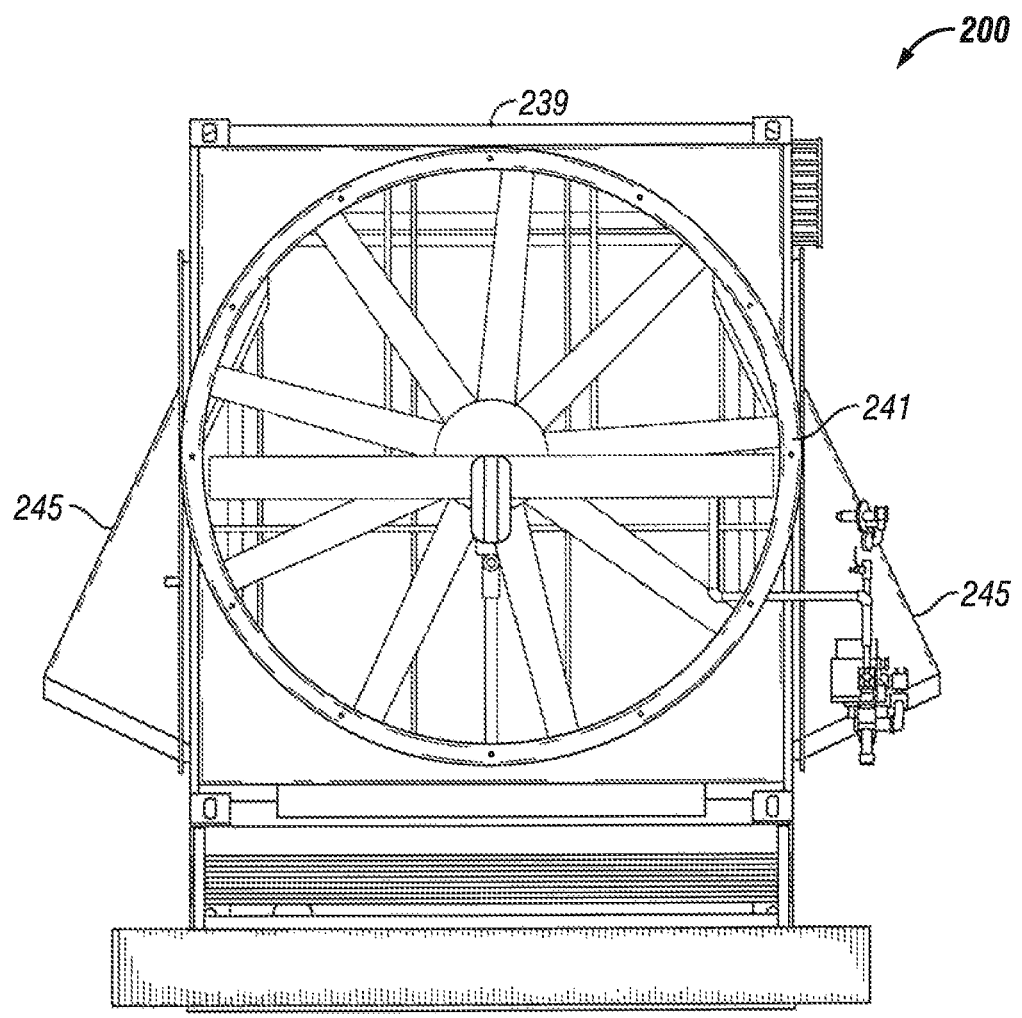
FIG. 2F illustrates a drawing of a rear view of an exemplary system for spray evaporation of water according to an embodiment of the present invention.
Figure 3:
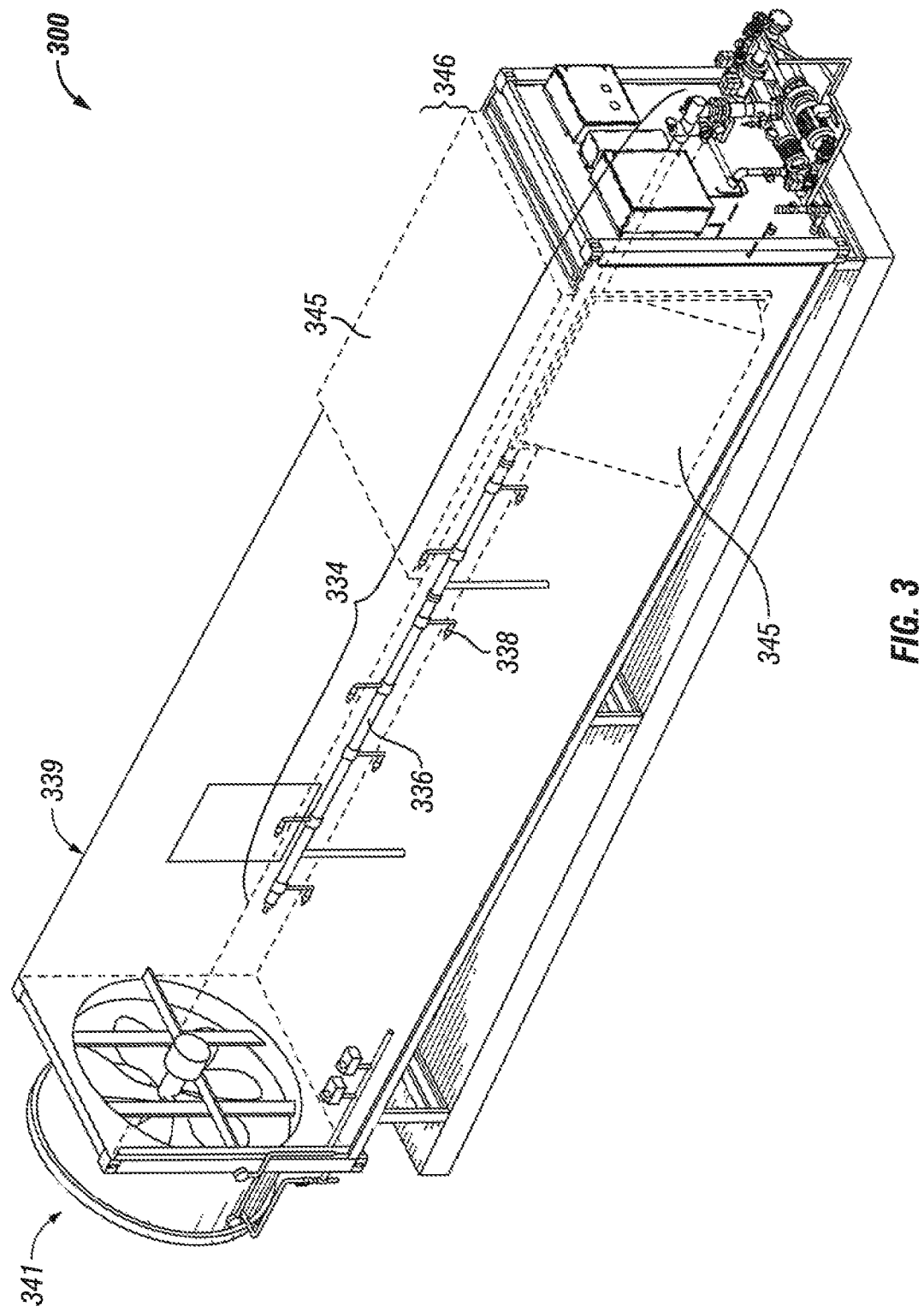
FIG. 3 illustrates a drawing of a front, left perspective view of an exemplary system for spray evaporation of water according to an embodiment of the present invention, showing an internal spray system.
Figure 4A:
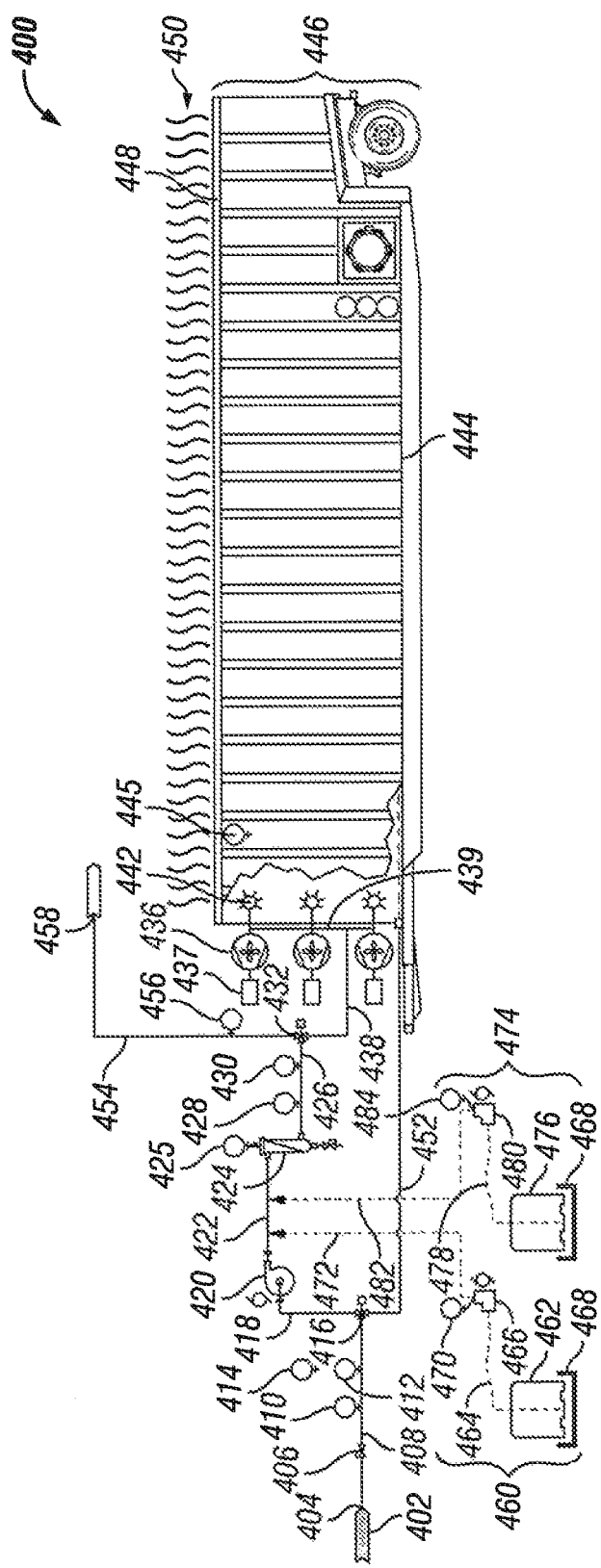
FIG. 4A illustrates a schematic of an exemplary system for spray evaporation of water according to an embodiment of the present invention.
Figure 4B:
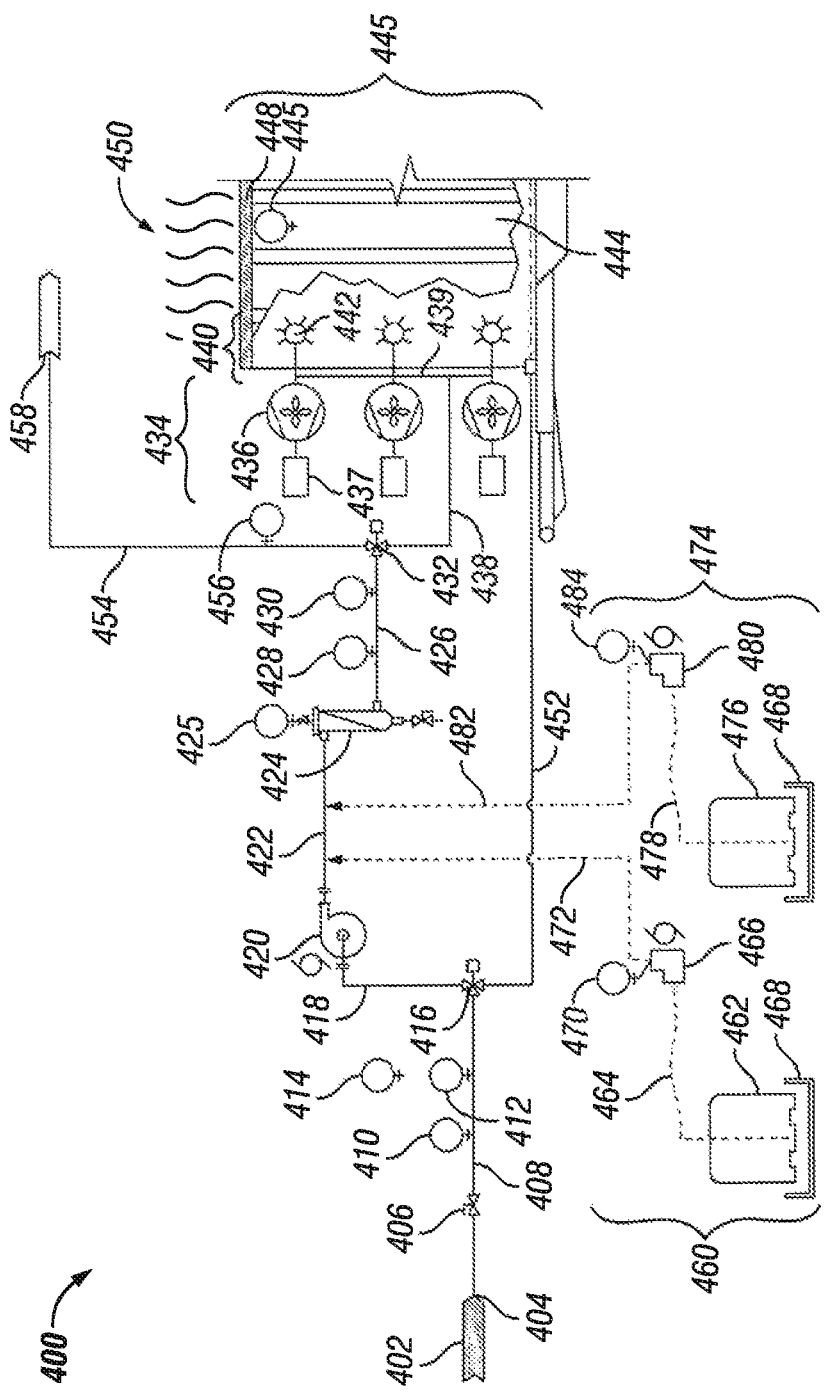
FIG. 4B illustrates a schematic of a front portion of the exemplary system of FIG. 4A.
Figure 4C:
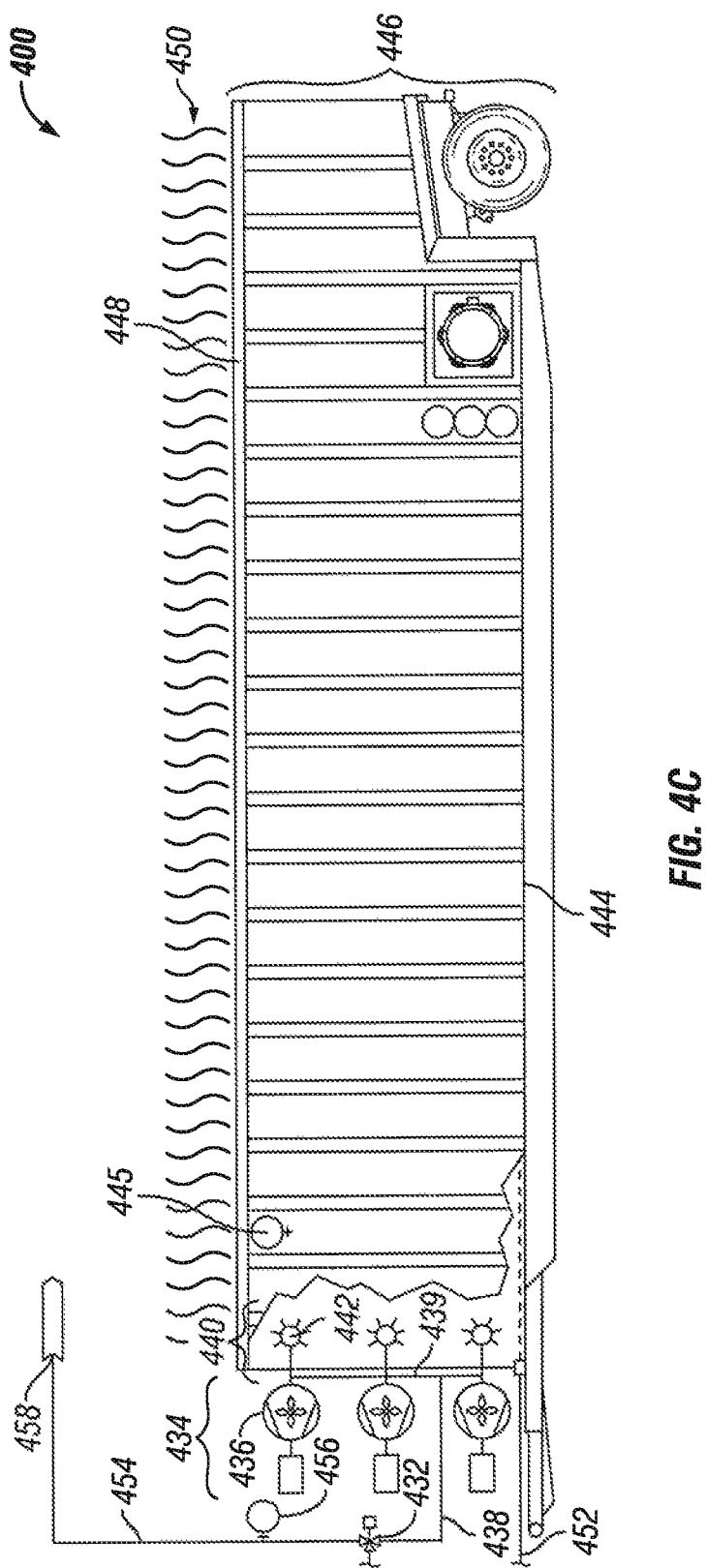
FIG. 4C illustrates a schematic of a rear portion of the exemplary system of FIG. 4A.
Figure 5A:
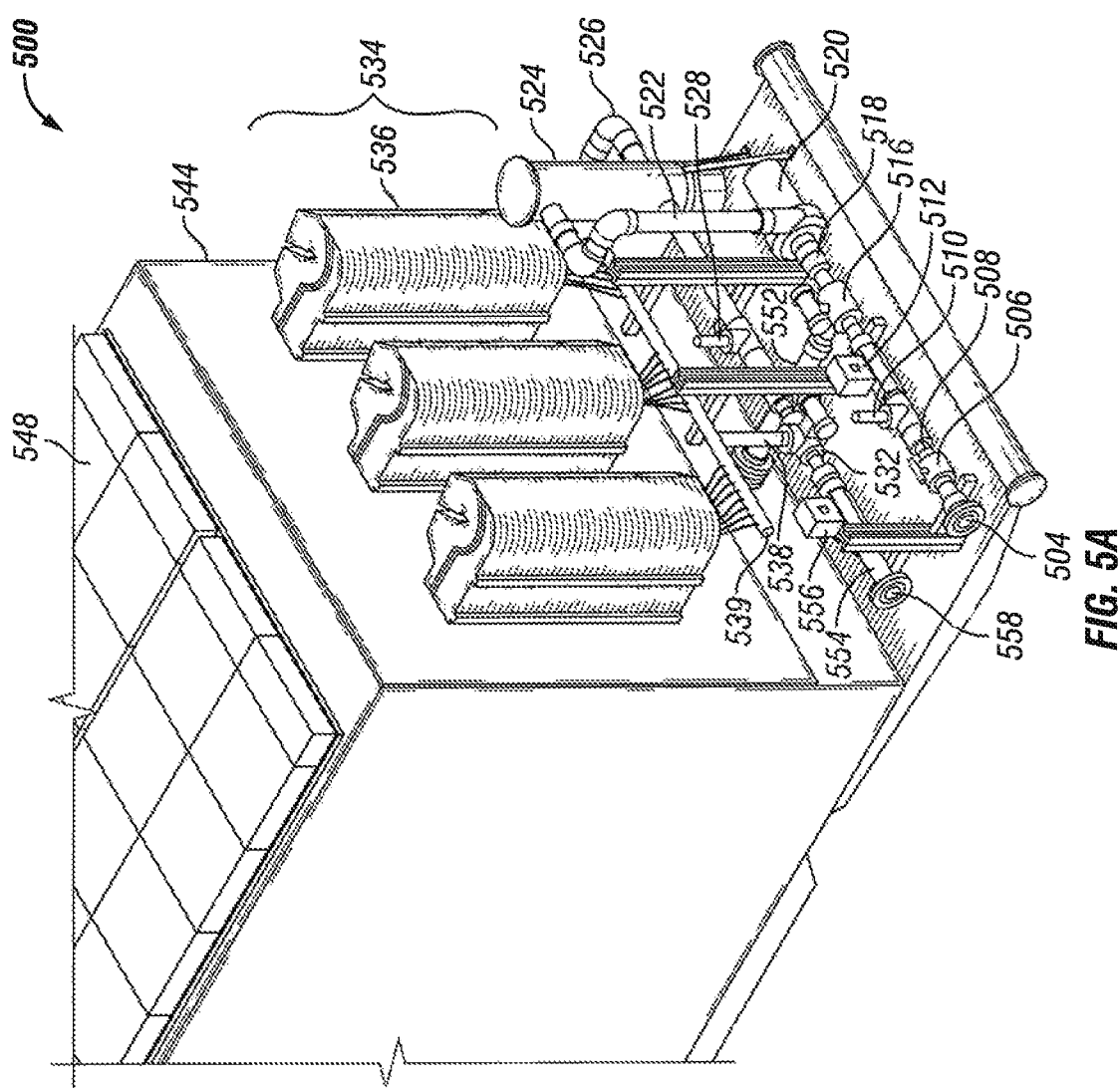
FIG. 5A illustrates a drawing of a front, left perspective view of an exemplary system for spray evaporation of water according to an embodiment of the present invention, showing inlet, recycle and discharge piping.
Figure 5B:
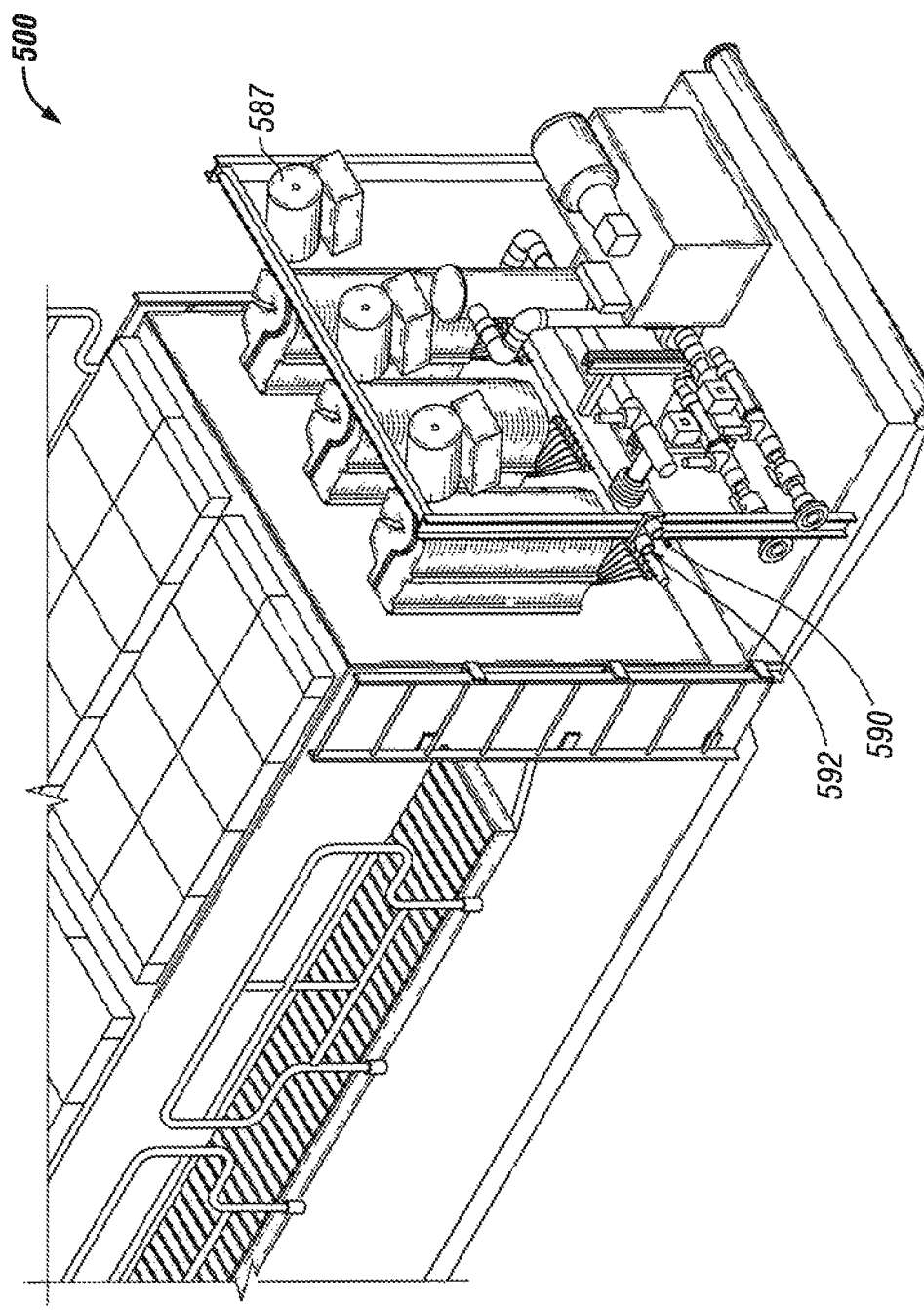
FIG. 5B illustrates a drawing of a front, left perspective view of an exemplary system for spray evaporation of water according to an embodiment of the present invention, showing hydraulic air blowers with hydraulic drive system and reservoir.
Figure 5C:
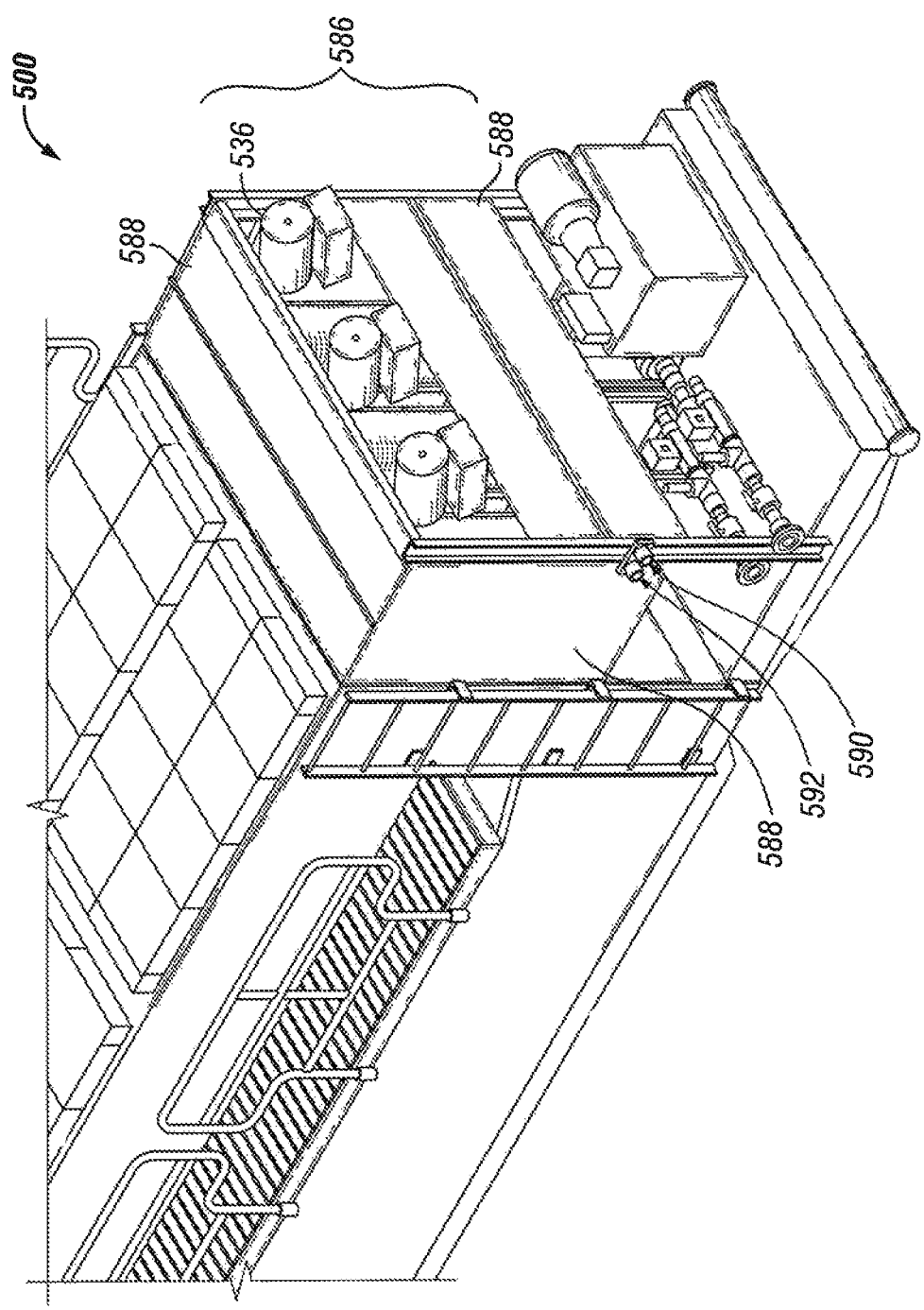
FIG. 5C illustrates a drawing of a front, left perspective view of an exemplary system for spray evaporation of water according to an embodiment of the present invention, showing an air ducting plenum to force blower inlet air through heaters.
Figure 5D:
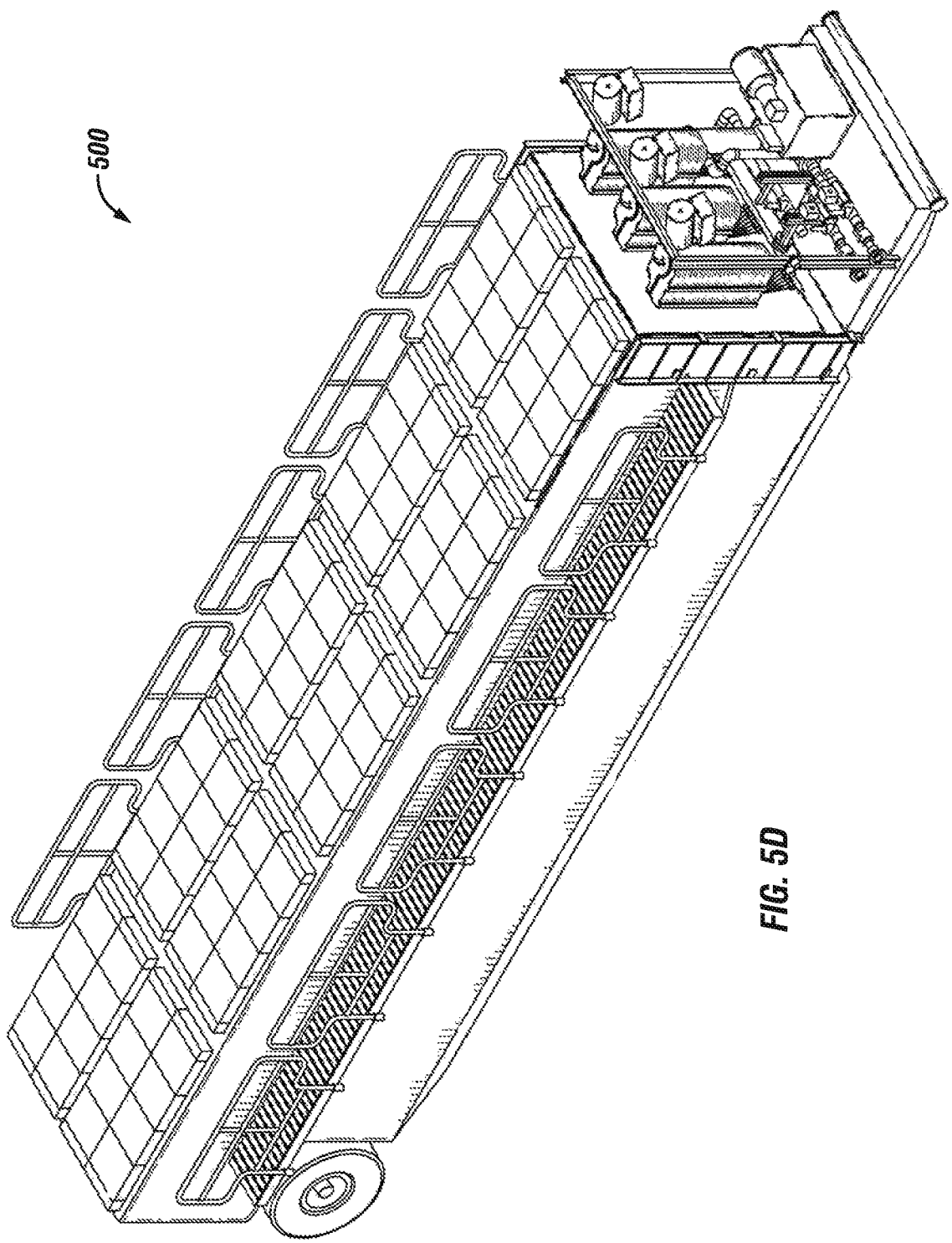
FIG. 5D illustrates a drawing of an upper, left perspective view of an exemplary system for spray evaporation of water according to an embodiment of the present invention, showing optional catwalks and ladders to access demister system.

As shown in FIG. 1, the demister element 145, 345 forms an upper portion and a side portion of the cuboid shape of the container 139, 339. In an embodiment, the demister element 145, 345 (e.g., upper portion) may be a cuboid shape about 8-feet wide by about 16-feet long and from about 6-inches thick to about 12-inches thick (and any range or value there between). In an embodiment, the demister element 145, 345 (e.g., side portion) may be a cuboid shape about 6-feet wide by about 8-feet long and from about 6-inches thick to about 12-inches thick (and any range or value there between).

In an embodiment, the demister element 145, 345 (e.g., upper portion) may be a cuboid shape about 8-feet wide by about 16-feet long and about 6-inches thick. In an embodiment, the demister element 145, 345 (e.g., side portion) may be a cuboid shape about 6-feet wide by about 8-feet long and about 6-inches thick.

The evaporated water outlet 146, 346 comprises a plurality of outlet pores (not shown) in the demister element 145, 345.

In an embodiment, the system 100 may further comprise a first sacrificial anode 197 and a second sacrificial anode 198 for galvanic cathode (corrosion) protection of the container 139, 339. The first sacrificial anode 197 and the second sacrificial anode 198 may be disposed in the sump (bottom) of the container 139, 339.

The first sacrificial anode 197 and the second sacrificial anode 198 may be made of any suitable galvanic anode material. For example, suitable galvanic anode materials include, but are not limited to, aluminum, magnesium and zinc. In an embodiment, the first sacrificial anode 197 and the second sacrificial anode 198 may be made of aluminum and/or zinc.

Air Blower and Heater System

In an embodiment, the system 100, 200, 300 may further comprise an air blower 142, 242. In an embodiment, air flow from the air blower 142 disperses the water droplets from the spray nozzle 138, 338. In an embodiment, the air blower 142 is disposed through a wall of the container 139, 339 such that air flow from the air blower 142 is counter to the water droplets from the spray nozzle 138, 338.

In an embodiment, the air blower 142 is disposed through a wall of the container 139, 339 such that air flow from the air blower 142 is crossways to the water droplets from the spray nozzle 138, 338. In an embodiment, a wastewater to air ratio may range from about 550 gallons per minute (GPM)/about 150,000 cubic feet per minute (CFM) to about 800 GPM/60,000 CFM (and any range or value there between).

The air blower 142 may be any suitable axial blower. For example, a suitable air blower 142 is available from L.C. Eldridge Sales Co. In an embodiment, the air blower 142 may be a 95-inch Eldridge Model IC92S-3GD310-R3A fan from L.C. Eldridge Sales Co. In an embodiment, the air blower 142 may be a fixed or variable-speed air blower. In an embodiment, the air blower 142 may provide from about 60,000 CFM to about 150,000 CFM (and any range or value there between). In an embodiment, the air blower 142 may provide about 100,000 CFM.

In an embodiment, the system 100, 200, 300 may further comprise an air blower and heater system 141, 241, 341. For example, the air blower and heater system 141, 241, 341 may be disposed through a rear wall of the container 139, 339 when the spray nozzles 138', 138" of the spray system 134, 334 discharge toward the rear of the container 139, 339.

In an embodiment, the air blower and heater system 141, 241, 341 comprises an air blower 142 and an air heater 143. In an embodiment, an air flow outlet of the air heater 143 is fluidly connected to an air flow inlet of the air blower 142.

The air heater 143 may be any suitable heater. For example, the air heater is available from Maxon Corporation. In an embodiment, the air heater 143 may be a Maxon APX Line Burner (natural gas burner) from Maxon Corporation. In an embodiment, the air heater 143 may provide an air heating rate from about 0 million BTU per hour to about 4 million BTU per hour (and any range or value there between).

In an embodiment, the air heater 143 may have one or more combustion air blower(s). In an embodiment, the combustion air blower may be about 1.5 horsepower (HP).

Optional Air Deflector, Diffusers, Tapered Inserts and Vanes

When the hot air from the air blower and preheater 141 is introduced into an air inlet of the container 139 (i.e., evaporation module), the air flow may not have an even distribution across the container 139. Further, the water spray may not be uniform in the container 139 and, as a result, the degree of saturation in the air may be reduced. To improve the evaporation rate, the air and water droplet mixing must be improved to assure complete transfer of water from the liquid phase to the vapor phase. One way to achieve this is to use a series of deflectors, diffusers, tapered inserts and/or vanes to promote mixing.

In an embodiment, the system 100 may further comprise a deflector and/or a diffuser 199a, wherein the deflector and/or diffuser 199a may be disposed within the container 139.

The deflector and/or diffuser 199a may be any suitable deflector or diffuser capable of achieving the desired degree of mixing in the container 139. For example, a suitable deflector or diffuser 199a includes, but is not limited to, a flat metal sheet, an inclined metal sheet, a perforated metal sheet, a solid metal sheet, and combinations thereof to create a mixing vane effect.

The deflector and/or diffuser 199a may be any suitable size and shape.

In an embodiment, the size and location of the deflector and/or diffuser 199a may be adjusted to achieve optimal performance based on air temperature, altitude, humidity, and other factors. In an embodiment, the deflectors and/or diffusers 199a are located to redirect the air flow from the center of the container 139 to the walls of the container 139.

In an embodiment, the deflector and/or diffuser 199a may be mounted in the container 139 to allow adjustments during operation to achieve optimal performance based on air temperature, altitude, humidity, and other factors.

In an embodiment, the system 100 further comprises a tapered insert 199b, wherein the tapered 199b may be disposed within the container 139.

The tapered insert 199b may be any suitable tapered insert capable of achieving the desired degree of mixing in the container 139. For example, a suitable tapered insert 199b includes, but is not limited to, a flat metal sheet, an inclined metal sheet, a perforated metal sheet, a solid metal sheet, and combinations thereof to create a mixing vane effect.

The tapered insert 199b may be any suitable size and shape.

In an embodiment, the size and location of the tapered insert 199b may be adjusted to achieve optimal performance based on air temperature, altitude, humidity, and other factors. In an embodiment, the tapered insert 199b may be located to redirect the air flow from the walls of the container 139 to the center of the container 139.

In an embodiment, the tapered insert 199b may be mounted in the container 139 to allow adjustments during operation to achieve optimal performance based on air temperature, altitude, humidity, and other factors.

In an embodiment, the system 100 further comprises a vane 199c, wherein the vane may be disposed within the container 139.

The vane 199c may be any suitable vane capable of achieving the desired degree of mixing in the container 139. For example, a suitable vane 199c includes, but are not limited to, a metal and/or wood flat sheet, an inclined metal and/or wood sheet, a perforated metal and/or wood sheet, a solid metal and/or wood sheet, and combinations thereof to create a mixing vane effect.

The vane 199c may be any suitable size and shape.

In an embodiment, the size and location of the vane 199c may be adjusted to achieve optimal performance based on air temperature, altitude, humidity, and other factors. In an embodiment, the vane 199c extends across a cross-section (e.g., diameter) of the container 139.

Recycle System

In an embodiment, the system 100, 200 may further comprise a second (recycle) shut-off valve 153, 253, a second (recycle) pump 156, 256 and a second (recycle) valve 166, 266. An outlet of the sump (bottom) of the container 139, 339 may be connected to an inlet of a second (recycle) pump 156 via pipe 154. An outlet of the second (recycle) pump 156 may be connected to an inlet of a second manifold 162 via a pipe 158. A first outlet of the second manifold 162 may be connected to a second (recycle) valve 166 discussed below.

In an embodiment, the system 100, 200 may further comprise a second (recycle) shut-off valve 153, 253. The second (recycle) shut-off valve 153 may be any suitable shut-off valve. Suitable second (recycle) shut-off valves 153 include, but are not limited to, ball valves and butterfly valves. For example, a suitable second (recycle) shut-off valve 153 is available from GF Piping Systems. In an embodiment, the second (recycle) shut-off valve 153 may be a GF Piping Systems PVC Wafer Style Butterfly Valve from GF Piping Systems. In an embodiment, the second (recycle) shut-off valve 153 may be automatic or manual. In an embodiment, the second (recycle) shut-off valve 153 may be normally CLOSED.

In an embodiment, the second (recycle) shut-off valve 153 has 4-inch connections.

The second (recycle) shut-off valve 153 may be made of any suitable corrosion-resistant material. The second (recycle) shut-off valve 153 may be made of any suitable corrosion-resistant metals or plastics. Suitable metals include, but are not limited to, plastic-coated carbon steel, stainless steel, Hastelloy® alloy, Monel® alloy and combinations thereof; and suitable plastics include, but are not limited to, ethylene propylene diene monomer (EPDM) rubber, polyvinylchloride (PVC) and combinations thereof. In an embodiment, the second (recycle) shut-off valve 153 (wetted components) may be made of polyvinyl chloride (PVC) and ethylene propylene diene monomer (EPDM) rubber.

In an embodiment, the system 100, 200 may further comprise a second (recycle) pump 156, 256. The second (recycle) pump 156 may be any suitable pump. Suitable second (recycle) pumps 156 include, but are not limited to, centrifugal pumps. For example, a suitable second (recycle) pump 156 is available from Ampco Pumps Company. In an embodiment, the second (recycle) pump 156 may be an Ampco Z-Series Centrifugal Pump from Ampco Pumps Company. In an embodiment, the second (recycle) pump 156 may be a 15 HP centrifugal pump.

In an embodiment, the second (recycle) pump 156 may have a 4-inch inlet (suction) connection and a 3-inch outlet (discharge) connection.

The second (recycle) pump 156 may be made of any suitable corrosion-resistant material. The second (recycle) pump 156 may be made of any suitable corrosion-resistant metals or plastics. Suitable metals include but are not limited to, stainless steel, super-duplex stainless steel, AL-6XN alloy, Ni—Al—Brz alloy, Hastelloy® alloy, Monel® alloy and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. For example, the second (recycle) pump 156, including internal wetted components, may be made of stainless steel, super-duplex stainless steel, AL-6XN alloy, Ni—Al—Brz alloy, Hastelloy® alloy, Monel® alloy or FRD. In an embodiment, the second (recycle) pump 156 (wetted components) may be made of Ni—Al-Brz alloy.

An outlet of the second (recycle) pump 156 may be connected to an inlet of a second manifold 162 via pipe 158.

In an embodiment, the system 100, 200 may further comprise a second (recycle) valve 166, 266. The second (recycle) valve 166 may be any suitable switching valve. Suitable second (recycle) valves 166 include, but are not limited to, ball and butterfly valves. For example, a suitable second (recycle) valve 166 is available from GF Piping Systems. In an embodiment, the second (recycle) valve 166 may be a GF Piping Systems Type 563 Electric Actuated Butterfly Valve from GF Piping Systems. In an embodiment, the second (recycle) valve 166 may be automatic or manual. In an embodiment, the second (recycle) valve 166 may be electric or pneumatic actuation. In an embodiment, the second (recycle) valve 166 may be normally CLOSED.

In an embodiment, the second (recycle) valve 166 has 4-inch connections.

In an embodiment, the system 100, 200 may further comprise a third limit switch 167, 267 and a fourth limit switch 168, 268. In an embodiment, the third limit switch 167 confirms that the second (recycle) valve 166 is CLOSED; and the fourth limit switch 168 confirms that the second (recycle) valve 166 is OPEN.

A first outlet to the second manifold 162 may be connected to a second inlet to the first manifold 128.

The pipe 128, 158, 162 may be made of any suitable corrosion-resistant pipe. The pipe 128, 158, 162 may be any suitable corrosion-resistant metals or plastics. Suitable metals include but are not limited to, plastic-coated carbon steel, stainless steel, super-duplex stainless steel, AL-6XN alloy, Ni—Al—Brz alloy, Hastelloy® alloy, Monel® alloy and combinations thereof and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the pipe 128, 158, 162 may be made of plastic-coated carbon steel. In an embodiment, the pipe 128, 158, 162 may be made of Plasite 7159 HAR-coated carbon steel. In an embodiment, the pipe 128, 158, 162 may be made of 316 stainless steel.

In an embodiment, the pipe 128, 158, 162 may be 4-inch pipe.

Discharge System

In an embodiment, the system 100, 200 may further comprise a check valve 164, 264, a third discharge valve 169, 269 and a third (discharge) shut-off valve 174, 274. A second outlet of the second manifold 162 may be connected to an inlet of a check valve 164 or an inlet of a third (discharge) valve 169.

In an embodiment, the system 100, 200 may further comprise a check valve 164, 264. The check valve 164 may be any suitable check valve. Suitable check valves 164 include, but are not limited to, one-way valves. A second outlet of the second manifold 162 may be connected to an inlet of a check valve 164; and an outlet of the check valve 164 may be connected to an inlet of a third (discharge) valve 169.

In an embodiment, the system 100, 200 may further comprise a third (discharge) valve 169, 269. The third (discharge) valve 169 may be any suitable switching valve. Suitable discharge valves include, but are not limited to, ball valves. For example, a suitable third (discharge) valve 169 is available from GF Piping Systems. In an embodiment, the third (discharge) valve 169 may be a GF Piping Systems Type 546 Electric Actuated Ball Valve from GF Piping Systems. In an embodiment, the third (discharge) valve 169 may be automatic or manual. In an embodiment, the third (discharge) valve 169 may be electric or pneumatic actuation. In an embodiment, the third (discharge) valve 169 may be normally CLOSED.

In an embodiment, the third (discharge) valve 169 may have 2-inch connections.

In an embodiment, the system 100, 200 may further comprise a fifth limit switch 170, 270 and a sixth limit switch 171, 271. In an embodiment, the fifth limit switch 170, 270 confirms that the third (discharge) valve 169 is OPEN; and the sixth limit switch 171, 271 confirms that the third (discharge) valve 169 is CLOSED.

A second outlet of the second manifold 162 may be connected to an inlet of a third (discharge) valve 169; and an outlet of the third (discharge) valve 169 may be connected to an inlet of a second (discharge) shut-off valve 174 via pipe 172.

In an embodiment, the system 100, 200 may further comprise a third (discharge) shut-off valve 174, 274. The third (discharge) shut-off valve 174 may be any suitable shut-off valve. Suitable third (discharge) shut-off valves 174 include, but are not limited to, ball valves and butterfly valves. For example, a suitable third (discharge) shut-off valve 174 is available from GF Piping Systems. In an embodiment, the third (discharge) shut-off valve 174 may be a GF Piping Systems Type 546 PVC Ball Valve from GF Piping Systems. In an embodiment, the third (discharge) shut-off valve 174 may be automatic or manual. In an embodiment, the third (discharge) shut-off valve 174 may be normally CLOSED.

In an embodiment, the third (discharge) shut-off valve 174 may have 2-inch connections.

The third (discharge) shut-off valve 174 may be made of any suitable corrosion-resistant material. The third (discharge) shut-off valve 174 may be made of any suitable corrosion-resistant metals or plastics. Suitable metals include, but are not limited to, plastic-coated carbon steel, stainless steel, Hastelloy® alloy, Monel® alloy and combinations thereof; and suitable plastic include, but are not limited to, ethylene propylene diene monomer (EPDM) rubber, polyvinylchloride (PVC) and combinations thereof. In an embodiment, the third (discharge) shut-off valve 174 (wetted components) may be made of polyvinyl chloride (PVC) and ethylene propylene diene monomer (EPDM) rubber.

An outlet of the third (discharge) valve 169 may be connected to an inlet of the third (discharge) shut-off valve 174 via pipe 172. An outlet of the third (discharge) shut-off valve 174 may be connected to a discharge outlet 176 via pipe 175.

The pipe 172, 175 may be made of any suitable corrosion-resistant pipe. The pipe 172, 175 may be made of any suitable corrosion-resistant metals or plastics. Suitable metals include, but are not limited to, plastic-coated carbon steel, stainless steel, super-duplex stainless steel, AL-6XN alloy, Ni—Al—Brz alloy, Hastelloy® alloy, Monel® alloy and combinations thereof and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the pipe 172, 175 may be made of plastic-coated carbon steel. In an embodiment, the pipe 172, 175 may be made of Plasite 7159 HAR-coated carbon steel. In an embodiment, the pipe 172, 175 may be made of 316 stainless steel.

In an embodiment, the pipe 172, 175 may be 2-inch pipe.

Optional Sensors and Meters

In an embodiment, the system 100, 200 may further comprise a first flow meter 122, 222, a first temperature sensor 130, 230, a first conductivity meter 131, 231, an optional second conductivity meter 132, 232 (not shown), and/or a second flow meter 173, 273.

The first flow meter 122 may be fluidly connected to pipe 120.

The first flow meter 122 may be any suitable flow meter. Suitable first flow meters 122 include, but are not limited to, magnetic, paddlewheel, ultrasonic vortex and insertion-type vortex flow meters. For example, a suitable first flow meter 122 is available from Georg Fischer Signet LLC. In an embodiment, the first flow meter 122 may be a Signet 2536 Rotor-X Paddlewheel Flow Sensor from Georg Fischer Signet LLC. In an embodiment, the first flow sensor 122 may be electrically connected to the PLC or computing device 600.

The first temperature sensor 130 may be fluidly connected to the first manifold 128.

The first temperature sensor 130 may be any suitable temperature measuring device. For example, a suitable first temperature sensor 130 is available from Ashcroft Inc. In an embodiment, the first temperature sensor 130 may be a Bi-Metallic Dial Thermometer from Ashcroft Inc. In an embodiment, the first temperature sensor 130 may be electrical or manual.

The first conductivity meter 131 may be fluidly connected to the first manifold 128; and the optional second conductivity meter 132 (not shown) may be fluidly connected to the first manifold 128.

The first conductivity meter 131 monitors the conductivity of the inlet (feed) or condensed (recycled) wastewater from the external wastewater source. If the first conductivity meter 131 measures a predetermined minimum conductivity (e.g., indicating presence of oil in feed water), the system 100 is shut off.

The first conductivity meter 131 may be any suitable conductivity meter. For example, a suitable first conductivity meter 131 is available from Cole-Parmer Instrument Company. In an embodiment, the first conductivity meter 131 may be a Model ML-19504-04 Toroidal Conductivity Sensor from Cole-Parmer Instrument Company. In an embodiment, the first conductivity sensor 131 may be electrically connected to the PLC or computing device 600. In an embodiment, the first conductivity sensor 131 may have a range from about 0 µS/cm to about 1,000,000 µS/cm (and any range or value there between).

The optional second conductivity meter 132 (not shown) monitors the conductivity of the inlet (feed) or condensed (recycle) wastewater from the external wastewater source. If the second conductivity meter 132 indicates the condensed wastewater (brine) has reached a predetermined maximum conductivity, the third (discharge) valve 169 is switched to the OPEN position, the third (discharge) shut-off valve 174 is switched to the OPEN position, and the second (recycle) valve 166 is switched to the CLOSED position.

The optional second conductivity meter 132 may be any suitable conductivity meter. For example, a suitable first conductivity meter 132 is available from Cole-Parmer Instrument Company. In an embodiment, the first conductivity meter 132 may be a Model ML-19504-04 Toroidal Conductivity Sensor electrically connected to a Model ML-94785-12 Process Meter from Cole-Parmer Instrument Company. In an embodiment, the second conductivity sensor 132 may be electrically connected to the PLC or computing device 600. In an embodiment, the second conductivity sensor 132 may have a range from about 0 µS/cm to about 1,000,000 µS/cm (and any range or value there between).

The second flow meter 173 may be fluidly connected to pipe 172. The second flow meter 173 monitors the flow rate of the discharge to the discharge outlet 176.

The second flow meter 173 may be any suitable flow meter. Suitable second flow meters 173 include, but are not limited to, magnetic, paddlewheel, ultrasonic vortex and insertion-type vortex flow meters. For example, a suitable second flow meter 173 is available from Georg Fischer Signet LLC. In an embodiment, the second flow meter 173 may be a Signet 2536 Rotor-X Paddlewheel Flow Sensor from Georg Fischer Signet LLC. In an embodiment, the second flow meter 173 may be electrically connected to the PLC or computing device 600.

Optional Limit/Level, Pressure and Temperature Switches

In an embodiment, the system 100, 200 may further comprise a first pressure switch 110, 210, an air temperature sensor 140, 240, a first high differential pressure switch 147, 247, a second high, high differential pressure switch 148, 248, a first high, high limit switch 149, 249, a low limit switch 150, 250, a high limit switch 151, 251, a second high, high limit switch 152, 252, and a second pressure switch 159, 259.

The first pressure switch 110 monitors pressure of inlet wastewater to the first (feed) pump 118. The first pressure switch 110 may be any suitable pressure switch. For example, a suitable first pressure switch 110 is available from AutomationDirect.com Inc. In an embodiment, the first pressure switch 110 may be a ProSense® MPS25 Series Mechanical Pressure Switch from AutomationDirect.com Inc.

The first pressure switch 110 may be fluidly connected to the pipe 108.

The first high differential pressure switch 147 monitors the air pressure in the container 139, 339. If the first high differential pressure switch 147 is activated, the air blower 142 is operating. In an embodiment, the first high differential pressure switch 147 may be set to +/−0.15 inches water column.

The first high differential pressure switch 147 may be any suitable differential pressure sensor. For example, a suitable first high differential pressure switch 147 is available from Dwyer Instruments Inc. In an embodiment, the first high differential pressure switch 147 may be a Series 3000 Photohelic Differential Pressure Gage from Dwyer Instruments Inc. In an embodiment, the first high differential pressure switch 147 has a range from about 0 to about 0.5 inches water column.

The first high differential pressure switch 147 may be fluidly connected to the container 139, 339.

The second high, high differential pressure switch 148 also monitors air pressure in the container. If the second high, high differential pressure switch 148 is activated, the mist arresting system 144 may be blocked due to flooding or scale build-up. In an embodiment, the second high, high differential pressure switch 148 may be set to about +/−0.40 inches water column.

The second high, high differential pressure switch 148 may be any suitable differential pressure sensor. For example, a suitable second high, high differential pressure switch 148 is available from Dwyer Instruments Inc. In an embodiment, the second high, high differential pressure sensor 148 may be a Series 3000MR Photohelic Differential Pressure Gage from Dwyer Instruments Inc. In an embodiment, the second high, high differential pressure switch 148 may have a range from about 0 to about 0.5 inches water column.

The second high, high differential pressure switch 148 may be fluidly connected to the container 139, 339.

The first high, high limit switch 149, low limit switch 150 and high limit switch 151 monitor various water levels in the sump (bottom) of the container 139, 339. The second high, high limit switch 152 monitors water levels in a secondary containment.

The high, high limit switches 149, 152, low limit switch 150, and high limit switch 151 may be any suitable water level switches. Suitable water level switches include, but are not limited to, capacitive proximity, float, magnetic and vibrating fork. For example, the high, high limit switches 149, 152, low limit switch 150, and high limit switch 151 are available from AutomationDirect.com Inc. In an embodiment, the high, high limit switches 149, 152, low limit switch 150, and high limit switch 151 may be TU Series Model M18 Round Inductive Proximity Sensors from AutomationDirect.com Inc.

The first high, high limit switch 149, low limit switch 150, and high limit switch 151 may be fluidly connected near the sump (bottom) of the container 139, 339.

The second high, high limit switch 152 may be fluidly connected outside the container 139, 339 for monitoring water levels in the secondary containment.

The second pressure switch 159 monitors pressure of condensed (recycle) wastewater from the second (recycle) pump 156. The second pressure switch 159 may be any suitable pressure switch. For example, a suitable second pressure switch 159 is available from AutomationDirect.com Inc. In an embodiment, the first pressure switch 159 may be a ProSense® MPS25 Series Mechanical Pressure Switch from AutomationDirect.com Inc.

The second pressure switch 159 may be fluidly connected to pipe 158.

In an embodiment, a pressure gauge 160 displays the pressure of the condensed (recycle) wastewater from the second (recycle) pump 156. The pressure gauge 160 may be fluidly connected to pipe 158.

Optional Acid Conditioning System

In an embodiment, the system 100 may further comprise an optional acid conditioning system 177. The acid conditioning system 177 comprises an acid tote 178 and an acid metering pump 180.

The acid may be any suitable acid. Suitable acids include, but are not limited to, hydrochloric acid and sulfuric acid. In an embodiment, the acid may be hydrochloric acid (20 baume). In an embodiment, the acid may be sulfuric acid (98%). In an embodiment, the desired pH of the wastewater is about 6.5 or below to minimize calcium carbonate scaling. In an embodiment, the desired pH of the wastewater may be above 6.5 if a scale inhibitor is added to minimize carbonate and non-carbonate scaling. In an embodiment, the amount of acid solution added varies, depending on inlet water conditions (e.g., pH, alkalinity).

In an embodiment, the desired pH of the wastewater may be above 6.5 if a scale inhibitor is added to minimize carbonate and non-carbonate scaling.

An outlet of the acid tote 178 may be fluidly connected to an inlet of the acid metering pump 180 via tubing 179; and an outlet of the acid metering pump 180 is fluidly connected to the container 139, 339 or to the pipe 154 (shown) via tubing 181.

The acid tote 178 may be any suitable acid tote or other bulk chemical storage unit. Suitable acid totes include, but are not limited to, an industry standard shipping tote. For example, a suitable acid tote 178 is available from National Tank Outlet. In an embodiment, the acid tote 178 may be a 275 gallon or a 330 gallon industry standard shipping tote. In an embodiment, the acid tote 178 may be a 55 gallon drum.

The acid metering pump 180 may be any suitable acid metering pump. Suitable acid metering pumps include, but are not limited to, electronic diaphragm, peristaltic and positive displacement pumps. For example, a suitable acid metering pump 180 is available from Anko Products, Inc. In an embodiment, the acid metering pump 180 may be a self-priming peristaltic pump from Anko Products, Inc. In an embodiment, the acid metering pump 180 may be a Mityflex Model 907 self-priming peristaltic pump from Anko Products, Inc.

The tubing 179, 181 may be made of any suitable corrosion-resistant tubing. The tubing 179, 181 may be made of any suitable corrosion-resistant metals or plastics. Suitable metals include but are not limited to, AL-6XN alloy, Hastelloy® alloy, Monel® alloy, and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. For example, suitable tubing 179, 181 may be made of Teflon® PFA or PTFE.

In an embodiment, the acid conditioning system 177 may further comprise an acid flow meter (not shown). The acid flow meter may be fluidly connected to tubing 181. The acid flow meter measures the flow rate of the acid solution.

The acid flow meter may be any suitable flow meter. Suitable acid flow meters include, but are not limited to, paddlewheel, ultrasonic vortex and insertion-type vortex flow meters. For example, a suitable acid flow meter is available from ProMinent. In an embodiment, the acid flow meter may be a Model DulcoFlow DFMa from ProMinent with built-in signal transmission capability.

Optional Bactericide Conditioning System

In an embodiment, the system 100 may further comprise an optional bactericide conditioning system 182. The bactericide conditioning system 182 comprises a bactericide tote 183 and a bactericide metering pump 185.

The bactericide may be any suitable bactericide. Suitable bactericide includes, but is not limited to, bleach, bromine, chlorine dioxide (generated), 2,2-dibromo-3-nitrilo-propionade (DBNPA), glutaraldehyde, isothiazolin (1.5%) and ozone (generated). In an embodiment, the bactericide may be selected from the group consisting of bleach (12.5%), bromine, chlorine dioxide (generated), DBNPA (20%), glutaraldehyde (50%), isothiazolin (1.5%) and ozone (generated). In an embodiment, the desired bactericide concentration is from about 10 ppm to about 1000 ppm (and any range or value there between). The amount of bactericide solution added to the wastewater varies, depending on inlet water condition.

An outlet of the bactericide tote 183 may be fluidly connected to an inlet of the bactericide metering pump 185 via tubing 184; and an outlet of the bactericide metering pump 185 may be fluidly connected to the container 139, 339 or to the pipe 154 (shown) via tubing 186.

The bactericide tote 183 may be any suitable bactericide tote or other bulk chemical storage unit. Suitable bactericide totes include, but are not limited to, an industry standard shipping tote. For example, a suitable bactericide tote 183 is available from National Tank Outlet. In an embodiment, the bactericide tote 183 may be a 275 gallon or 330 gallon industry standard shipping tote. In an embodiment, the bactericide tote 183 may be a 55 gallon drum or a 5 gallon pail.

In an alternative embodiment, the bactericide tote 183 may be replaced with a suitable bactericide generating apparatus (not shown). For example, a suitable bactericide apparatus is available from Miox Corporation. In an embodiment, the bactericide generating apparatus (not shown) may be a Model AE-8 from Miox Corporation.

The bactericide metering pump 185 may be any suitable bactericide metering pump. Suitable bactericide metering pumps include, but are not limited to, electronic diaphragm, peristaltic and positive displacement pumps. For example, a suitable bactericide metering pump 185 is available from Anko Products, Inc. In an embodiment, the bactericide metering pump 185 may be a self-priming peristaltic pump from Anko Products, Inc. In an embodiment, the bactericide metering pump 185 may be a Mityflex Model 907 self-priming peristaltic pump from Anko Products, Inc.

The tubing 184, 186 may be made of any suitable corrosion-resistant tubing. The tubing 184, 186 may be made of any suitable corrosion-resistant metals or plastics. Suitable metals include, but are not limited to, AL-6XN alloy, Hastelloy® alloy, Monel® alloy and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the tubing 184, 186 may be made of Teflon® PFA or PTFE.

In an embodiment, the bactericide conditioning system 182 may further comprise an optional bactericide flow meter (not shown). The bactericide flow meter may be fluidly connected to tubing 186. The bactericide flow meter measures the flow rate of the bactericide solution.

The bactericide flow meter may be any suitable flow meter. Suitable bactericide flow meters include, but are not limited to, paddlewheel, ultrasonic vortex and insertion-type vortex flow meters. For example, a suitable bactericide flow meter is available from ProMinent. In an embodiment, the bactericide flow meter may be a Model DulcoFlow DFMa from ProMinent with built-in signal transmission capability.

Optional Scale Inhibition Conditioning System

In an embodiment, the system 100 may further comprise an optional scale inhibition conditioning system 187. The scale inhibition conditioning system 187 comprises a scale inhibition tote 188 and a scale inhibition metering pump 190.

The scale inhibitor may be any suitable scale inhibitor or blend of scale inhibitors. A suitable scale inhibitor includes, but is not limited to, inorganic phosphates, organophosphorous compounds and organic polymers. In an embodiment, the scale inhibitor may be selected from the group consisting of organic phosphate esters, polyacrylates, phosphonates, polyacrylamides, polycarboxylic acids, polymalates, polyphosphincocarboxylates, polyphosphates and polyvinylsylphonates. In an embodiment, the desired scale inhibitor concentration is from about 10 ppm to about 100 ppm (and any range or value there between). In an embodiment, the desired scale inhibitor concentration is from about 2 ppm to about 20 ppm (and any range or value there between). The amount of scale inhibitor solution added to the wastewater varies, depending on inlet water condition.

An outlet of the scale inhibition tote 188 may be fluidly connected to an inlet of the scale inhibition metering pump 190 via tubing 189; and an outlet of the scale inhibition metering pump 190 may be fluidly connected to container 139, 339 (shown) or to pipe 154 via tubing 191.

The scale inhibition tote 188 may be any suitable scale inhibition tote or other bulk chemical storage unit. Suitable scale inhibition totes include, but are not limited to, an industry standard shipping tote. For example, a suitable scale inhibition tote 188 is available from National Tank Outlet. In an embodiment, the scale inhibition tote 188 may be a 275 gallon or 330 gallon industry standard shipping tote. In an embodiment, the scale inhibition tote 188 may be a 55 gallon drum or a 5 gallon pail.

The scale inhibition metering pump 190 may be any suitable scale inhibitor metering pump. Suitable scale inhibition metering pumps include, but are not limited to, electronic diaphragm, peristaltic and positive displacement pumps. For example, a suitable scale inhibition metering pump 190 is available from Anko Products, Inc. In an embodiment, the scale inhibition metering pump 190 may be a self-priming peristaltic pump from Anko Products, Inc. In an embodiment, the scale inhibition metering pump 190 may be a Mityflex Model 907 self-priming peristaltic pump from Anko Products, Inc.

The tubing 189, 191 may be made of any suitable corrosion-resistant tubing. The tubing 189, 191 may be made of any suitable corrosion-resistant metals or plastics. Suitable metals include but are not limited to, plastic-coated carbon steel, stainless steel, super-duplex stainless steel, AL-6XN alloy, Hastelloy® alloy, Monel® alloy and combinations thereof and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the tubing 189, 191 may be made of Teflon® PFA or PTFE.

In an embodiment, the scale inhibition conditioning system 187 may further comprise an optional scale inhibition flow meter (not shown). The scale inhibition flow meter may be fluidly connected to tubing 191. The scale inhibition flow meter measures the flow rate of the scale inhibitor solution.

The scale inhibitor flow meter may be any suitable flow meter. Suitable scale inhibitor flow meters include, but are not limited to, paddlewheel, ultrasonic vortex and insertion-type vortex flow meters. For example, a suitable scale inhibitor flow meter is available from ProMinent. In an embodiment, the scale inhibitor flow meter may be a Model DulcoFlow DFMa from ProMinent with built-in signal transmission capability.

Optional Defoamer System

In an embodiment, the system 100 may further comprise an optional defoamer system 192. The defoamer system 192 comprises a defoamer tote 193 and a defoamer pump 195.

The defoamer may be any suitable defoamer. Suitable defoamer includes, but is not limited to, alcohols, glycols, insoluable oils, silicone polymers and stearates. In an embodiment, the defoamer may be selected from the group consisting of fatty alcohols, fatty acid esters, fluorosilicones, polyethylene glycol, polypropylene glycol, silicone glycols and polydimethylsiloxane. In an embodiment, the desired defoamer concentration is from about 10 ppm to about 100 ppm (and any range or value there between). In an embodiment, the desired defoamer concentration is from about 2 ppm to about 20 ppm (and any range or value there between). The amount of defoamer solution added to the wastewater varies, depending on inlet water condition.

An outlet of the defoamer tote 193 may be fluidly connected to an inlet of the defoamer metering pump 195 via tubing 194; and an outlet of the defoamer metering pump 195 may be fluidly connected to container 139, 339 (shown) or to pipe 154 via tubing 196.

The defoamer tote 193 may be any suitable defoamer tote or other bulk chemical storage unit. Suitable defoamer totes include, but are not limited to, an industry standard shipping tote. For example, a suitable defoamer tote 193 is available from National Tank Outlet. In an embodiment, the scale defoamer tote 193 may be a 275 gallon or 330 gallon industry standard shipping tote. In an embodiment, the defoamer tote 193 may be a 55 gallon drum or a 5 gallon pail.

The defoamer metering pump 195 may be any suitable defoamer metering pump. Suitable defoamer metering pumps include, but are not limited to, electronic diaphragm, peristaltic, and positive displacement pumps. For example, a suitable defoamer metering pump 195 is available from Anko Products, Inc. In an embodiment, the defoamer metering pump 195 may be a self-priming peristaltic pump from Anko Products, Inc. In an embodiment, the defoamer metering pump 195 may be a Mityflex Model 907 self-priming peristaltic pump from Anko Products, Inc.

The tubing 194, 196 may be made of any suitable corrosion-resistant tubing. The tubing 194, 196 may be made of any suitable corrosion-resistant metals or plastics. Suitable metals include, but are not limited to, plastic-coated carbon steel, stainless steel, super-duplex stainless steel, AL-6XN alloy, Hastelloy® alloy, Monel® alloy and combinations thereof and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the tubing 194, 196 may be made of Teflon® PFA or PTFE.

In an embodiment, the defoamer conditioning system 192 may further comprise an optional defoamer flow meter (not shown). The defoamer flow meter may be fluidly connected to tubing 196. The defomer flow meter measures the flow rate of the defoamer solution.

The defoamer flow meter may be any suitable flow meter. Suitable defoamer flow meters include, but are not limited to, paddlewheel, ultrasonic vortex and insertion-type vortex flow meters. For example, a suitable defoamer flow meter is available from ProMinent. In an embodiment, the defoamer flow meter may be a Model DulcoFlow DFMa from ProMinent with built-in signal transmission capability.

System for Spray Evaporation of Water Illustrating Alternative Embodiments

First Alternative Embodiment

A schematic of an exemplary system 400, 500 for spray evaporation of water according to another embodiment of the present invention is shown in FIGS. 4A-5D. The system 400, 500 comprises a wastewater inlet 404, 504, a pump 420, 520, an air blower 436, 536, a manifold 439, 539, a spray nozzle 442, 542, a container 444, 544, a demister element 448, 548, and a discharge outlet 458, 558.

In an embodiment, the system 400, 500 is capable of evaporating between about 2,000 to about 10,000 gallons of wastewater per day (see FIGS. 4A-5D). If a higher throughput is desired, a plurality of system 400, 500 may be used in parallel to treat the wastewater.

Inlet System

The wastewater inlet 404, 504 may be connected to an inlet of the first 3-way valve 416 via a pipe 408, 508. An outlet of the 3-way valve 416 may be connected to an inlet of the pump 420, 520 via a pipe 418, 518.

The wastewater inlet 404, 504 may be any suitable wastewater inlet that can handle up to about 40 psi. Suitable wastewater inlets include, but are not limited to, flange connections, cam-lock fittings and hammer unions. In an embodiment, the wastewater inlet 404, 504 is a flange connection (see FIGS. 5A-5D). The wastewater inlet 404, 504 permits connection to an external wastewater source via a wastewater suction header 402. The water inlet 404, 504 may be connected to the external wastewater source via a hose, pipe or other means customary in the art.

In an embodiment, the system 400, 500 may further comprise a first 3-way valve 416, 516. The first 3-way valve 416 may be any suitable 3-way valve. The first 3-way valve 416 may be automatic or manual. The first 3-way valve 416 may be electric or pneumatic actuation. Suitable 3-way valves include, but are not limited to, ball valves. For example, a suitable first 3-way valve 416 is available from GF Piping Systems. In an embodiment, the first 3-way valve 416 may be a Georg Fischer Type 543 3-Way Ball Valve from GF Piping Systems.

The pump 420, 520 may be any suitable pump. Suitable pumps include, but are not limited to, positive suction pumps. For example, a suitable pump 420, 520 is available from Ampco. In an embodiment, the pump 420, 520 may be a 3 to 5 horse power positive suction pump from MP Pumps.

The pump 420, 520 may be made of any suitable corrosion-resistant material. The pump 420, 520 may be made of any suitable corrosion-resistant metals or plastics. Suitable metals include, but are not limited to, cast iron, stainless steel, super-duplex stainless steel, AL-6XN alloy, Ni—Al—Brz alloy, Hastelloy® alloy, Monel® alloy and combinations thereof and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. For example, the pump 420, 520, including internal wetted components, may be made of stainless steel, super-duplex stainless steel, AL-6XN alloy, Ni—Al—Brz alloy, Hastelloy® alloy, Monel® alloy or FRD. In an embodiment, the pump 420, 520, including internal wetted components, may be made of super-duplex stainless steel. In an embodiment, pump 420, 520 may be made of cast iron if a shorter service life is acceptable.

The pipe 418, 518 may be made of any suitable corrosion-resistant pipe. The pipe 418, 518 may be any suitable metal or plastic pipe. Suitable metals include but are not limited to, plastic-coated carbon steel, stainless steel, super-duplex stainless steel, AL-6XN alloy, Ni—Al—Brz alloy, Hastelloy® alloy, Monel® alloy and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the pipe 418, 518 may be made of plastic-coated carbon steel. In an embodiment, the pipe 418, 518 may be made of Plasite 7159 HAR-coated carbon steel. In an embodiment, the pipe 418, 518 may be made of 316 stainless steel.

In an embodiment, the pipe 418, 518 may be 2-inch pipe.

An outlet of the pump 420, 520 may be connected to an inlet of the second 3-way valve 432, 532 via pipe(s) 422, 426, 522, 526. A first outlet of the second 3-way valve 432, 532 may be connected to a manifold 439, 539 via a pipe 438, 538.

A first outlet of the air blower 436' may be fluidly connected to a blower inlet of the manifold 439, 539 opposite a spray outlet of the manifold 439, 539, a second outlet of a second air blower 436" may be fluidly connected to a second blower inlet of the manifold 439, 539 opposed to a second spray outlet of the manifold 439, 539, and so on.

In an embodiment, each outlet of the air blower 436, 536 may be connected to its corresponding blower inlet of the manifold 439, 539 via tubing. In an embodiment, the tubing may be made of 316 stainless steel. In an embodiment, the tubing may be ⅜-inch tubing.

In an embodiment, each spray outlet of the pipe 438, 538 may be connected to an inlet of the spray nozzle 442 via tubing. In an embodiment, each spray outlet of the manifold 439, 539 comprises about 4 to about 6 tubes (see FIGS. 5A-5B). In an embodiment, the tubing may be made of 316 stainless steel. In an embodiment, the tubing may be ⅜-inch tubing.

In an embodiment, the system 400 may further comprise a second 3-way valve 432, 532. The second 3-way valve 432, 532 may be any suitable 3-way valve. The second 3-way valve 432, 532 may be automatic or manual. The second 3-way valve 432, 532 may be electric or pneumatic actuation. Suitable 3-way valves include, but are not limited to, ball valves. For example, a suitable second 3-way valve 432, 532 is available from GF Piping Systems. In an embodiment, the second 3-way valve 432, 532 may be a Georg Fischer Type 543 3-Way Ball Valve from GF Piping Systems. In an embodiment, the first 3-way valve 416 and the second 3-way valve 432, 532 may be the same type.

In an embodiment, the second 3-way valve 432, 532 may have 2-inch connections.

The air blowers 436, 536 may be any suitable air blower. The air blower 436, 536 may be automatic or manual. The air blowers 436, 536 may be electric or hydraulic (see FIGS. 4A-4C). Suitable air blowers include, but are not limited to, variable-speed air blowers. For example, a suitable plurality of air blowers 436, 536 is available from Curtec. In an embodiment, the air blower 436, 536 may be a variable-speed air blower capable of moving from about 1 k to about 35 k CFM from Curtec. In an embodiment, the air blower 436, 536 may be a variable-speed air blower capable of moving from about 3 k to about 18 k CFM total from Curtec. In an embodiment, the air blower 436, 536 may be a variable-speed air blower capable of moving from about 15 k to about 35 k CFM total from Curtec.

The pipe 422, 426, 438, 522, 526, 538 may be made of any suitable corrosion-resistant pipe. The pipe 422, 426, 438, 522, 526, 538 may be made of any suitable corrosion-resistant metals or plastics. Suitable metals include, but are not limited to, plastic-coated carbon steel, stainless steel, super-duplex stainless steel, AL-6XN alloy, Ni—Al—Brz alloy, Hastelloy® alloy, Monel® alloy and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the pipe 422, 426, 438, 522, 526, 538 may be made of plastic-coated carbon steel. In an embodiment, the pipe 422, 426, 438, 522, 526, 538 may be made of Plasite 7159 HAR-coated carbon steel. In an embodiment, the pipe 422, 426, 438, 522, 526, 538 may be made of 316 stainless steel.

In an embodiment, the pipe 422, 426, 438, 522, 526, 538 may be 2-inch pipe.

An outlet of the air blower 436, 536 may be connected to an inlet of the spray nozzle 442 via the manifold 439, 539, as discussed above. An outlet of the spray nozzle 442 discharges water droplets inside the container 444, 544. An upper portion or top side of the container 444, 544 is enclosed with the demister element 448, 548 to retain the water droplets inside the container 444, 544. The demister element 448, 548 is secured to and supported by the container 444, 544 in a manner customary in the art. In an embodiment, a water to air ratio may range from about 15 GPM/150,000 CFM to about 100 GPM/60,000 CFM (and any range or value there between). In an embodiment, the water to air ratio is about 16 GPM/127,000 CFM.

At least some of the water droplets evaporate to form water vapor. The water vapor passes through the demister element 448, 548 and out the evaporated water outlet 450. Any un-evaporated water is retained by the demister element 448, 548 and falls to the sump (bottom) of the container 444, 544.

The spray nozzle 442 may be any suitable spray nozzle. Suitable spray nozzles include, but are not limited to, rotary atomizers. For example, a suitable spray nozzle 442 is available from Ledebuhr Industries. In an embodiment, the spray nozzle 442 may be a variable-speed rotary atomizer from Ledebuhr Industries. In an embodiment, the rotary atomizer may be capable of high flow. In an embodiment, the rotary atomizer has a plurality of spray heads. In an embodiment, the rotary atomizer may be capable of about 8 gallon per minute (GPM) flow per spray head. In an embodiment, the rotary atomizer produces water droplet sizes from about 50 μm to about 300 μm. In an embodiment, the rotary atomizer may produce water droplet sizes from about 50 μm to about 150 μm. In an embodiment, the spray heads are positioned at the discharge point of the air blower. Alternatively, the spray heads are positioned inside the container.

The spray nozzle 442 may be made of any suitable corrosion-resistant material. The spray nozzle 442 may be made of any suitable corrosion-resistant metals. Suitable metals, include, but are not limited to, stainless steel, Hastelloy® alloy, Monel® alloy and combinations thereof. In an embodiment, the spray nozzle 442 (spray head) may be made of 316 stainless steel.

The container 444, 544 may be any suitable container. The container 444, 544 may be mobile or it may be stationary. Suitable containers include, but are not limited to, frac tanks (see FIGS. 5A-5C). For example, a suitable container 444, 544 is available from PCI Manufacturing, LLC. In an embodiment, the container 444, 544 may be an OPT FRAC, 500BBL, S/E, CIRC Line frac tank from PCI Manufacturing, LLC.

Alternatively, the container 444, 544 may be made of any suitable corrosion-resistant material. The container 444, 544 may be made of coated metals, corrosion-resistant metals or plastics. Suitable coated metals include, but are not limited to, plastic-coated carbon steel; suitable corrosion-resistant metals include, but are not limited to, stainless steel, Hastelloy® alloy, Monel® alloy and combinations thereof; and suitable plastics include, but are not limited to, polyethylene, polypropylene, polyvinyl chloride (PVC) and combinations thereof. In an embodiment, the container 444, 544 may be made of plastic-coated carbon steel. In an embodiment, the container 444, 544 may be made of Plasite 7159 HAR-coated carbon steel.

The container 444, 544 may be any suitable shape. Suitable shapes include, but are not limited to, cylindrical, cubic, cuboid, prism, pyramid, spherical and combinations thereof. In an embodiment, the container 444, 544 may be approximately a cuboid shape.

The demister element 448, 548 may be any suitable demister element. The demister element 448, 548 may be made of any suitable corrosion-resistant material. The demister element 448, 548 may be made of any suitable corrosion-resistant metals or plastics. The demister element 448, 548 may be made of metal or plastic mesh or baffled, torturous-path chevron-type plates. Suitable metal mesh includes, but is not limited to, stainless steel, Hastelloy® alloy, Monel® alloy and combinations thereof; suitable plastic mesh includes, suitable plastic mesh includes, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof; and suitable chevron-type plates include, but are not limited to, polyethylene, polypropylene, polyvinylchloride (PVC), stainless steel, Teflon® perfluoroalkoxy (PFA) polymers, Teflon® polytetrafluroethylene (PTFE) polymers. In an embodiment, the demister element 448, 548 may be made of 316 stainless steel.

The demister element 448, 548 may be any suitable shape to enclose an upper portion of the container 444, 544. Suitable shapes include, but are not limited to, cylindrical, cubic, cuboid, prism, pyramid, spherical, and portions and combinations thereof. In an embodiment, the demister element 448, 548 may be a cuboid shape about 4-feet wide by about 8-feet long and from about 3-inches to about 12-inches thick (and any range or value there between). In an embodiment, the demister element 448, 548 may be a cuboid shape about 4-feet wide by about 8-feet long and from about 4-inches to about 6-inches thick. As shown in FIG. 4, the demister element 448, 548 forms an upper portion of the cuboid shape of the container 444, 544.

The evaporated water outlet 450 comprises a plurality of outlet pores (not shown) in the demister element 448, 548.

Recycle and Discharge System

The bottom of the container 444, 544 may be connected to a second inlet to the first 3-way valve 416 via pipe 452, 552. The outlet of the first 3-way valve 416 may be connected to the inlet of the pump via pipe 418, 518. The outlet of the pump 420, 520 may be connected to the inlet of the second 3-way valve 432, 532 via pipe(s) 422, 426, 522, 526. A second outlet of the second 3-way valve 432, 532 may be connected to the discharge outlet 458, 558 via pipe 454, 554.

The discharge outlet 458, 558 may be any suitable outlet that can handle up to about 40 psi. Suitable discharge outlets include, but are not limited to, a flange connection, cam-lock fittings and hammer unions. In an embodiment, the discharge outlet 458, 558 is a flange connection (see FIGS. 5A-5D). The discharge outlet 458, 558 permits connection to an external waste disposal storage (e.g., tank, truck, pond). The discharge outlet 458, 558 may be connected to the external waste disposal storage via hose, pipe or other means as customary in the art.

Alternate Air Blower, Spray System and Mist Arresting System

In an embodiment, the system 400, 500 may further comprise an air blower system 434, 534, a spray system 440, 540 and a mist arresting system 446, 546. The air blower system 434, 534 comprises a plurality of air blowers 436', 436"; the spray system 440 comprises a plurality of spray nozzles 442', 442"; and the mist arresting system 446 comprises a plurality of demister elements 448', 448" and the container 444, 544.

A first outlet of a first air blower 436' may be fluidly connected to a first blower inlet of the manifold 439, 539 opposed to a first spray outlet of the manifold 439, 539; and a second outlet of a second air blower 436" may be fluidly connected to a second blower inlet of the manifold 439, 539 opposite a second spray outlet of the manifold 439, 539, and so on.

In an embodiment, each outlet of the plurality of air blowers 436', 436" may be connected to its corresponding blower inlet of the manifold 439, 539 via tubing. In an embodiment, the tubing may be made of 316 stainless steel. In an embodiment, the tubing may be ⅜-inch tubing.

In an embodiment, the air blower system 534 may further comprise an air heating system 586. The air heating system 586 comprises an air ducting plenum 588 and a heater 587 (see FIG. 5C). In an embodiment, the air heating system 586 may further comprise a first thermometer 590 to measure the temperature of inlet air and/or a second thermometer 592 to measure the temperature of outlet air (see FIGS. 5B-5C).

In an embodiment, each spray outlet of the manifold 439, 539 may be connected to its corresponding inlet of the spray nozzle 442, via tubing. In an embodiment, each spray outlet of the manifold 439, 539 comprises about 4 to about 6 tubes (see FIGS. 5A-5B). In an embodiment, the tubing may be made of 316 stainless steel. In an embodiment, the tubing may be ⅜-inch tubing.

Outlets of the plurality of spray nozzles 442', 442" discharge water droplets inside the container 444, 544. An upper portion or top side of the container 444, 544 is enclosed with the plurality of demister elements 448', 448" to retain the water droplets inside the container 444, 544. The plurality of demister elements 448', 448" are secured to and supported by the container 444, 544 in a manner customary in the art.

At least some of the water droplets evaporate to form water vapor. The water vapor passes through pores in the plurality of demister elements 448', 448" and out the evaporated water outlet 450. Any un-evaporated water is retained by the plurality of demister elements 448', 448" and falls to the sump (bottom) of the container 444, 544.

The evaporated water outlet 450 comprises a plurality of outlet pores (not shown) in the plurality of demister elements 448', 448".

The plurality of air blowers 436', 436" may be any suitable air blowers. The plurality of air blowers 436', 436" may be automatic or manual. The plurality of air blowers 436', 436" may be electric or hydraulic (see FIG. 4A-4C). Suitable air blowers include, but are not limited to, variable-speed air blowers. For example, suitable plurality of air blowers 436', 436" are available from Curtec. In an embodiment, the plurality of air blowers 436', 436" are variable-speed air blowers capable of moving from about 1 k to about 6 k CFM per blower from Curtec. In an embodiment, the plurality of air blowers 436', 436" are variable-speed air blowers capable of moving from about 1 k to about 35 k CFM total from Curtec. In an embodiment, the plurality of air blowers 436', 436" are variable-speed air blowers capable of moving from about 3 k to about 18 k CFM total from Curtec. In an embodiment, the plurality of air blowers 436', 436" are variable-speed air blowers capable of moving from about 15 k to about 35 k CFM total from Curtec.

The plurality of spray nozzles 442', 442" may be any suitable spray nozzles. Suitable plurality of spray nozzles include, but are not limited to, rotary atomizers. For example, a suitable plurality of spray nozzles 442', 442" are available from Ledebuhr Industries. In an embodiment, the plurality of spray nozzles 442', 442" are variable-speed rotary atomizers from Ledebuhr Industries. In an embodiment, the rotary atomizers are capable of high flow. In an embodiment, the rotary atomizers have a plurality of spray heads. In an embodiment, the rotary atomizers are capable of about 8 GPM flow per spray head. In an embodiment, the spray heads are positioned at the discharge point of the air blower. Alternatively, the spray heads are positioned inside the container.

The plurality of spray nozzles 442', 442" may be made of any suitable corrosion-resistant material. The plurality of spray nozzles 442', 442" may be made of any suitable corrosion-resistant metals. Suitable corrosion-resistant metals include, but are not limited to, stainless steel, Hastelloy® alloy, Monel® alloy and combinations thereof. In an embodiment, the plurality of spray nozzles 442', 442" (spray heads) are made of 316 stainless steel.

The plurality of demister elements 448', 448" may be any suitable demister elements. The plurality of demister elements 448', 448" may be made of any suitable corrosion-resistant material. The plurality of demister elements 448', 448" may be made of metal or plastic mesh or baffled, torturous path chevron-type plates. Suitable metal mesh includes, but is not limited to, stainless steel, Hastelloy® alloy, Monel® alloy and combinations thereof; suitable plastic mesh includes, suitable plastic mesh includes, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof; and suitable chevron-type plates include, but are not limited to, polyethylene, polypropylene, polyvinylchloride (PVC), stainless steel, Teflon® perfluoroalkoxy (PFA) polymers, Teflon® polytetrafluroethylene (PTFE) polymers. In an embodiment, the plurality of demister elements 448', 448" are made of 316 stainless steel.

In an embodiment, the demister element 448, 548 may be about 4-inches to about 12-inches thick (and any range or value there between). In an embodiment, the demister element 448, 548 may be about 4-inches to about 6-inches thick. In an embodiment, the demister element 448, 548 may be about 4-feet wide by about 8-feet long.

Optional Shut-Off Valves

In an embodiment, the system 400, 500 may further comprise an optional shut-off valve 406, 506 and an optional discharge shut-off valve (not shown). The shut-off valve 406, 506 is disposed in the pipe 408, 508, connecting the water inlet 404, 504 to the first inlet of the first 3-way valve 416. The optional discharge shut-off valve is disposed in the pipe 454, 554, connecting an outlet of the second 3-way valve 432, 532 to the discharge outlet 458, 558.

The shut-off valve 406, 506 and the discharge shut-off valve may be any suitable shut-off valve. The shut-off valve 406, 506 and the optional discharge shut-off valve may be automatic or manual. Suitable shut-off valves include, but are not limited to, ball valves and butterfly valves. For example, a suitable shut-off valve 406, 506 is available from GF Piping Systems. In an embodiment, the shut-off valve 406, 506 may be a Georg Fischer Type 563 Butterfly Valve.

In an embodiment, the shut-off valve 406, 506 may have 2-inch connections.

The shut-off valve 406, 506 and the optional discharge shut off valve may be made of any suitable corrosion-resistant material. The shut-off valve 406, 506 and optional discharge shut-off valve may be made of any suitable corrosion-resistant metals or plastics. Suitable metals include, but are not limited to, plastic-coated carbon steel, stainless steel, Hastelloy® alloy, Monel® alloy and combinations thereof; and suitable plastics include, but are not limited to, ethylene propylene diene monomer (EPDM) rubber, polyvinylchloride (PVC) and combinations thereof. In an embodiment, the shut-off valve 406, 506 (wetted components) may be made of polyvinyl chloride (PVC) and ethylene propylene diene monomer (EPDM) rubber.

Optional Basket Strainer

In an embodiment, the system 400, 500 may further comprise a basket strainer 424, 524 and an optional pressure sensor 425, 525. An inlet of the basket strainer 424, 524 may be fluidly connected to an outlet of pipe 422, 522, and an outlet of the basket strainer 424, 524 may be fluidly connected to an inlet of pipe 426, 526. In an embodiment, the first pressure sensor 425 may be fluidly connected to either the pipe 422, 522 or the inlet of the basket strainer 424, 524. The basket strainer 424, 524 retains debris in the water feed to prevent clogging of the spray nozzles 442.

The basket strainer 424, 524 may be any suitable basket strainer. A suitable basket strainer 424, 524 includes, but is not limited to, 1/16-inch perforated baskets, contained within a simplex or duplex housing. For example, a suitable basket strainer 424, 524 is available from Hayward or Rosedale. In an embodiment, the basket strainer 424, 524 may be a 1/16-inch perforated basket from Hayward or Rosedale.

The basket strainer 424, 524 may be made of any suitable corrosion-resistant material. The basket strainer 424, 524 may be made of any suitable corrosion-resistant metals. The basket strainer 424, 524 may be any suitable metal or plastic basket strainer. Suitable metals include, but are not limited to, stainless steel, Hastelloy® alloy, Monel® alloy and combinations thereof; and suitable plastics include, but are not limited to, chlorinated polyvinyl chloride (CPVC) polymers, Kynar® polyvinylidene fluoride (PVDF) polymers, polyvinyl chloride (PVC) polymers, Teflon® perfluoroalkoxy (PFA) polymers, Teflon® polytetrafluroethylene (PTFE) polymers, and combinations thereof. In an embodiment, the basket strainer 424, 524 (basket) may be made of 316 stainless steel.

The optional pressure sensor 425 may be any suitable pressure sensor. For example, a suitable pressure sensor 425 is available from Rosemount, Inc. In an embodiment, the pressure sensor 425 may be a Rosemount 2088 Absolute and Gage Pressure Transmitter from Rosemount, Inc.

Optional Sensors and Meters

In an embodiment, the system 400, 500 may further comprise a first conductivity meter 410, 510, a first flow meter 412, 512 and/or a hygrometer 414, 514. The first conductivity meter 410, 510 and the flow meter 412, 512 may be fluidly connected to pipe 408, 508. The first conductivity meter 410, 510 monitors the conductivity of the inlet or condensed wastewater from the external wastewater source; and the first flow meter 412, 512 measures the flow rate of the inlet wastewater or condensed water.

The first conductivity meter 410, 510 may be any suitable conductivity meter. For example, a suitable first conductivity meter 410, 510 is available from Mettler-Toledo AG or Advanced Sensor Technologies, Inc. (ASTI). In an embodiment, the first conductivity meter 410, 510 may be an InPro 7100 Series Conductivity Sensor from Mettler-Toledo AG electrically connected to a Multiparameter Transmitter M400 from Mettler-Toledo AG. In an embodiment, the first conductivity meter 410, 510 may be a Model ASTX-37PP-PT1000-20-TL-1056 Toroidal Conductivity Sensor from ASTI electrically connected to a Model 1056-01-21-32-AN Dual Channel Transmitter from ASTI.

The hygrometer 414 is fluidly exposed to ambient air near system 400. The hygrometer 414 measures barometric pressure, humidity and temperature of the ambient air near the system 400.

The hygrometer 414 may be any suitable hygrometer. For example, a suitable hygrometer is available from Yankee Environmental Systems, Inc. In an embodiment, the hygrometer 414 may be a Metrological Thermo-Hygrometer Model PTU-2000 from Yankee Environmental Systems, Inc.

The first flow meter 412, 512 may be any suitable flow meter. Suitable first flow meters include, but are not limited to, magnetic, paddlewheel, ultrasonic vortex and insertion-type vortex flow meters. For example, a suitable first flow meter 412, 512 is available from Mettler-Toledo Thornton, Inc. In an embodiment, the first flow meter 412, 512 may be a Model 8030 from Mettler-Toledo Thornton, Inc. electrically connected to a Multiparameter Transmitter M400 from Mettler-Toledo AG.

In an embodiment, the system 400, 500 may further comprise a second conductivity meter 428, 528 and a pH meter 430, 530. The second conductivity meter 428, 528 may be fluidly connected to pipe 426, 526; and the pH meter 430 may be fluidly connected to pipe 426, 526. The second conductivity meter 428, 528 monitors the conductivity of the wastewater; and the pH meter 430 measures the pH of the wastewater.

The second conductivity meter 428, 528 may be any suitable conductivity meter. For example, a suitable second conductivity meter 428, 528 is available from Mettler-Toledo AG or Advanced Sensor Technologies, Inc. (ASTI). In an embodiment, the second conductivity meter 428, 528 may be an InPro 7100 Series Conductivity Sensor from Mettler-Toledo AG electrically connected to a Multiparameter Transmitter M400 from Mettler-Toledo AG. In an embodiment, the first conductivity meter 410, 510 may be a Model ASTX-37PP-PT1000-20-TL-1056 Toroidal Conductivity Sensor from ASTI electrically connected to a Model 1056-01-21-32-AN Dual Channel Transmitter from ASTI. In an embodiment, the first conductivity meter 410, 510 and the second conductivity meter 428, 528 may be the same type.

The pH meter 430 may be any suitable pH meter. For example, a suitable pH meter 430 is available from Mettler-Toledo AG or Advanced Sensor Technologies, Inc. (ASTI). In an embodiment, the pH meter 430 may be an InPro 3300 Non-Glass Electrode for pH Measuring Systems from Mettler-Toledo AG electrically connected to a Multiparameter Transmitter M400 from Mettler-Toledo AG. In an embodiment, the pH meter 430 may be a Model PNGR 8951-1000-20-TL-WPB Submersible Saturated Brine Resistant pH Sensor from ASTI electrically connected to a Model 1056-01-21-32-AN Dual Channel Transmitter from ASTI.

In an embodiment, the system 400 may further comprise a differential pressure sensor 445. The differential pressure sensor 445 measures the pressure drop across the demister element 448, 548 or the plurality of demister elements 448', 448".

The differential pressure sensor 445 may be any suitable differential pressure sensor. For example, a suitable differential pressure sensor 445 is available from Dwyer Instruments Inc. In an embodiment, the differential pressure sensor 445 may be a Series 3000 Photohelic Differential Pressure Gage from Dwyer Instruments Inc.

In an embodiment, the system 400, 500 may further comprise a second flow meter 456, 556. The second flow meter 456, 556 may be fluidly connected to pipe 454, 554. The second flow meter 456, 556 measures the flow rate of the discharge waste.

The second flow meter 456, 556 may be any suitable flow meter. Suitable second flow meters include, but are not limited to, magnetic, paddlewheel, ultrasonic vortex and insertion-type vortex flow meters. For example, a suitable second flow meter 456, 556 is available from Mettler-Toledo Thornton, Inc. In an embodiment, the second flow meter 456, 556 may be a Model 8030 from Mettler-Toledo Thornton, Inc. electrically connected to a Multiparameter Transmitter M400 from Mettler-Toledo AG.

Optional Limit/Level Switches

In an embodiment, the system 400 may further comprise a high-water level switch (not shown) and/or a low-water level switch (not shown).

The high-water level and the low-water level switches may be any suitable water level switches. For example, the high-water level and the low-water level switches are available from Magnetrol International Inc. In an embodiment, the high-water level and the low-water level switches are C24, C25 Boiler and Water Column Liquid Level Switches from Magnetrol International Inc.

Optional Acid Conditioning System

In an embodiment, the system 400 may further comprise an acid conditioning system 460. The acid conditioning system 460 comprises an acid tote 462 and an acid metering pump 466.

The acid may be any suitable acid. Suitable acids include, but are not limited to, hydrochloric acid and sulfuric acid. In an embodiment, the acid may be hydrochloric acid (20 baume). In an embodiment, the acid may be sulfuric acid (98%). In an embodiment, the desired pH of the wastewater is about 6.5 or below to minimize calcium carbonate scaling. In an embodiment, the amount of acid solution added varies, depending on inlet water conditions (e.g., pH, alkalinity).

An outlet of the acid tote 462 may be fluidly connected to an inlet of the acid metering pump 466 via tubing 464; and an outlet of the acid metering pump 466 may be fluidly connected to pipe 422, 522 via tubing 472.

The acid tote 462 may be any suitable acid tote or other bulk chemical storage unit. Suitable acid totes include, but are not limited to, an industry standard shipping tote. For example, a suitable acid tote 462 is available from National Tank Outlet. In an embodiment, the acid tote 462 may be a 275 gallon or a 330 gallon industry standard shipping tote.

The acid metering pump 466 may be any suitable acid metering pump. Suitable acid metering pumps include, but are not limited to, peristaltic pumps. For example, a suitable acid metering pump 466 is available from Blue-White Industries, Inc., Cole Palmer Instrument Company and Watson Marlow. In an embodiment, the acid metering pump 466 may be a self-priming peristaltic pump from Blue-White Industries, Inc.

The tubing 464, 472 may be made of any suitable corrosion-resistant tubing. The tubing 464, 472 may be made of any suitable corrosion-resistant metals or plastics. Suitable metals include, but are not limited to, AL-6XN alloy, Hastelloy® alloy, Monel® alloy and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. For example, suitable tubing 464, 472 may be made of Teflon® PFA or PTFE.

In an embodiment, the acid conditioning system 460 may further comprise an acid flow meter 470. The acid flow meter 470 may be fluidly connected to tubing 472. The acid flow meter 470 measures the flow rate of the acid solution.

The acid flow meter 470 may be any suitable flow meter. Suitable acid flow meters include, but are not limited to, paddlewheel, ultrasonic vortex and insertion-type vortex flow meters. For example, a suitable acid flow meter 470 is available from ProMinent. In an embodiment, the acid flow meter 470 may be a Model DulcoFlow DFMa from ProMinent with built-in signal transmission capability.

Optional Bactericide Conditioning System

In an embodiment, the system 400 may further comprise a bactericide conditioning system 474. The bactericide conditioning system 474 comprises a bactericide tote 476 and a bactericide metering pump 480.

The bactericide may be any suitable bactericide. Suitable bactericide includes, but is not limited to, bleach, bromine, chlorine dioxide (generated), 2,2-dibromo-3-nitrilo-propionade (DBNPA), glutaraldehyde, isothiazolin (1.5%) and ozone (generated). In an embodiment, the bactericide may be selected from the group consisting of bleach (12.5%), bromine, chlorine dioxide (generated), DBNPA (20%), glutaraldehyde (50%), isothiazolin (1.5%) and ozone (generated). In an embodiment, the desired bactericide concentration is from about 10 ppm to about 1000 ppm (and any range or value there between). The amount of bactericide solution added to the wastewater varies, depending on inlet water condition.

An outlet of the bactericide tote 476 may be fluidly connected to an inlet of the bactericide metering pump 480 via tubing 478; and an outlet of the bactericide metering pump 480 may be fluidly connected to pipe 422, 522 via tubing 482.

The bactericide tote 476 may be any suitable bactericide tote or other bulk chemical storage unit. Suitable bactericide totes include, but are not limited to, an industry standard shipping tote. For example, a suitable bactericide tote 476 is available from National Tank Outlet. In an embodiment, the bactericide tote 476 may be a 275 gallon or 330 gallon industry standard shipping tote.

In an alternative embodiment, the bactericide tote 476 may be replaced with a suitable bactericide generating apparatus (not shown). For example, a suitable bactericide apparatus is available from Miox Corporation. In an embodiment, the bactericide generating apparatus (not shown) may be a Model AE-8 from Miox Corporation.

The bactericide metering pump 480 may be any suitable bactericide metering pump. Suitable bactericide metering pumps include, but are not limited to, peristaltic pumps. For example, a suitable bactericide metering pump 480 is available from Blue-White Industries, Inc., Cole-Palmer Instrument Company and Watson Marlow. In an embodiment, the bactericide metering pump 480 may be a self-priming peristaltic pump from Blue-White Industries, Inc.

The tubing 478, 482 may be made of any suitable corrosion-resistant tubing. The tubing 478, 482 may be any suitable metal or plastic. Suitable metals include, but are not limited to, AL-6XN alloy, Hastelloy® alloy, Monel® alloy and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the tubing 478, 482 may be made of Teflon® PFA or PTFE.

In an embodiment, the bactericide conditioning system 474 may further comprise a bactericide flow meter 484. The bactericide flow meter 484 may be fluidly connected to tubing 482. The bactericide flow meter 484 measures the flow rate of the bactericide solution.

The bactericide flow meter 484 may be any suitable flow meter. Suitable bactericide flow meters include, but are not limited to, paddlewheel, ultrasonic vortex and insertion-type vortex flow meters. For example, a suitable bactericide flow meter 484 is available from ProMinent. In an embodiment, the bactericide flow meter 484 may be a Model DulcoFlow DFMa from ProMinent with built-in signal transmission capability.

Second Alternative Embodiment

A schematic of a second exemplary system 1000 for spray evaporation of water according to another embodiment of the present invention is shown in FIGS. 10A-10C and 11A-11F. The system 1000, 1100 comprises a wastewater inlet 1004, a pump 1018, a first air blower 1042, a first manifold 1028, a drip orifice 1038, a container 1039, a demister element 1045, and a discharge outlet 1076.

In an embodiment, the system 1000, 1100 is capable of evaporating between about 30 to about 100 barrels of wastewater per day (i.e., about 950 to about 3170 gallons per day). In an embodiment, the system 1000, 1100 is capable of evaporating between about 30 to about 60 barrels of wastewater per day (i.e., about 950 to about 1900 gallons per day). (see FIGS. 10A-10B). If a higher throughput is desired, a plurality of system 1000, 1100 may be used in parallel to treat the wastewater.

The wastewater inlet 1004 may be any suitable wastewater inlet that can handle up to about 40 psi. Suitable wastewater inlets include, but are not limited to, flange connections, cam-lock fittings and hammer unions. In an embodiment, the wastewater inlet 1004 is a hammer union connection (see FIGS. 10A-10B). The wastewater inlet 1004 permits connection to an external wastewater source via a wastewater suction header 1002. The water inlet 1004 may be connected to the external wastewater source via a hose, pipe or other means customary in the art.

Optional Pre-Treatment of Volatile Organic Carbons (VOCs) in Wastewater

Some wastewater sources may contain volatile organic compounds often measured and reported as volatile organic carbons (VOCs). These VOCs may exceed air discharge limits under federal and/or state environmental regulations and/or system 1000, 1100 limits due to potential temperature excursions.

If the VOC levels exceed air discharge limits and/or system 1000, 1100 limits, the VOCs may be reduced to acceptable levels or removed from the wastewater source upstream of the wastewater inlet 1004 using a pretreatment method.

Any suitable pretreatment method may be used to reduce/remove VOCs from wastewater. For example, a suitable pretreatment method includes, but is not limited to, aeration of the wastewater within a tank, stripping the wastewater in a packed tower, flowing the wastewater through activated carbon, and combinations thereof.

Inlet System

In an embodiment, the system 1000, 1100 may further comprise a first (feed) shut-off valve 1006, a first (feed) valve 1012 and a second (feed/recirculating) valve 1054. The wastewater inlet 1004 may be connected to an inlet of a first (feed) shut-off valve 1006 via a pipe 1008*a*.

An outlet of the first (feed) shut-off valve 1006 may be connected to an inlet of the first (feed) valve 1012 via a pipe 1008*a*.

An outlet of the first (feed) valve 1012 may be connected to an inlet of a pipe 1016*b* or an inlet of a pump 1018 via a pipe 1008*b*.

An outlet of pipe 1016*b* may be connected to an inlet of the pump 1018 (and an outlet of a third (pump supply) valve 1055 may be connected to an inlet of the pump 1018 via a pipe 1016*b*).

An outlet of the pump 1018 may be connected to an inlet of the second (feed/recirculating) valve 1054 via pipe 1020*a*.

An outlet of the second (feed/recirculating) valve 1054 may be connected to an inlet of a first manifold 1028 or a drip system 1034 via a pipe 1026*a*/1026*b*.

In an embodiment, the system 1000, 1100 may further comprise a first (feed) shut-off valve 1006. The (feed) shut-off valve 1006 may be any suitable shut-off valve. Suitable first (feed) shut-off valves 1006 include, but are not limited to, ball valves and butterfly valves. For example, a suitable first (feed) shut-off valve 1006 is available from GF Piping Systems. In an embodiment, the first (feed) shut-off valve 1006 may be a GF Piping Systems Type 546 Ball Valve from GF Piping Systems. In an embodiment, the first (feed) shut-off valve 1006 may be automatic or manual. In an embodiment, the first (feed) shut-off valve 1006 may be normally CLOSED.

In an embodiment, the first (feed) shut-off valve 1006 may have 2-inch connections.

In an embodiment, the system 1000, 1100 may further comprise a first (feed) valve 1012 and a second (feed/ recirculating) valve 1054. The first (feed) valve 1012 and the second (feed/recirculating) valve 1054 may be any suitable switching valve. Suitable first (feed) valve 1012 and second (feed/recirculating) valve 1054 include, but are not limited to, ball valves. For example, a suitable first (feed) valve 1012 and second (feed/recirculating) valve 1054 is available from GF Piping Systems. In an embodiment, the first (feed) valve 1012 and the second (feed/recirculating) valve 1054 may be a GF Piping System Type 546 Electric Actuated Ball Valve from GF Piping Systems. In an embodiment, the first (feed) valve 1012 and the second (feed/recirculating) valve 1054 may be automatic or manual. In an embodiment, the first (feed) valve 1012 and the second (feed/recirculating) valve 1054 may be electric or pneumatic actuation. In an embodiment, the first (feed) valve 1012 and the second (feed/recirculating) valve 1054 may be normally CLOSED.

In an embodiment, the first (feed) valve 1012 and the second (feed/recirculating) valve 1054 may have 2-inch connections.

The first (feed) shut-off valve 1006, the first (feed) valve 1012 and the second (feed/recirculating) valve 1054 may be made of any suitable corrosion-resistant material. The first (feed) shut-off valve 1006, the first (feed) valve 1012 and the second (feed/recirculating) valve 1054 may be made of any suitable corrosion-resistant metals or plastics. Suitable metals include, but are not limited to, plastic-coated carbon steel, stainless steel, Hastelloy® alloy, Monel® alloy and combinations thereof; and suitable plastic include, but are not limited to, polyvinylchloride (PVC) polymers, chlorinated polyvinyl chloride (CPVC) polymers, fiberglass reinforced plastic (FRP), Kynar® polyvinylidene fluoride (PVDF) polymers, polyethylene polymers, polypropylene polymers, Teflon® perfluoroalkoxy (PFA) polymers, Teflon® polytetrafluoroethylene (PTFE) polymers, and combinations thereof. In an embodiment, the first (feed) shut-off valve 1006, the first (feed) valve 1012 and the second (feed/recirculating) valve 1054 (wetted components) may be made of polyvinyl chloride (PVC) and ethylene propylene diene monomer (EPDM) rubber.

In an embodiment, the system 1000, 1100 may further comprise an optional first limit switch (not shown) and an optional second limit switch (not shown). (See e.g., FIGS. 1A-1B: 113 & 114). In an embodiment, the first limit switch confirms that the first (feed) valve 1012 is OPEN; and the second limit switch confirms that the first (feed) valve 1012 is CLOSED.

In an embodiment, the system 1000, 1100 may further comprise an optional third limit switch (not shown) and an optional fourth limit switch (not shown). (See e.g., FIGS. 1A-1B: 113 & 114). In an embodiment, the third limit switch confirms that the second (feed/recirculating) valve 1054 is OPEN; and the fourth limit switch confirms that the second (feed/recirculating) valve 1054 is CLOSED.

The pump 1018 may be any suitable pump. Suitable pumps 1018 include, but are not limited to, centrifugal pumps. For example, a suitable pump 1018 is available from MP Pumps Inc. In an embodiment, the pump 1018 may be a FLOMAX® 8 Self-Priming Centrifugal Pump from MP Pumps Inc. In an embodiment, the pump 1018 may be about 1 to about 3 HP centrifugal pump. In an embodiment, the pump 1018 may be about a 1.5 HP variable speed pump.

In an embodiment, the pump 1018 may have 2-inch connections.

The pump 1018 may be made of any suitable corrosion-resistant material. The pump 1018 may be made of any suitable corrosion-resistant metals or plastics. Suitable metals include, but are not limited to, cast iron, stainless steel, super-duplex stainless steel, AL-6XN alloy, Ni—Al—Brz alloy, Hastelloy® alloy, Monel® alloy and combinations thereof and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluoroethylene (PTFE) polymers, and combinations thereof. For example, the pump 1018 (wetted components) may be made of stainless steel, super-duplex stainless steel, AL-6XN alloy, Ni—Al—Brz alloy, Hastelloy® alloy, Monel® alloy or FRD. In an embodiment, the pump 1018, including internal wetted components, was made of 316 stainless steel. In an embodiment, the pump 1018 may be made of cast iron if a shorter service life is acceptable.

The pipe 1008a, 1008b, 1016a, 1016b, 1020a, 1026a, 1026b may be made of any suitable corrosion-resistant pipe. The pipe 1008a, 1008b, 1016a, 1016b, 1020a, 1026a, 1026b may be any suitable corrosion-resistant metals or plastics. Suitable metals include, but are not limited to, plastic-coated carbon steel, stainless steel, super-duplex stainless steel, AL-6XN alloy, Ni—Al—Brz alloy, Hastelloy® alloy, Monel® alloy and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the pipe 1008a, 1008b, 1016a, 1016b, 1020a, 1026a, 1026b may be made of plastic-coated carbon steel. In an embodiment, the pipe 1008a, 1008b, 1016a, 1016b, 1020a, 1026a, 1026b may be made of Plasite 7159 HAR-coated carbon steel. In an embodiment, the pipe 1008a, 1008b, 1016a, 1016b, 1020a, 1026a, 1026b may be made of 316 stainless steel.

In an embodiment, the pipe 1008a, 1008b, 1016a, 1016b, 1020a, 1026a, 1026b may be 2-inch pipe.

Container and Demister Elements

In an embodiment, the system 1000, 1100 may further comprise a container 1039 and a demister element 1045.

The container 1039 may be any suitable container. The container 1039 may be mobile or it may be stationary. Suitable containers 1039 include, but are not limited to, tanks (see FIG. 10A-10B). In an embodiment, the container 1039 may be an upright cylinder sealed to a plate or a skid. In an embodiment, the container 1039 may be a culvert sealed to a plate or a skid (discussed below).

In an embodiment, the container 1039 may be any suitable size (e.g., diameter and height).

In an embodiment, the container 1039 may be any suitable diameter. For example, a suitable diameter may be from about 4 feet to about 15 feet, and any range or value there between. In an embodiment, the diameter may be about 4 feet.

In an embodiment, the container 1039 may be any suitable height. For example, a suitable height may be from about 8 feet to about 12 feet, and any range or value there between. In an embodiment, the height may be about 12 feet.

In an embodiment, an upper portion of the container 1039 may be lowered and/or removed to reduce the travel height to up to about 12 feet.

Alternatively, the container 1039 may be made of any suitable corrosion-resistant material. The container 1039 may be made of coated metal, corrosion-resistant metals or plastics. Suitable coated metals include, but are not limited to, epoxy-coated carbon steels, plastic-coated carbon steels, and combinations thereof; suitable corrosion-resistant metals include, but are not limited to, stainless steel, Hastelloy® alloy, Monel® alloy, and combinations thereof; and suitable plastics include, but are not limited to, polyethylene, polypropylene, polyvinyl chloride (PVC), and combinations thereof. In an embodiment, the container 1039 may be made of epoxy-coated carbon steel and/or plastic-coated carbon steel. In an embodiment, the container 1039 may be made of Plasite 7159 HAR-coated carbon steel.

The container 1039 may be any suitable shape. Suitable shapes include, but are not limited to, cylindrical, cubic, cuboid, prism, pyramid, spherical and combinations thereof. In an embodiment, the container 1039 may be approximately a cylindrical shape.

The demister element 1045 may be any suitable demister element. Suitable demister elements 1045 include, but are not limited to, crossflow cellular drift eliminators (see FIGS. 2A-2F). For example, a suitable demister element 1045 is available from Brentwood Industries, Inc. In an embodiment, the demister element 1045 may be an Accu-Pac® Crossflow Cellular Drift Eliminator from Brentwood Industries, Inc.

Alternatively, the demister element 1045 may be made of any suitable corrosion-resistant material. The demister element 1045 may be any suitable corrosion-resistant metals or plastics. The demister element 1045 may be made of metal or plastic mesh or baffled, torturous-path chevron-type plates. Suitable metal mesh includes, but is not limited to, stainless steel, Hastelloy® alloy, Monel® alloy and combinations thereof; suitable plastic mesh includes, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof; and suitable chevron-type plates include, but are not limited to, polyethylene, polypropylene, polyvinylchloride (PVC), stainless steel, Teflon® perfluoroalkoxy (PFA) polymers, Teflon® polytetrafluroethylene (PTFE) polymers. In an embodiment, the demister element 1045 may be made of 316 stainless steel. In an embodiment, the demister element 1045 may be made of PVC.

The demister element 1045 may be any suitable shape to enclose an upper portion and/or a side portion of the container 1039. Suitable shapes include, but are not limited to, cylindrical, cubic, cuboid, prism, pyramid, spherical, and portions and combinations thereof. In an embodiment, the demister element 1045 (e.g., upper portion) may be a cylindrical cuboid from about 2-feet diameter to about 16-feet diameter and from about 4-inches to about 12-inches thick (and any range or value there between).

Figure 10A:
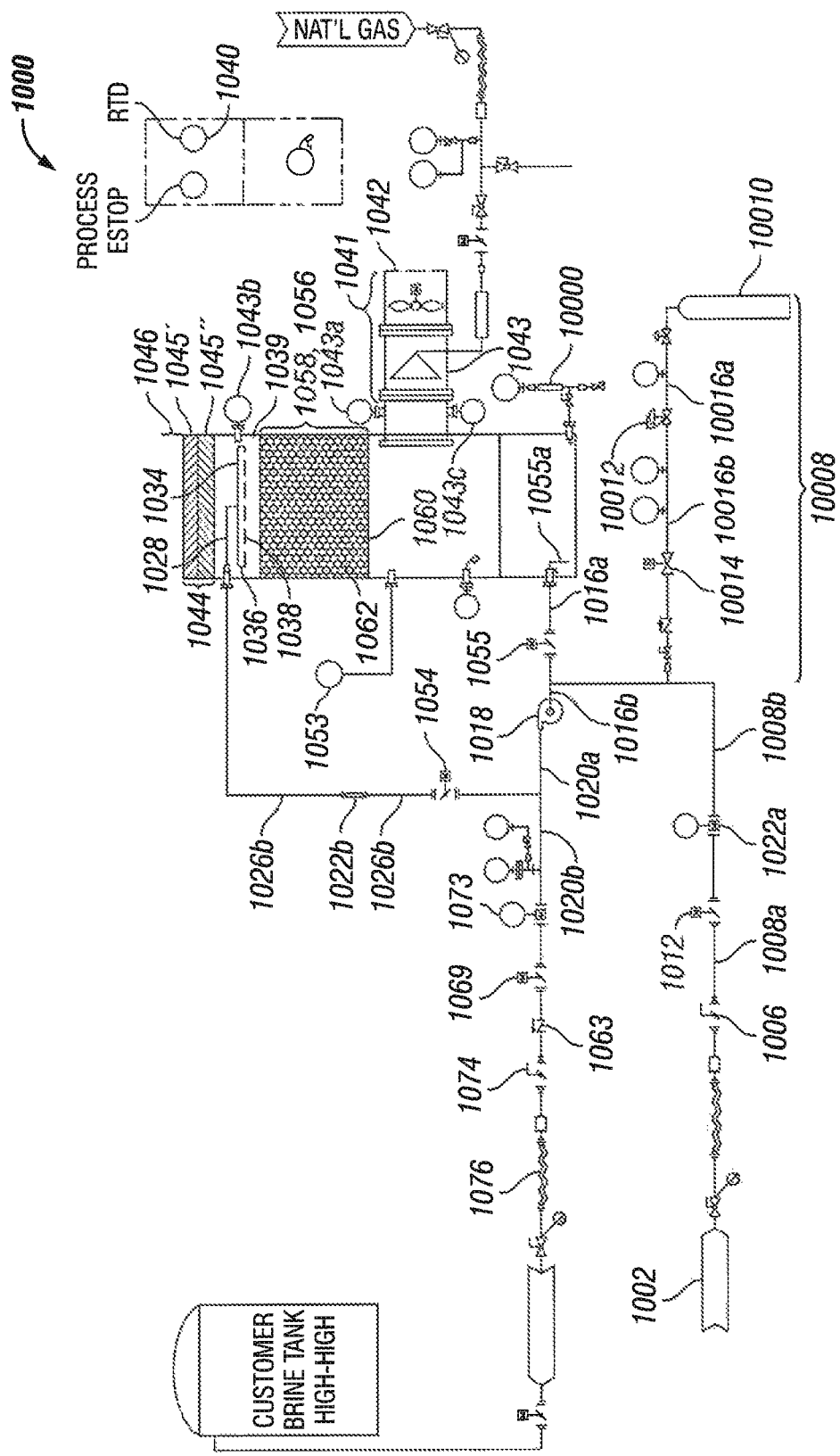
FIG. 10A illustrates a schematic of an exemplary system for spray evaporation of water according to an embodiment of the present invention.
Figure 10B:
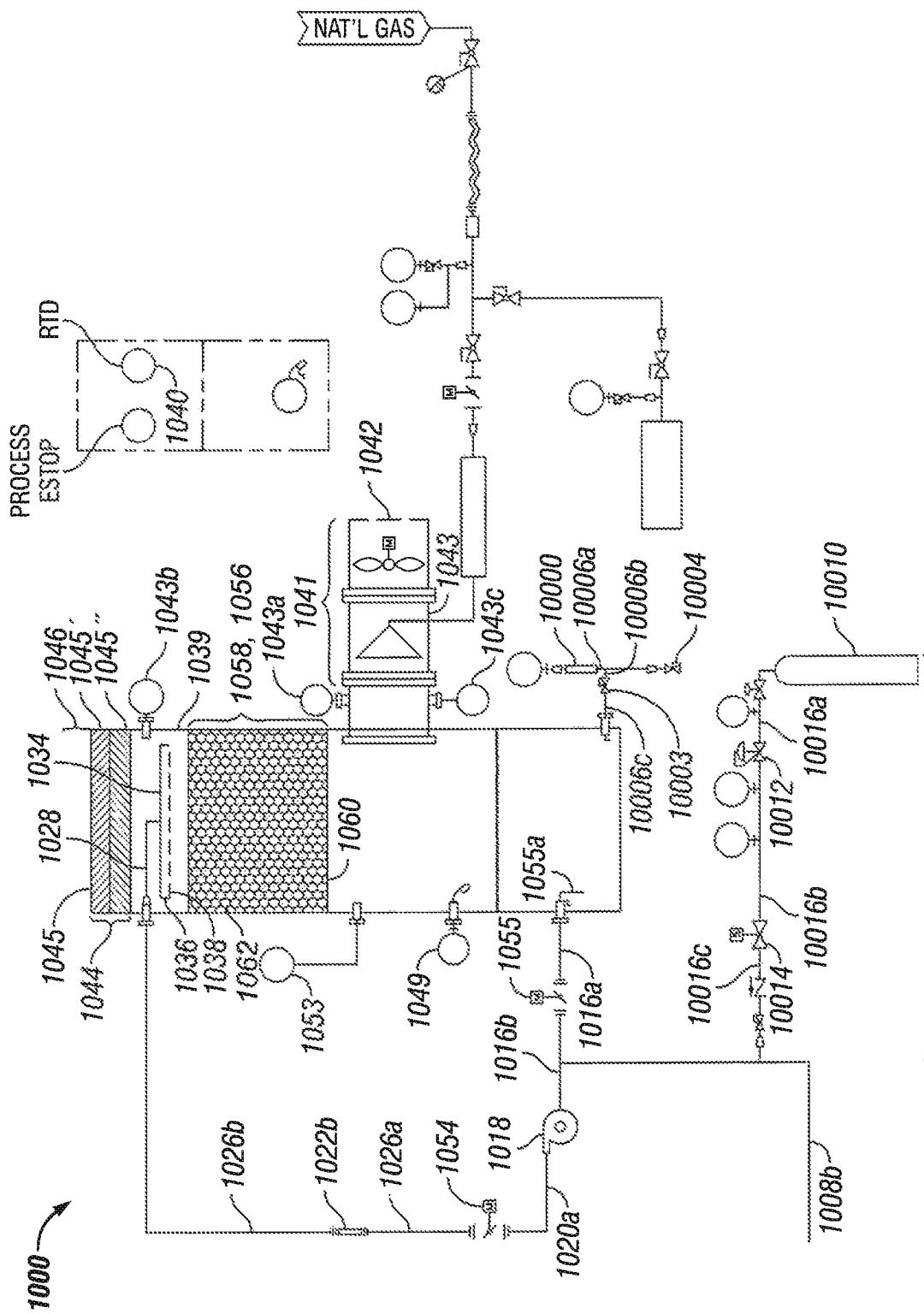
FIG. 10B illustrates a schematic of a front view of the exemplary system of FIG. 10A.
Figure 10C:
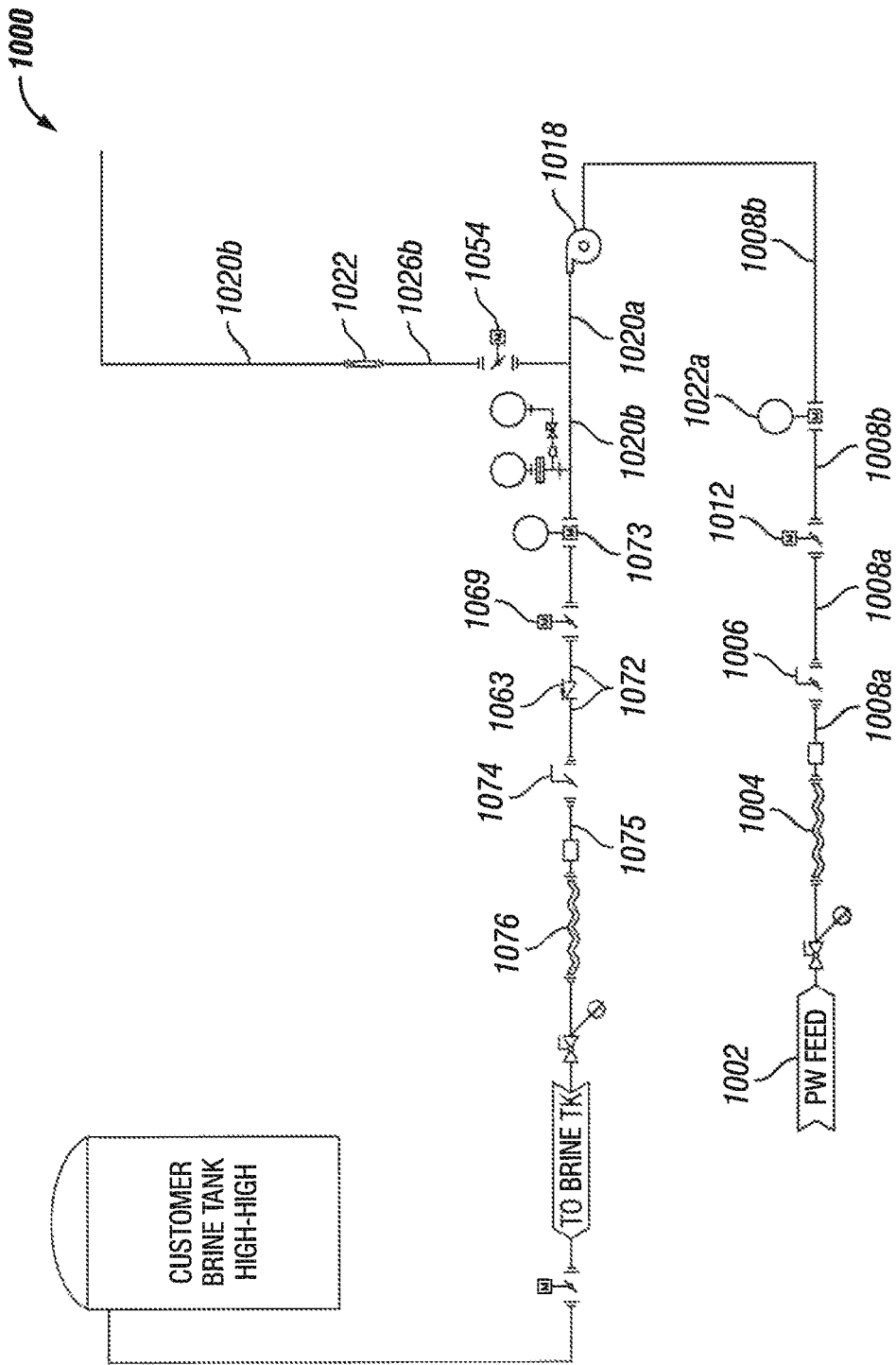
FIG. 10C illustrates a schematic of a rear and downstream view of the exemplary system of FIGS. 10A-10B.
Figure 11A:
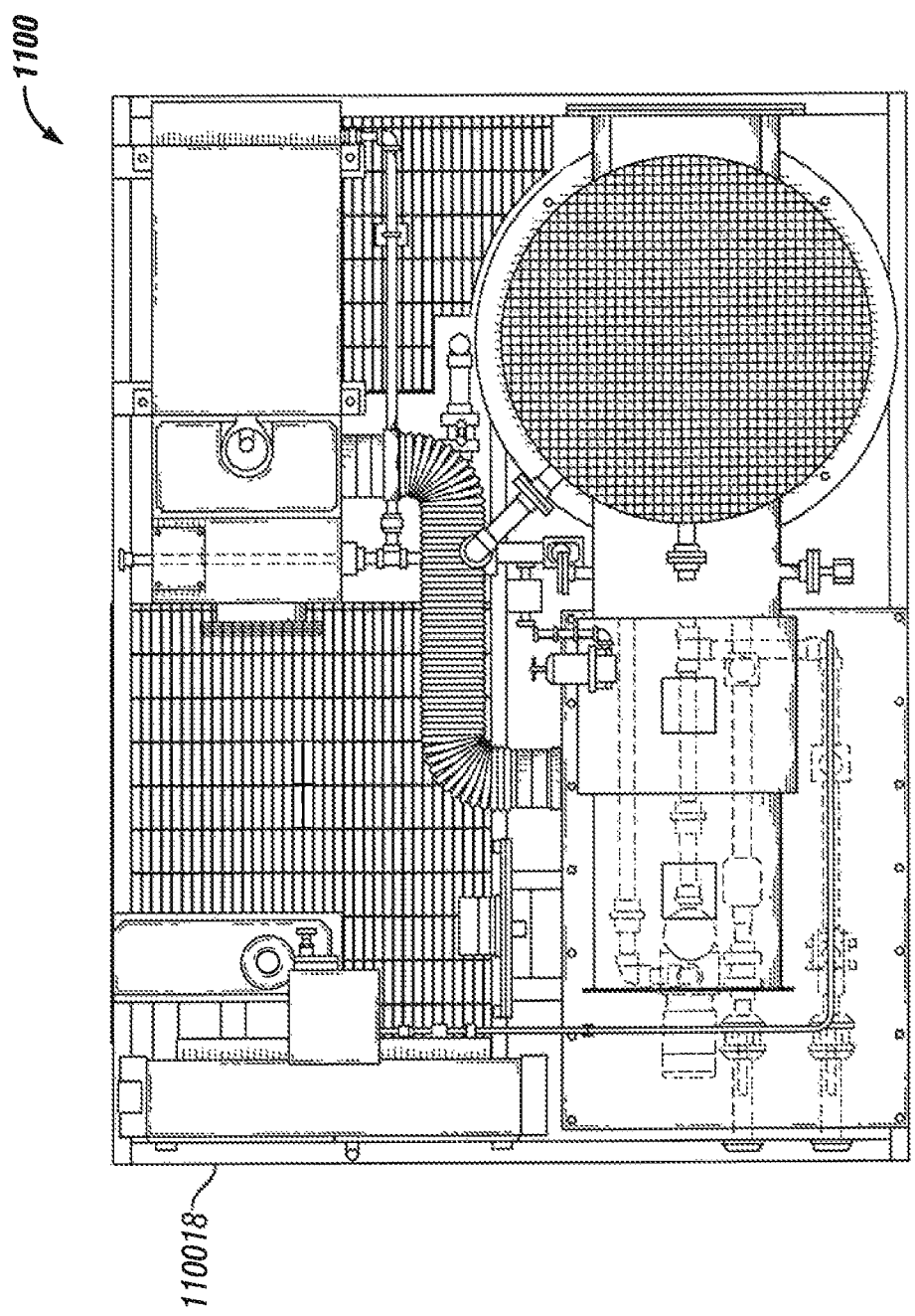
FIG. 11A illustrates a drawing of an upper view of an exemplary system for spray evaporation of water according to an embodiment of the present invention.
Figure 11B:
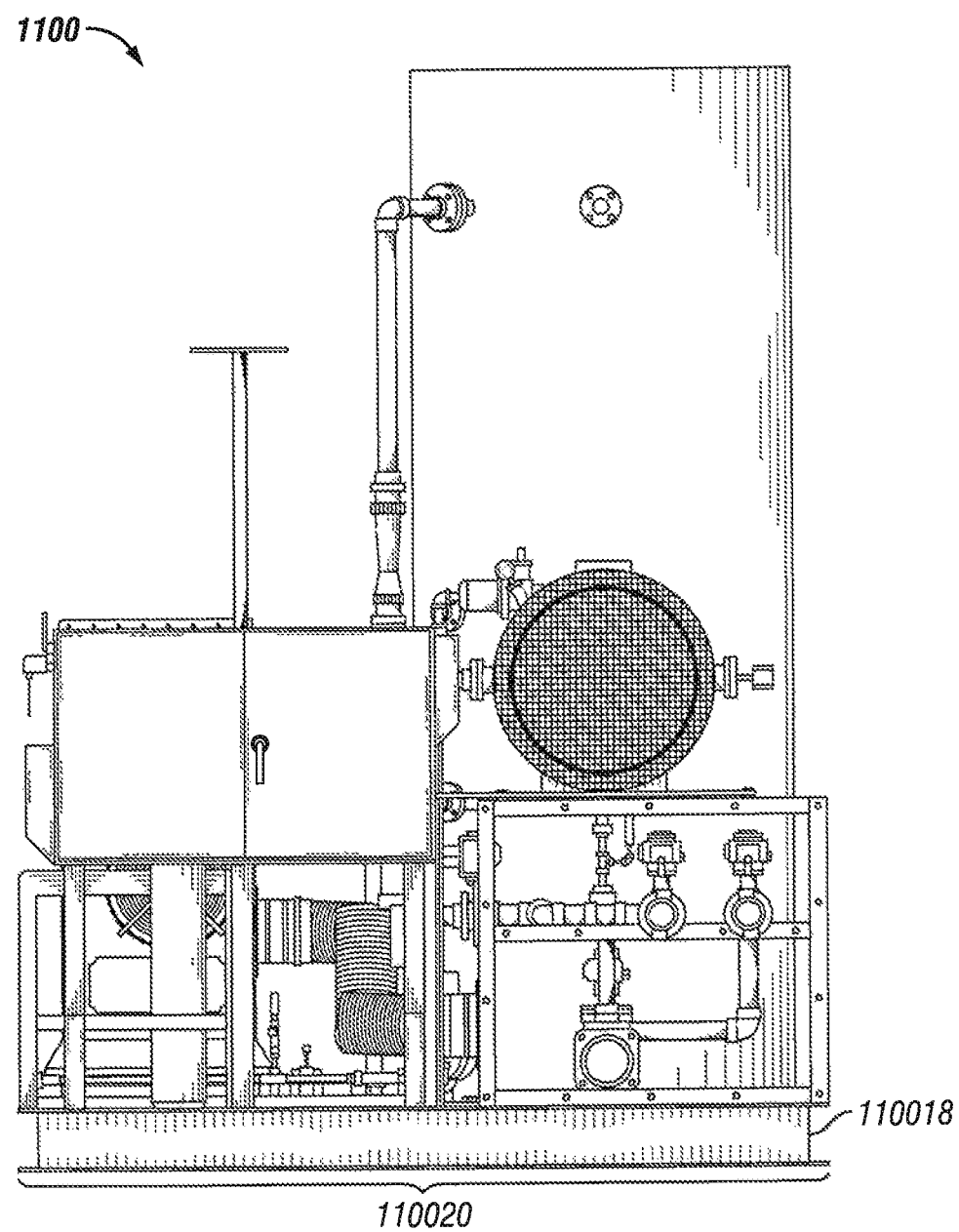
FIG. 11B illustrates a drawing of a left side view of the exemplary system of FIG. 11A.
Figure 11D:
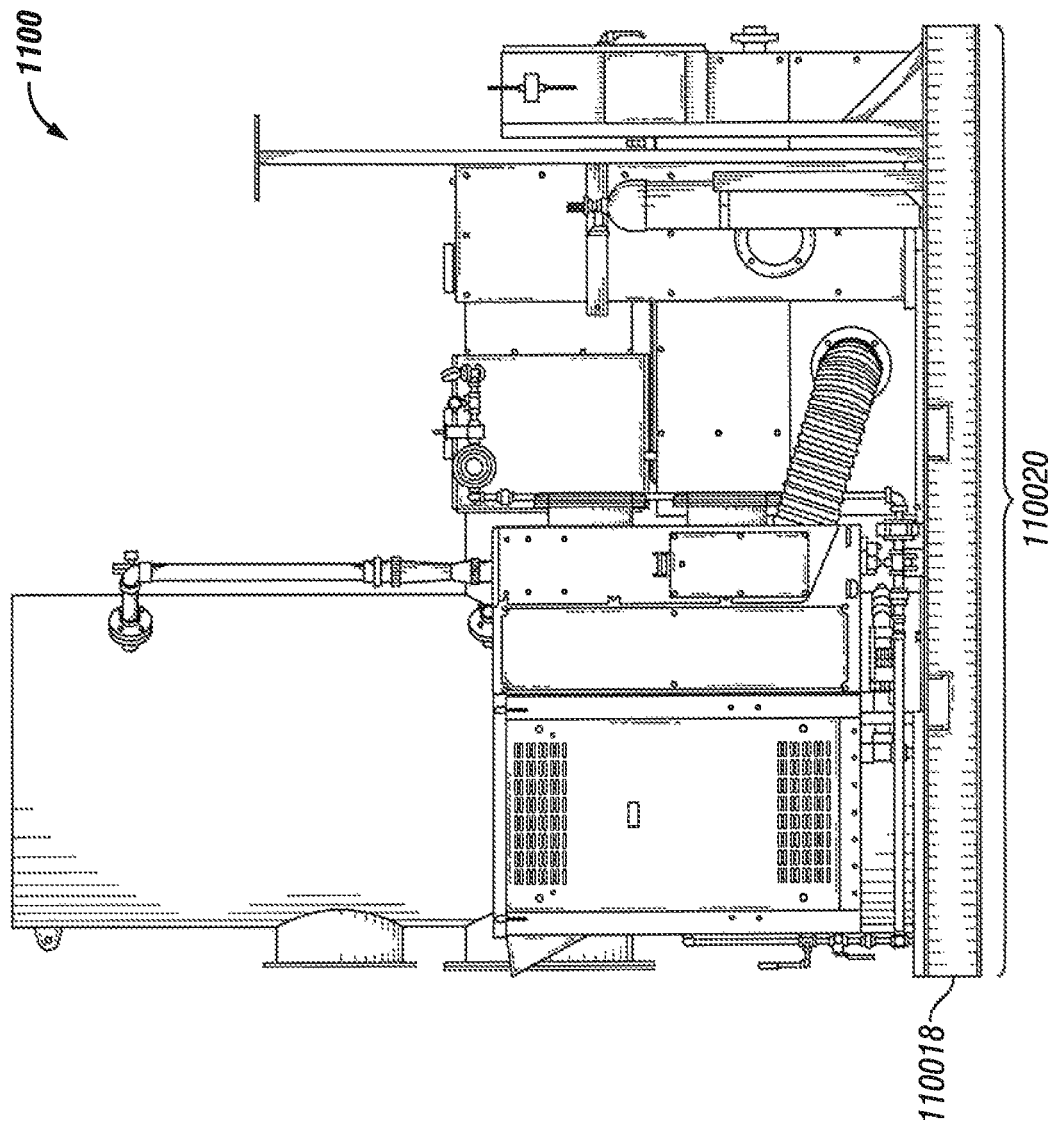
FIG. 11D illustrates a drawing of a rear view of the exemplary system of FIGS. 11A-11C.
Figure 11E:
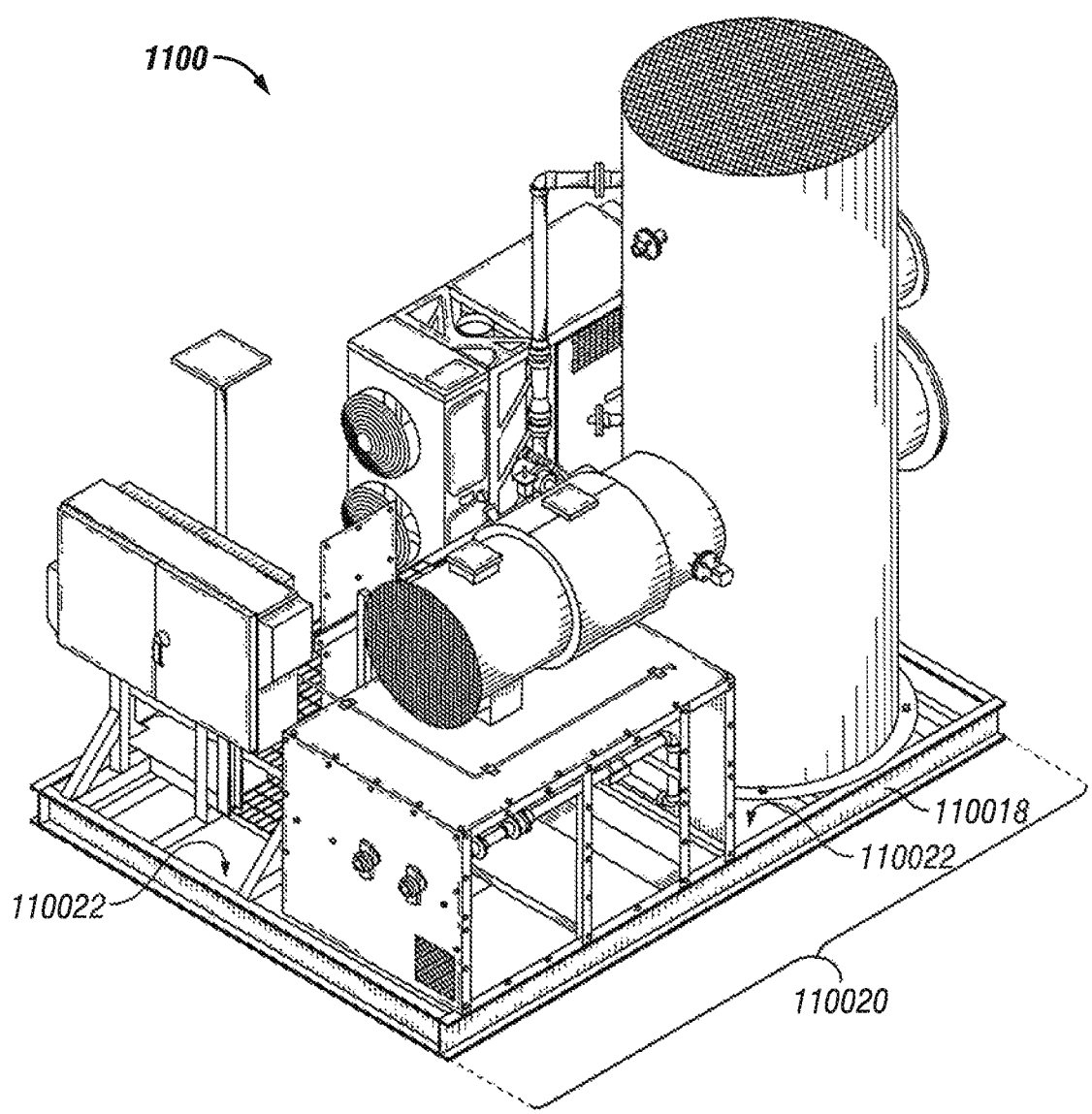
FIG. 11E illustrates a drawing of a rear, right upper perspective view of the exemplary system of FIGS. 11A-11D.
Figure 11F:
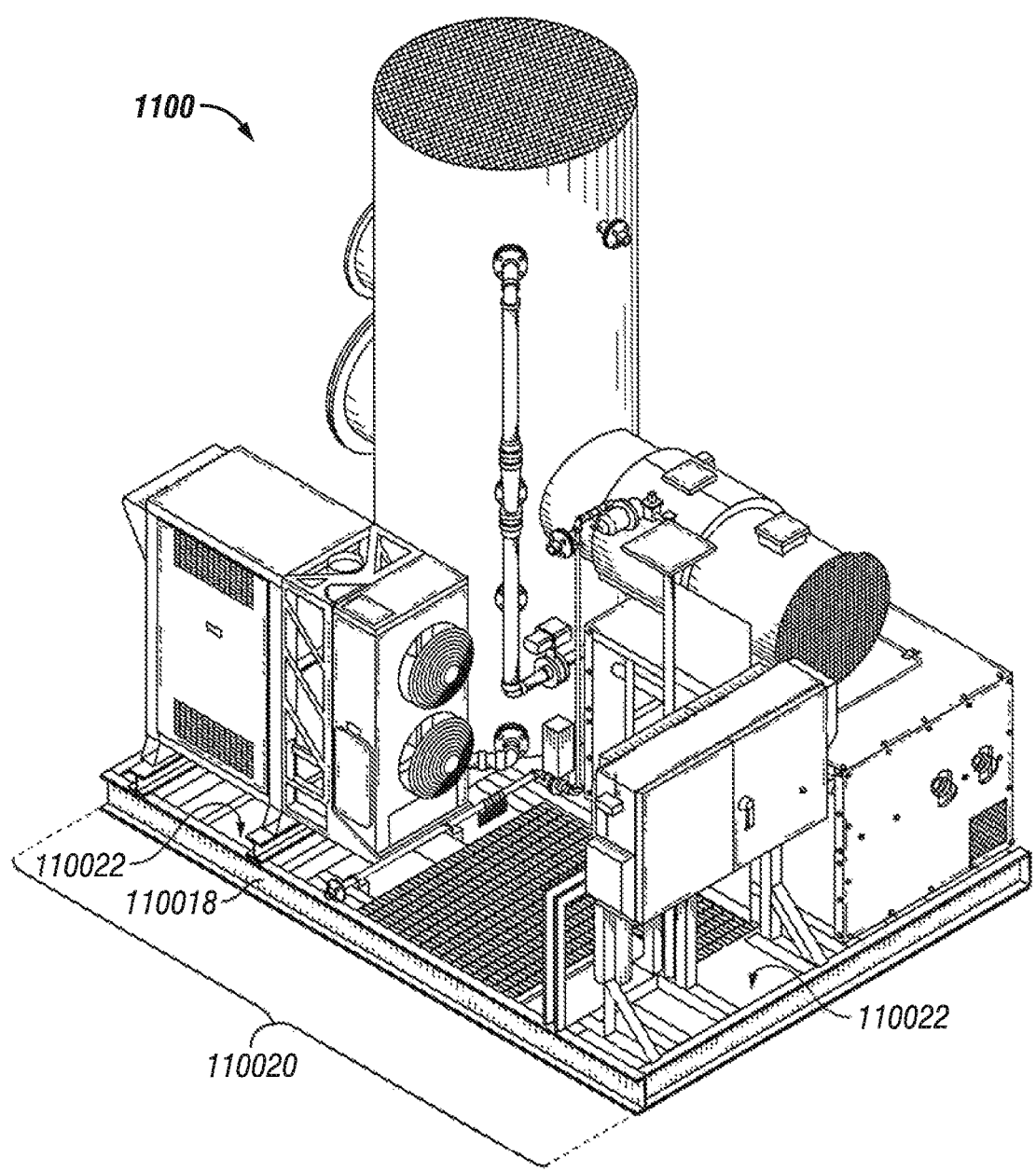
FIG. 11F illustrates a drawing of a rear, left upper perspective view of the exemplary system of FIGS. 11A-11E.

As shown in FIGS. 10A-10B, the demister element 1045 forms an upper portion of the cylindrical shape of the container 1039. In an embodiment, the demister element 1045 (e.g., upper portion) may be a cylindrical shape from about 4-feet diameter to about 16-feet diameter and from about 4-inches thick to about 12-inches thick (and any range or value there between).

In an embodiment, the demister element 1045 (e.g., side portion) may be a cuboid shape about 2-feet wide by about 13-feet long and from about 6-inches thick to about 12-inches thick (and any range or value there between). In an embodiment, the demister element 1045 (e.g., side portion) may be a cuboid shape about 2-feet wide by about 51-feet long and from about 4-inches thick to about 12-inches thick (and any range or value there between).

The evaporated water outlet 1046 comprises a plurality of outlet pores (not shown) in the demister element 1045.

During normal operations, the evaporated water (i.e., humidified air) may be discharged through the evaporated water outlet 1046 in the demister element 1045 to ambient environment (i.e., air).

Alternatively, the evaporated water (i.e., humidified air) from the evaporated water outlet 1046 in the demister element 1045 may be collected and condensed for use in drilling or completion operations, or collected and discharged to ambient environment (e.g., pond) dependent provided the condensed water satisfies environmental discharge limits.

In an embodiment, the evaporated water (i.e., humidified air) from the evaporated water outlet 1046 in the demister element 1045 may be collected in a low pressure conduit. In an embodiment, the evaporated water (i.e., humidified air) from the evaporated water outlet 1046 in the demister element 1045 may be collected and condensed in a low pressure conduit. In an embodiment, a portion of the conduit may be cooled and/or refrigerated. In an embodiment, a portion of the conduit may be cooled and/or refrigerated to a temperature at or below a dew point temperature of water vapor at the conduit pressure.

In an embodiment, an evaporated water (i.e., humidified air) recovery method may be any suitable condensation or water recovery method. For example, a suitable evaporated water recovery method, includes but is not limited to, recovery of evaporated water by condensation on a cooled or refrigerated surface that is at a temperature at or below the dew point temperature of water vapor at the conduit pressure.

In an embodiment, the system 1000, 1100 may further comprise a container 1039 comprising a sump (bottom) of the container 1039.

In an embodiment, the system 1000, 1100 may further comprise a first sacrificial anode (not shown) and a second sacrificial anode (not shown) for galvanic cathode (corrosion) protection of the container 1039. (See e.g., FIGS. 1A-1B: 197 & 198). The first sacrificial anode and the second sacrificial anode may be disposed in the sump (bottom) of the container 1039.

The first sacrificial anode (not shown) and the second sacrificial anode (not shown) may be made of any suitable galvanic anode material. (See e.g., FIGS. 1A-1B: 197 & 198). For example, suitable galvanic anode materials include, but are not limited to, aluminum, magnesium and zinc. In an embodiment, the first sacrificial anode and the second sacrificial anode may be made of aluminum and/or zinc.

Optional Post-Emissions Diffusers and Heaters

Under certain conditions, the evaporated water (i.e., humidified air) leaving the system 1000, 1100 may condense during cold weather conditions, causing a visible water vapor plume.

In an embodiment, the evaporated water (i.e., humidified air) may be heated (to raise the evaporated water temperature to above the dew point) upstream of the evaporated water outlet 1046 in the demister element 1045. In an embodiment, the evaporated water (i.e., humidified air) may be heated via addition of preheated air upstream of the evaporated water outlet 1046 in the demister element 1045.

In an embodiment, the evaporated water (i.e., humidified air) may be heated (to raise the evaporated water temperature to above the dew point) downstream of the evaporated water outlet 1046 in the demister element 1045. In an embodiment, the evaporated water (i.e., humidified air) may be heated via addition of preheated air downstream of the evaporated water outlet 1046 in the demister element 1045.

In an embodiment, the system 1000, 1100 may further comprise a duct, wherein preheated air from the air preheater 1043 is directed into the container 1039 via the duct. In an embodiment, the system 1000, 1100 further comprises a duct, wherein preheated air from the air preheater 1043 is directed into the container 1039 at or near the evaporated water outlet 1046 in the demister element 1045 via the duct.

Optional Skid

In an embodiment, the system 1000, 1100 may further comprise a skid 110018. (See e.g., FIGS. 11A-11F). The system 1000, 1100 may be constructed on the skid 110018 designed to enable rapid, safe loading, transportation and unloading of equipment in both the factory and the field. In an embodiment, the skid 110018 may use an integral forklift pocket to enable safe handling by a forklift, and, after being unloaded from a trailer or a truck, the skid 110018 is strong enough to sit directly on unimproved ground. This enables rapid and safe loading and unloading with a minimum of equipment such as a forklift or a winch truck which are commonly available in the oilfield.

In various embodiments, the skid 110018 may include features, such as:
  structural supports for process piping and equipment
  grates for safe all-weather walking and access to equipment
  vibration isolation for generators and other process equipment
  antennae masts for satellite, radio or cellular signaling equipment
  structural support for electrical control and instrumentation equipment In an embodiment, the system 1000, 1100 including the skid 110018 may be any suitable size (i.e., height, length and width).

In an embodiment, the system 1000, 1100 including the container 1039 may be any suitable height. For example, a suitable height may be up to about 12 feet or even higher, and any range or value there between. In an embodiment, the height may be about 12 feet.

In an embodiment, an upper portion of the system 1000, 1100 including the container 1039 may be lowered and/or removed to enhance portability. In an embodiment, the upper portion of the system 1000, 1100 including the container 1039 may be lowered and/or removed to reduce the travel height to up to about 12 feet. The height of up to about 12 feet allows the system 1000, 1100 to be moved under most "low clearance" bridges and overpasses thereby avoiding time consuming alternative routes to bypass the low clearance bridges and overpasses. Further, the height of up to about 12 feet allows the system 1000, 1100 to be moved over most roads without a permit thereby reducing transportation cost and enabling the system 1000, 1100 to access areas a permit load cannot reach. The ability to lower and/or remove the upper portion of the system 1000, 1100 including the container 1039 decreases the travel height of the system 1000, 1100 below the height where a permit would be required.

In an embodiment, the system 1000, 1100 may be any suitable length. For example, a suitable length may be up to about 12 feet, and any range or value there between. In an embodiment, the length of the system 1000, 1100 may be 12 feet.

In an embodiment, the system 1000, 1100 may be any suitable width. For example, a suitable width may be up to about 8 foot six inches, and any range or value there between. In an embodiment, the width may be about 8 feet six inches.

The width of up to about 8 foot 6 inch allows the system 1000, 1100 to be moved over most roads without a permit thereby reducing transportation cost and enabling the system 1000, 1100 to access areas a permit load cannot reach.

The skid may be made of any suitable corrosion-resistant material. The skid may be made of coated metal or corrosion-resistant metals. Suitable coated metals include, but are not limited to, epoxy-coated carbon steels, plastic-coated carbon steels, and combinations thereof; suitable corrosion-resistant metals include, but are not limited to, stainless steels, and combinations thereof. In an embodiment, the skid may be made of epoxy-coated carbon steel and/or plastic-coated carbon steel.

Optional Trailer or Truck

In an embodiment, the system 1000, 1100 may further comprise a skid 110018 mounted on or removeably secured to a trailer or a truck.

Optional Integrated Containment

In an embodiment, the system 1000, 1100 may further comprise a skid 110018. The system 1000 may be constructed on the skid 110018 designed to enable rapid, safe loading, transportation and unloading of equipment in both the factory and the field. In an embodiment, the skid 110018 may use an integral forklift pocket to enable safe handling by a forklift, and, after being unloaded from a trailer or a truck, the skid 110018 is strong enough to sit directly on unimproved ground. This enables rapid and safe loading and unloading with a minimum of equipment such as a forklift or a winch truck which are commonly available in the oilfield.

For many installations, federal and/or state environmental regulations require a leak proof containment to prevent potential pollution of soil, streams or other water bodies in the event of a leak or a malfunction. The leak proof containment must be sized to accommodate all the process wastewater plus a safety factor. Common methods of containment include earthen berms, waterproof membranes, and impervious clay liners. These methods have a number of drawbacks including a high capital cost, a potential for damage to containment by equipment or burrowing animals, and a likelihood of ground disruption from excavation and placement of a liner.

In an embodiment, the system 1000, 1100 may further comprise an integrated containment system 110020 comprising a liner 110022 surrounded by a skid 110018. In an embodiment, the system 1000, 1100 may further comprise an integrated containment system 110020 comprising a skid 110018 surrounded by a factory-installed liner 110022.

The liner 110022 may be any suitable corrosion-resistant material. The liner 110022 may be made of any coated metal or any corrosion-resistant metals or plastics. Suitable coated metals include, but are not limited to, epoxy-coated carbon steels, fiberglass-coated carbon steels, plastic-coated carbon steels, and combinations thereof; suitable corrosion-resistant metals include, but are not limited to, stainless steels, and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluoroethylene (PTFE) polymers, and combinations thereof. In an embodiment, the liner 110022 may be made of epoxy-coated carbon steel and/or plastic-coated carbon steel. In an embodiment, the liner 110022 may be made of fiberglass. In an embodiment, the liner 110022 may be made of fiberglass-coated carbon steel.

Once installed, the liner 110022 will, inevitably, retain not only process wastewater but also rain and snow melt. Because that rain and snowmelt is collected in the liner 110022, the rain and snow melt must be treated as process wastewater.

In an embodiment, the system 1000, 1100 may further comprise a draw line.

An inlet of the draw line is disposed in the liner.

An outlet of the draw line may be fluidly connected to an inlet of the pump 1018 to draw accumulated water from the liner into the system 1000, 1100 for evaporation.

An outlet of the draw line may be fluidly connected to an inlet of the container 1039 to draw accumulated water from the liner into the system 1000, 1100 for evaporation.

This rain and snow melt is typically low in dissolved solids and suspended solids, allowing very high rates of evaporation. The ability to contain water and evaporate the water using the system 1000, 1100 represents a significant benefit in terms of cost, reliability, and environmental impact.

Recirculation System

In an embodiment, the system 1000, 1100 may further comprise a third (pump supply) valve 1055, and a draw line 1055a.

An inlet of the third (pump supply) valve 1055 may be fluidly connected to the draw line 1055a and/or the first (recirculating) outlet of the container 1039 at a first height of the container 1039 via pipe 1016a.

An inlet of the draw line 1055a is fluidly disposed in a sump (bottom of the container 1039.

An outlet of the draw line 1055a may be fluidly connected to the first (recirculating) outlet of the container 1039 at the first height of the container 1039. In an embodiment, the first height of the container 1039 may be about 6 inches to about 4 feet (and any range or value there between). In an embodiment, the first height of the container 1039 may be from about 6 inches to about 1 foot.

An outlet of the third (pump supply) valve 1055 may be connected to an inlet of the pump 1018 via pipe 1016b.

An outlet of the pump 1018 may be connected to an inlet of the second (feed/recirculating) valve 1054 via pipe 1020a.

An outlet of the second (feed/recirculating) valve 1054 may be connected to an inlet of a first manifold 1028 or a drip system 1034 via a pipe 10126a/1026b. In an embodiment, the system 1000, 1100 may further comprise a third (pump supply) valve 1055. The third (pump supply) valve 1055 may be any suitable switching valve. Suitable third (pump supply) valves 1055 include, but are not limited to, ball valves. For example, a suitable third (pump supply) valve 1055 is available from GF Piping Systems. In an embodiment, the third (pump supply) valve 1055 may be a GF Piping System Type 546 Electric Actuated Ball Valve from GF Piping Systems. In an embodiment, the third (pump supply) valve 1055 may be automatic or manual. In an embodiment, the third (pump supply) valve 1055 may be electric or pneumatic actuation. In an embodiment, the third (pump supply) valve 1055 may be normally CLOSED.

In an embodiment, the third (pump supply) valve 1055 may have 2-inch connections.

The third (pump supply) valve 1055 may be made of any suitable corrosion-resistant material. The third (pump supply) valve 1055 may be made of any suitable corrosion-resistant metals or plastics. Suitable metals include, but are not limited to, plastic-coated carbon steel, stainless steel, Hastelloy® alloy, Monel® alloy and combinations thereof; and suitable plastic include, but are not limited to, polyvinylchloride (PVC) polymers, chlorinated polyvinyl chloride (CPVC) polymers, fiberglass reinforced plastic (FRP), Kynar® polyvinylidene fluoride (PVDF) polymers, polyethylene polymers, polypropylene polymers, Teflon® perfluoroalkoxy (PFA) polymers, Teflon® polytetrafluroethylene (PTFE) polymers, and combinations thereof. In an embodiment, the third (pump supply) valve 1055 (wetted components) may be made of polyvinyl chloride (PVC) and ethylene propylene diene monomer (EPDM) rubber.

In an embodiment, the system 1000, 1100 may further comprise an optional fifth limit switch (not shown) and an optional sixth limit switch (not shown). (See e.g., FIGS. 1A-1B: 113 & 114). In an embodiment, the fifth limit switch confirms that the third (pump supply) valve 1055 is OPEN; and the sixth limit switch confirms that the third (pump supply) valve 1055 is CLOSED.

The pump 1018 may be any suitable pump. Suitable pumps 1018 include, but are not limited to, centrifugal pumps. For example, a suitable pump 1018 is available from MP Pumps Inc. In an embodiment, the pump 1018 may be a FLOMAX® 8 Self-Priming Centrifugal Pump from MP Pumps Inc. In an embodiment, the pump 1018 may be about 1 to about 3 HP centrifugal pump. In an embodiment, the pump 1018 may be about a 1.5 HP variable speed pump.

In an embodiment, the pump 1018 may have 2-inch connections.

The pump 1018 may be made of any suitable corrosion-resistant material. The pump 1018 may be made of any suitable corrosion-resistant metals or plastics. Suitable metals include, but are not limited to, cast iron, stainless steel, super-duplex stainless steel, AL-6XN alloy, Ni—Al—Brz alloy, Hastelloy® alloy, Monel® alloy and combinations thereof and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. For example, the pump 1018 (wetted components) may be made of stainless steel, super-duplex stainless steel, AL-6XN alloy, Ni—Al—Brz alloy, Hastelloy® alloy, Monel® alloy or FRD. In an embodiment, the pump 1018, including internal wetted components, was made of 316 stainless steel. In an embodiment, the pump 1018 may be made of cast iron if a shorter service life is acceptable.

The pipe 1016a, 1016b, 1020a, 1026a, 1026b may be made of any suitable corrosion-resistant pipe. The pipe 1016a, 1016b, 1020a, 1026a, 1026b may be any suitable corrosion-resistant metals or plastics. Suitable metals include, but are not limited to, plastic-coated carbon steel, stainless steel, super-duplex stainless steel, AL-6XN alloy, Ni—Al—Brz alloy, Hastelloy® alloy, Monel® alloy and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluoroethylene (PTFE) polymers, and combinations thereof. In an embodiment, the pipe 1016a, 1016b, 1020a, 1026a, 1026b may be made of plastic-coated carbon steel. In an embodiment, the pipe 1016a, 1016b, 1020a, 1026a, 1026b may be made of Plasite 7159 HAR-coated carbon steel. In an embodiment, the pipe 1008a, 1008b, 1016a, 1016b, 1020a, 1026a, 1026b may be made of 316 stainless steel.

In an embodiment, the pipe 1016a, 1016b, 1020a, 1026a, 1026b may be 2-inch pipe.

Flow Indicators or Meters

In an embodiment, the system 1000, 1100 may further comprise a first flow indicator or meter 1022a and a second flow indicator or meter 1022b.

An outlet of the first (feed) valve 1012 may be connected to an inlet of the first flow indicator or meter 1022a via pipe 1008b.

An outlet of the first flow indicator or meter 1022a may be connected to an inlet of a pipe 1016a or an inlet of a pump 1018 via a line 1008b.

An outlet of the second (feed/recirculating) valve 1054 may be connected the inlet of the second flow indicator or meter 1022b via a pipe 1026a.

An outlet of the second flow indicator or meter 1022b may be fluidly connected to an inlet of a first manifold 1028 or a drip system 1034 via a pipe 1026b.

The first flow indicator or meter 1022 and the second flow indicator or meter 1022b may be any suitable flow indicator or meter. Suitable first flow indicators or meters 1022a and a second flow indicator or meter 1022b include, but are not limited to, magnetic, paddlewheel, ultrasonic vortex and insertion-type vortex flow meters. For example, a suitable first flow indicator or meter 1022a and a second flow indicator or meter 1022b is available from Georg Fischer Signet LLC. In an embodiment, the first flow indicator of meter 1022a and the second flow indicator or meter 1022b may be a Signet 2536 Rotor-X Paddlewheel Flow Sensor from Georg Fischer Signet LLC. In an embodiment, the first flow indicator of meter 1022a and the second flow indicator or meter 1022b may be electrically connected to the PLC or computing device 600.

The pipe 1008b, 1016a, 1026a, 1026b may be made of any suitable corrosion-resistant pipe. The pipe 100b, 1016a, 1026a, 1026b may be any suitable corrosion-resistant metals or plastics. Suitable metals include, but are not limited to, plastic-coated carbon steel, stainless steel, super-duplex stainless steel, AL-6XN alloy, Ni—Al—Brz alloy, Hastelloy® alloy, Monel® alloy and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the pipe 1008b, 1016a, 1026a, 1026b may be made of plastic-coated carbon steel. In an embodiment, the pipe 1008b, 1016a, 1026a, 1026b may be made of Plasite 7159 HAR-coated carbon steel. In an embodiment, the pipe 1008b, 1016a, 1026a, 1026b may be made of 316 stainless steel.

In an embodiment, the pipe 1008b, 1016a, 1026a, 1026b may be 2-inch pipe.

Optional Basket Strainer

In an embodiment, the system 1000, 1100 may further comprise a basket strainer (not shown) and an optional first pressure sensor (not shown). (See e.g., FIGS. 1A-1B: 124). An inlet of the basket strainer (not shown) may be fluidly connected to an outlet of pipe 1026a and an outlet of the basket strainer (not shown) may be fluidly connected to an inlet of pipe 1026a. The basket strainer retains debris in the water feed to prevent clogging of the drip orifice 1038. An obstruction in the basket strainer may be detected via a decreased feed rate at the first flow indicator of meter 1022.

The basket strainer (not shown) may be any suitable basket strainer, and may contain a reusable or disposable mesh or synthetic fiber bag. (See e.g., FIGS. 1A-1B: 124). A suitable basket strainer includes, but is not limited to, ⅛-inch perforated baskets, contained within a simplex or duplex housing. For example, a suitable basket strainer is available from Hayward or Rosedale. In an embodiment, the basket strainer may be a ⅛-inch perforated basket from Hayward or Rosedale.

The basket strainer (not shown) may be made of any suitable corrosion-resistant material. (See e.g., FIGS. 1A-1B: 124). The basket strainer may be made of any suitable corrosion-resistant metals or plastics. The basket strainer may be any suitable metal or plastic basket strainer. Suitable metals include, but are not limited to, stainless steel, Hastelloy® alloy, Monel® alloy and combinations thereof; and suitable plastics include, but are not limited to, chlorinated polyvinyl chloride (CPVC) polymers, Kynar® polyvinylidene fluoride (PVDF) polymers, polyvinyl chloride (PVC) polymers, Teflon® perfluoroalkoxy (PFA) polymers, Teflon® polytetrafluroethylene (PTFE) polymers, and combinations thereof. In an embodiment, the basket strainer (basket) may be made of 316 stainless steel.

In an embodiment, the optional first pressure sensor (not shown) may be fluidly connected to either the pipe 1026a or the inlet of the basket strainer (not shown). (See e.g., FIGS. 1A-1B: 124). An obstruction in the basket strainer may also be detected via an increase in pressure at the optional first pressure sensor (not shown).

The optional first pressure sensor (not shown) may be any suitable pressure sensor. For example, a suitable first pressure sensor is available from Rosemount, Inc. In an embodiment, the first pressure sensor may be a Rosemount 2088 Absolute and Gage Pressure Transmitter from Rosemount, Inc.

An outlet of the pump 1018 may be connected to an inlet of a basket strainer (not shown) via pipe 1020a/1026a. (See e.g., FIGS. 1A-1B: 124). An outlet of the basket strainer (not shown) may be connected to an inlet of the drip system 1034 or the drip orifice 1038 via a pipe 1020b, 1026a, 1026b. (See e.g., FIGS. 1A-1B: 124).

The pipe 1020a, 1026a may be made of any suitable corrosion-resistant pipe. The pipe 1020a, 1026a may be any suitable metal or plastic pipe. Suitable metals include but are not limited to, plastic-coated carbon steel, stainless steel, super-duplex stainless steel, AL-6XN alloy, Ni—Al—Brz alloy, Hastelloy® alloy, Monel® alloy and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the pipe 1020a, 1026a may be made of plastic-coated carbon steel. In an embodiment, the pipe 1020a, 1026a may be made of Plasite 7159 HAR-coated carbon steel. In an embodiment, the pipe 1020a, 1026a may be made of 316 stainless steel.

In an embodiment, the pipe 1020a, 1026a may be 2-inch pipe.

Drip System

In an embodiment, the system 1000, 1100 may further comprise a first manifold 1028 and drip system 1034.

An outlet of the second (feed/recirculating) valve 1054 may be connected to an inlet of the first manifold 1028, a drip system 1034 and/or a second (manifold) inlet to the container 1039 at a second height of the container 1039 via a pipe 1020a/1026a/1026b. In an embodiment, the second height of the container 1039 may be about 8 feet to about 12 feet (and any range or value there between). In an embodiment, the second height of the container 1039 may be from about 9 to about 10 feet.

An outlet of the first manifold 1028 may be connected to the inlet of a drip system 1034. In an embodiment, the drip system 1034 comprises a drip manifold 1036 and a drip orifice 1038, wherein the drip orifice 1038 may be connected to or integral with an outlet of the drip manifold 1036. In an embodiment, the drip system 1034 is disposed inside the container 1039.

An outlet of the drip orifice 1038 discharges wastewater and/or water droplets inside the container 1039. An upper portion or top side of the container 1039 is enclosed with the demister element 1045 to retain the wastewater and/or water droplets inside the container 1039. In an embodiment, a side portion of the container 1039 may also be enclosed with the demister element 1045 to retain the wastewater and/or water droplets inside the container 1039. The demister element 1045 is secured to and supported by the container 1039 in a manner customary in the art.

At least some of the wastewater and/or water droplets evaporate to form water vapor. The water vapor passes through the demister element 1045 and out the evaporated water outlet 1046. Any un-evaporated water is retained by the demister element 1045 and falls to a sump (bottom) of the container 1039.

In an embodiment, the drip system 1034 comprises a drip manifold 1036 and a plurality of drip orifice 1038', 1038" wherein each of the plurality of drip orifice 1038', 1038" may be connected to or integral with an outlet of the drip manifold 1036. Outlets of the plurality of drip orifice 1038', 1038" discharge wastewater and/or water droplets inside the container 1039. An upper portion or top side of the container 1039 is enclosed with the plurality of demister elements 1045', 1045" to retain the wastewater and/or water droplets inside the container 1039. In an embodiment, a side portion of the container 1039 is also enclosed with the demister element 1045 to retain the wastewater and/or water droplets inside the container 1039. The plurality of demister elements 1045', 1045" are secured to and supported by the container 1039 in a manner customary in the art.

At least some of the wastewater and/or water droplets evaporate to form water vapor. The water vapor passes through pores (tortuous paths) in the plurality of demister elements 1045', 1045" and out the evaporated water outlet 1046. Any un-evaporated water is retained by the plurality of demister elements 1045', 1045" and falls to the sump (bottom) of the container 1039.

The evaporated water outlet 1046 comprises a plurality of outlet pores (not shown) in the plurality of demister elements 1045', 1045".

The drip orifice 1038 may be any suitable drip orifice. In an embodiment, the drip orifice 1038 are disposed inside the container 1039.

The drip orifice 1038 may be made of any suitable corrosion-resistant material. The drip orifice 1038 may be made of any suitable corrosion-resistant metals or plastics. Suitable metals, include, but are not limited to, brass, Cobalt Alloy 6, reaction bonded silicon carbide (RBSC) ceramic, stainless steel, Hastelloy® alloy, Monel® alloy, and combinations thereof; and suitable plastics, include, but are not limited to, polypropylene, polytetrafluroethylene (PTFE), polyvinyl chloride (PVC), and combinations thereof. In an embodiment, the drip orifice 1038 (wetted component) may be made of PVC.

Mist Arresting System

In an embodiment, the system 1000, 1100 may further comprise a mist arresting system 1044 and a container 1039. In an embodiment, the mist arresting system 1044 comprises a plurality of demister elements 1045', 1045" and the container 1039.

Evaporation System

In an embodiment, the system 1000, 1100 may further comprise an evaporation system 1056.

The performance of the evaporation system 1056 is impacted significantly by two factors: an evaporation rate at which water is evaporated (measured in barrels/day) and an emission rate at which particulate contaminants are emitted (measured as a tons/year). The evaporation rate is central to the function of the evaporation system 1056. The more water evaporated for a given amount of capital and energy input, the more value is created.

The emission rate is central to the ability to get a permit for installation and operation of the system 1000, 1100. Wastewater typically contains dissolved and suspended solids. Emissions of these substances is regulated by both Federal and State agencies. The ability to get a permit is based on the demonstrated performance of the system's 1000, 1100 ability to limit the emission of dissolved and suspended solids.

The system's 1000, 1100 technology represents a significant improvement in both of these performance areas: evaporation rate and emission rate.

In an embodiment, the system 1000, 1100 may further comprise an evaporation system 1056 comprising a packing system 1058 and/or tray system 1064 (discussed below).

The system's 1000, 1100 use of the packing system 1058 and/or tray system 1064 (discussed below), the recirculation system (discussed above) and an air blower and preheater system 1041 (discussed below) provides an improved evaporation performance when compared to a plurality of spray nozzles 138, 23, 338, 442, 542 in a large horizontal container 139, 239, 339, 444, 544 (discussed above). This improved performance results from a more efficient evaporation mechanism. The system 1000, 1100 uses a vertical cascade of water passing through a porous packing 1062 to achieve efficient transfer of water from the liquid phase to the vapor phase. As a result, the system 1000, 1100 discharges evaporated water (i.e., humidified air) through the evaporated water outlet 1046 in the demister element 1045 to ambient environment (i.e., air) at or near saturation at the air blower and preheater system's 1041 temperature and the system's 1000, 1100 pressure representing a peak of process efficiency.

The vertical cascade of water and porous packing 1062 used in the system 1000, 1100 provides additional benefits in terms of particulate emissions. Particulate emissions may include both dissolved solids (e.g., salts) and suspended solids (e.g., some minerals). The vertical cascade of water reduces the formation of dry particles and the porous packing 1062 shifts the evaporation site from an airborne droplet to the surface of the porous packing 1062. A wide range of packing 1062 is available with different sizes, shapes, and performance characteristics. The system's 1000, 1100 packing 1062 is selected to maximize evaporation and saturate the airstream with water vapor while limiting contaminants in the airstream.

Packing System and/or Tray System

In an embodiment, the system 1000, 1100 may further comprise a packing system 1058 and/or tray system 1064.

In an embodiment, the packing system 1058 comprises a porous tray 1060 installed at a third height in the container 1039 and a packing 1062 from a third height of the container 1039 to a fourth height in the container 1039. In an embodiment, the third height of the container 1039 may be about 4 feet to about 8 feet (and any range or value there between). In an embodiment, the third height of the container 1039 may be about 6 feet.

In an embodiment, the fourth height of the container 1039 may be about 5 feet to about 11 feet (and any range or value there between). In an embodiment, the fourth height of the container 1039 may be about 9 feet.

The porous tray 1060 may be any suitable porous tray. For example, a suitable porous tray 1060, includes but is not limited to, a grating and a mesh. The porous tray 1060 may be made of any suitable corrosion-resistant metals or plastics. Suitable metals include, but are not limited to, stainless steel, Hastelloy® alloy, Monel® alloy and combinations thereof; and suitable plastics include, but are not limited to, chlorinated polyvinyl chloride (CPVC) polymers, Kynar® polyvinylidene fluoride (PVDF) polymers, polyvinyl chloride (PVC) polymers, polyethylene polymers, polypropylene polymers, Teflon® perfluoroalkoxy (PFA) polymers, Teflon® polytetrafluroethylene (PTFE) polymers, and combinations thereof. In an embodiment, the porous tray 1060 may be made of 316 stainless steel.

A wide range of packing 1062 is available with different sizes, shapes, and performance characteristics. The packing 1062 provides a high surface area for interaction flowing water and heated air with minimum flow restriction to maximize evaporation to saturate the airstream with water vapor. The packing 1062 is selected to maximize evaporation (i.e., saturate the airstream with water vapor) while limiting contaminants in the airstream.

The packing 1062 may be any suitable packing. For example, a suitable packing 1062, includes but is not limited to, random packing, structured packing and combinations thereof.

The packing 1062 should be made of a material that is relatively inert to the flowing water. The packing 1062 may be made of any suitable ceramic material, corrosion-resistant metals, plastics and combinations thereof. Suitable metals include, but are not limited to, stainless steel, Hastelloy® alloy, Monel® alloy and combinations thereof; and suitable plastics include, but are not limited to, chlorinated polyvinyl chloride (CPVC) polymers, Kynar® polyvinylidene fluoride (PVDF) polymers, polyvinyl chloride (PVC) polymers, polyethylene polymers, polypropylene polymers, Teflon® perfluoroalkoxy (PFA) polymers, Teflon® polytetrafluroethylene (PTFE) polymers, and combinations thereof.

In an embodiment, the packing 1062 may be made of ceramics, corrosion-resistant metals, plastics, and combinations thereof. For example, the packing 1062 may be made of ceramics and/or metals if the air temperature exceeds the temperature limit for plastics.

In an embodiment, the packing 1062 may be made from different materials (e.g., ceramics, plastics, stainless steel) to improve performance at high temperatures.

In an embodiment, the packing 1062 may be a random packing. In an embodiment, the packing 1062 may be a random packing made of ceramics, corrosion-resistant metals, plastics, and combinations thereof. In an embodiment, the packing 1062 may be made of a Teflon® polytetrafluroethylene (PTFE) polymer random packing. In an embodiment, the packing 1062 may be a Koch-Glitch FLEXIRING® random packing.

In an embodiment, the packing 1062 may be a structured packing. In an embodiment, the packing 1062 may be a structured packing made of metals, plastics, and combinations thereof. In an embodiment, the packing 1062 may be made of corrugated metals, corrugated plastics, and combinations thereof. In an embodiment, the packing 1062 may be made of mesh-type plastics, mesh-type metals, and combinations thereof. In an embodiment, the packing 1062 may be made of solid-type plastics, solid-type metals, and combinations thereof.

In an embodiment, the packing 1062 may be made from different materials (e.g., ceramics, plastics, stainless steel) to improve performance at high temperatures.

In an embodiment, the packing 1062 may be a loose fill packing, a cartridge-type packing or another containerized form packing. In an embodiment, the packing 1062 may be a cartridge-type packing or another containerized form packing that is easily removed for cleaning.

In an embodiment, the tray system 1064 comprises a first cascading tray 1066 installed at a fifth height in the container 1039 and a second cascading tray 1068 installed at a sixth height in the container 1039 and offset from the first cascading tray 1066 such that the wastewater and/or water droplets are transferred from the first cascading tray 1066 to the second cascading tray 1068. In an embodiment, the fifth height of the container 1039 may be about 5 feet to about 11 feet (and any range or value there between). In an embodiment, the fifth height of the container 1039 may be about 9 feet.

In an embodiment, the sixth height of the container 1039 may be about 4 feet to about 10 feet (and any range or value there between). In an embodiment, the sixth height of the container 1039 may be from about 8 feet to about 9 feet.

The first cascading tray 1066 and the second cascading tray 1068 may be any suitable cascading tray. For example, a suitable first cascading tray 1066 and a second cascading tray 1068, includes but is not limited to, an evaporation tray and a sieve tray and combinations thereof. The first cascading tray 1066 and the second cascading tray 1068 may be made of any suitable corrosion-resistant metals or plastics. Suitable metals include, but are not limited to, stainless steel, Hastelloy® alloy, Monel® alloy and combinations thereof and suitable plastics include, but are not limited to, chlorinated polyvinyl chloride (CPVC) polymers, Kynar® polyvinylidene fluoride (PVDF) polymers, polyvinyl chloride (PVC) polymers, polyethylene polymers, polypropylene polymers, Teflon® perfluoroalkoxy (PFA) polymers, Teflon® polytetrafluroethylene (PTFE) polymers, and combinations thereof. In an embodiment, the first cascading tray 1066 and the second cascading tray 1068 may be made of 316 stainless steel.

In an embodiment, the system 1000, 1100 may further comprise a first differential pressure switch 1053. The differential pressure switch 1053 measures the pressure drop across the packing system 1058 and/or tray system 1064. If the first differential pressure switch 1053 is activated, the packing system 1058 and/or tray system 1064 may be blocked due to flooding or scale build-up. In an embodiment, the first differential pressure switch 148 may be set to about 0.4 inches water column.

The differential pressure switch 1053 may be any suitable differential pressure sensor. For example, a suitable differential pressure switch 1053 is available from Dwyer Instruments Inc. In an embodiment, the differential pressure switch 1053 may be a Series 3000 Photohelic Differential Pressure Gage from Dwyer Instruments Inc. In an embodiment, the first differential pressure switch 1053 has a range from about 0 to about 0.5 inches water column.

The first differential pressure switch 1053 may be fluidly connected to the container 1039.

Air Blower and Preheater System

In an embodiment, the system 1000, 1100 may further comprise a first air blower 1042 and an optional second pressure sensor 1043c. In an embodiment, air flow from the first air blower 1042 disperses the wastewater and/or water droplets from the drip orifice 1038. In an embodiment, the first air blower 1042 is disposed through a wall of the container 1039 such that air flow from the air blower 1042 is counter to and/or crossways to the wastewater and/or water droplets from the drip orifice 1038. In an embodiment, the first air blower 1042 may be disposed through a wall of the container 1039 upstream of the demister elements 1045 as a forced-draft air blower. In other words, the container 1039 (i.e., evaporation chamber) may be operated at a positive pressure via the forced-draft air blower 1042.

The first air blower 1042 may be any suitable axial blower. In an embodiment, the first air blower 1042 may be a fixed or variable-speed air blower. In an embodiment, the first air blower 1042 may provide from about 4,000 CFM to about 10,000 CFM (and any range or value there between). In an embodiment, the first air blower 1042 may provide about 4,500 CFM. In an embodiment, the first air blower 1042 may be about 3 HP.

In an embodiment, the system 1000, 1100 may further comprise an air blower and preheater system 1041. For example, the air blower and preheater system 1041 may be disposed through a lower wall of the container 1039 when the drip orifice 1038', 1038" of the drip system 1034 discharge toward the top of the container 1039.

In an embodiment, the air blower and heater system 1041 comprises a first air blower 1042 and an air preheater 1043. In an embodiment, an air flow outlet of the first air blower 1042 is fluidly connected to an air flow inlet of the air preheater 143.

The air preheater 1043 may be any suitable heater. For example, a suitable heater includes, but is not limited to, a direct-fired heater, a duct heater, a forced air heater, a line heater, a recuperative heater, a supplied air heater, a tube-type heater, and combinations thereof.

In an embodiment, the air preheater 1043 comprises a natural gas burner. (See e.g., FIGS. 10A & 10B). The natural gas burner may be any suitable burner. For example, suitable burners include, but are not limited to, drying grain-type burners, firing boiler-type burners, heating air-type burners, heating water-type burners, and combinations thereof.

In an embodiment, the air preheater 1043 comprises a natural gas burner and a natural gas flow control valve. The natural gas flow control valve may be any suitable gas flow control valve. In an embodiment, the natural gas flow control valve may provide a fixed flow or a modulated flow to the natural gas burner to control a resulting air temperature based on ambient air temperature and a desired evaporation rate. In an embodiment, the natural gas flow control valve may be modulated from a fully OPEN position to a fully CLOSED position, and vice versa.

In an embodiment, the burner position may be moved relative to position of the drip system 1034 and/or the packing system 1058 to optimize temperature distribution in the system 1000, 1100 to increase efficiency and minimize particulate emissions.

In an embodiment, the preheater 1043 may also have a natural gas powered electric generator. The natural gas powered electric generator may be any suitable electric generator.

In an embodiment, the air preheater 1043 may provide an air heating rate from about 0 million BTU per hour to about 5 million BTU per hour (and any range or value there between). In an embodiment, the air preheater 1043 may provide an air heating rate of about 2.1 million BTU per hour.

In an embodiment, the air preheater 1043 may provide air temperatures from about 50° F. to about 400° F.

In an embodiment, the optional second pressure sensor 1043c may be fluidly connected to an air outlet of the air blower or the air preheater 1043.

The optional second pressure sensor 1043c may be any suitable pressure sensor. For example, a suitable second pressure sensor 1043c is available from Rosemount, Inc. In an embodiment, the optional second pressure sensor 1043c may be a Rosemount 2088 Absolute and Gage Pressure Transmitter from Rosemount, Inc.

Optional Second Air Inlet

The efficiency of the evaporation process may be increased by mixing the hot air and wastewater to achieve a uniform temperature in the airstream and, thereby, promoting complete saturation of the air with water vapor. A turbulent airstream promotes thorough mixing by increasing the physical contact of all elements of the hot air with the counterflowing wastewater and/or water droplets. One way of promoting turbulence is to have two or more air inlets disposed through the wall of the container 1039 at angle(s) such that the two or more airflows collide and mix together. This mixing produces a single airstream of turbulent hot air. Upon contact with the wastewater, this turbulent airstream is maximally exposed to the wastewater and/or water droplets, and, thereby, evaporation is maximized to produce a saturated discharge.

Two or more air inlets may be achieved in several ways including, but not limited to, ducting, two or more air blower and preheater systems 1041, and combinations thereof. The use of two or more air blower and preheater systems 1041 would have the additional benefit of increasing the overall energy input to the system 1000, 1100 and increasing the rate of evaporation, and, thereby, increasing efficiency without significantly enlarging the container 1039 (i.e., evaporation chamber).

Optional Second Air Blower

In an embodiment, the system 1000, 1100 may further comprise a second air blower (not shown). In an embodiment, air flow from the second air blower disperses the wastewater and/or water droplets from the drip orifice 1038. In an embodiment, the second air blower is disposed through a wall of the container 1039 such that air flow from the air blower is counter to and/or crossways to the wastewater and/or water droplets from the drip orifice 1038. In an embodiment, the second air blower may be disposed through a wall of the container 1039 downstream of the demister elements 1045 as an induced-draft air blower. In an embodiment, the second air blower is disposed through a wall of the container 1039 such that the air flow from a second air blower is counter to and/or crossways to the wastewater and/or water droplets from the drip orifice 1038. In other words, the container 1039 (i.e., evaporation chamber) may be operated at a negative pressure via the induced-draft air blower.

The second air blower may be any suitable axial blower. In an embodiment, the second air blower may be a fixed or variable-speed air blower. In an embodiment, the second air blower may provide from about 4,000 CFM to about 10,000 CFM (and any range or value there between). In an embodiment, the second air blower may provide about 4,500 CFM. In an embodiment, the second air blower may be about 3 HP.

Optional Air Deflectors, Diffusers and Vanes

When the hot air from the air blower and preheater system 1041 is introduced into an air inlet of the container 1039 (i.e., evaporation chamber), turbulence may be created and, as a result, the efficiency of the evaporation process may be compromised. The impact of turbulence can be reduced with a long or tall container 1039 but, to reduce the impact of uneven air distribution without lengthening the container 1039, a deflector and/or a diffuser may be installed within the container 1039 directly in the air flow path to redirect the air to equalize low and high air pressure areas and/or establish an even air discharge across the container 1039.

In an embodiment, the system 1000, 1100 may further comprise a deflector and/or a diffuser, wherein the deflector and/or diffuser may be disposed within the container 1039 at or near an air inlet to the container 1039.

The deflector and/or diffuser may be any suitable deflector or diffuser capable of redirecting the air to equalize low and high air pressure areas and/or to establish an even air discharge across the container 1039. For example, a suitable deflector or diffuser includes, but is not limited to, a flat metal sheet, an inclined metal sheet, a perforated metal sheet, a solid metal sheet, and combinations thereof to create a turning vane effect.

The deflector and/or diffuser may be any suitable size and shape.

In an embodiment, the size and location of the deflector and/or diffuser may be adjusted to achieve optimal performance based on air temperature, altitude, humidity, and other factors.

In an embodiment, the deflector and/or diffuser may be mounted to the container 1039 to allow adjustments during operation to achieve optimal performance based on air temperature, altitude, humidity, and other factors.

In an embodiment, the system 1000, 1100 may further comprise a vane, wherein the vane may be disposed in the container 1039 at or near an air inlet to the container 1039.

The vane may be any suitable vane capable of turning the direction of the air flow about 90 degrees (e.g., from horizontal to vertical) in the container 1039. For example, a suitable vane includes, but is not limited to, a flat metal sheet, an inclined metal sheet, a perforated metal sheet, a solid metal sheet, and combinations thereof to create a turning vane effect.

The vane may be any suitable size and shape.

In an embodiment, the size and location of the vane may be adjusted to achieve optimal performance based on air temperature, altitude, humidity, and other factors. In an embodiment, the vane may extend across the cross-section (e.g., diameter) of the container 1039.

In an embodiment, the system 1000, 1100 may further comprise a vane, wherein the vane may be disposed in an air duct between an air discharge outlet of the air blower and preheat system 1041 and an air inlet to the container 1039.

The vane may be any suitable vane capable of achieving the desired degree of mixing in the air duct. For example, a suitable vane includes, but is not limited to, a flat metal sheet, an inclined metal sheet, a perforated metal sheet, a solid metal sheet, and combinations thereof to create a mixing vane effect.

The vane may be any suitable size and shape.

In an embodiment, the size and location of the vane may be adjusted to achieve optimal performance based on air temperature, altitude, humidity, and other factors.

The air duct may be any suitable size and shape. In an embodiment, the length of the air duct may be adjusted to achieve optimal performance.

Optional Insulation and Supplementary Heating

In an embodiment, the system 1000, 1100 may further comprise supplementary heating using waste heat from a natural gas electric generator or a natural gas burner to protect the system 1000, 1100 from subfreezing temperatures.

As discussed above, the system 1000, 1100 may have an air preheater 1043 having a natural gas burner to preheat ambient air and to accelerate water evaporation process. In some embodiments, the air preheater 1043 may also have a natural gas-powered electric generator. The air preheater 1043 may generate waste heat that may be used to heat the system's 1000, 1100 components (e.g., pipes, pumps, valves, etc.) to protect the system 1000, 1100 from subfreezing temperatures.

The system 1000, 1100 may operate continuously (i.e., 24 hours per day, 356 days per year) in remote locations with cold weather conditions (e.g., down to about 10° F.). For example, ambient temperatures may be below freezing (e.g., from about 10° F. to about 32° F.) for extended periods of time. If these subfreezing temperatures continue for days, weeks or even months, the water in an unprotected system 1000, 1100 is subject to freezing. If the water freezes, the unprotected system 1000, 1100, namely, pumps and valves would likely cease to function due to freezing damage, requiring operator intervention and costly repairs of the damaged system 1000, 1100.

The system 1000, 1100 should be capable of operating in cold weather conditions to sustain evaporation operations in nearly all weather conditions. Cold weather shutdowns not only reduce the efficiency of the evaporation process, they also require operator intervention to restart the system 1000, 1100 because frozen components must be thawed, checked for damage, and, if necessary, repaired or replaced before restarting. Further, cold weather conditions in some locations may last for weeks or months making subfreezing operational reliability essential to operational effectiveness.

In an embodiment, the system 1000, 1100 may further comprise one or more of insulation, heat-tracing (i.e., resistance heating) and supplementary heating to protect the system 1000, 1100 from subfreezing temperatures. For example, the one or more of insulation, heat-tracing and supplementary heating for the system 1000, 1100 includes, but is not limited to, the following:

insulation of weatherproof enclosures
    insulation of components (e.g., pipes, pumps, valves, etc.)
    supplementary heating (e.g., direct heating, heat-tracing, using waste heat from a generator or a burner).

In an embodiment, the system 1000, 1100 may further comprise insulation, wherein the insulation is disposed around the system's 1000, 1100 components (e.g., pipes, pumps, valves, etc.). In an embodiment, the system 1000, 1100 may further comprise an enclosure (for one or more of pumps and valves) and insulation, wherein the insulation is disposed around the system's 1000, 1100 components (e.g., pipes, pumps, valves, etc.) and/or inside the enclosure. Insulation offers short term protection from low temperature conditions, but supplementary heating is required to function reliably at prolonged low temperatures.

In an embodiment, the system 1000, 1100 may further comprise heat tracing, wherein the heat tracing is disposed around the system's 1000, 1100 components (e.g., pipes, pumps, valves, etc.). Heat tracing provides long term protection from low temperature conditions, but it consumes too much electrical power to be efficient and it cannot generate heat in an event of electrical power outage.

In an embodiment, the system 1000, 1100 may further comprise supplementary heating using direct heating and/or using waste heat from a burner or a generator to protect the system's 1000, 1100 components (e.g., pipes, pumps, valves, etc.) from subfreezing temperatures. For example, the supplementary heating using direct heating and/or using waste heat from a burner or a generator includes, but is not limited to, the following:

- direction of waste heat from the burner into an enclosure via passive radiation
- direction of waste heat from the generator into the enclosure via a metal duct.
- installation of a natural gas powered infrared heater in the enclosure In an embodiment, the system 1000, 1100 may further comprise an enclosure (for one or more of pumps and valves), and a direct heater (e.g., a natural gas powered infrared heater), wherein the direct heater is disposed inside the enclosure.

In an embodiment, the system 1000, 1100 may further comprise a burner and an enclosure (for one or more of pumps and valves), wherein waste heat is directed into the enclosure via passive radiation.

In an embodiment, the system 1000, 1100 may further comprise a duct, an enclosure (for one or more of pumps and valves), and a generator, wherein waste heat from the generator is directed into the enclosure via the duct.

Optional Air, Argon or Nitrogen Purge System

In an event of an electrical power outage and/or a loss of natural gas pressure, the system 1000, 1100 would no longer be able to generate supplementary heat. The loss electrical power outage would also deprive the system 1000, 1100 of an ability to purge the system's components (e.g., pipes, pumps, valves, etc.) using the electrical pumps.

To provide extra freeze protection during an electrical power outage and/or a loss of natural gas pressure, the system 1000, 1100 may further comprise an air, argon or nitrogen purge system 10008 that can "blow out" water from the system's components (e.g., pipes, pumps, valves, etc.) for freeze protection of the system. In an embodiment, the air, argon or nitrogen purge system 10008 of the system 1000, 1100 may be activated by an ambient temperature sensor powered by a battery-driven emergency power system. Further, the capacity of the air, argon or nitrogen purge system 10008 may be adjusted to "blow out" water from the system's components (e.g., pipes, pumps, valves, etc.) as well as the feed and discharge pipelines that connect the system 1000, 1100 to the wastewater source or tank farm.

In an embodiment, the system 1000, 1100 may further comprise an air, argon or nitrogen purge system 10008 comprising an air, argon or nitrogen source 10010, a fifth (air, argon or nitrogen) valve 10012 and an optional air, argon or nitrogen shut-off valve 10014 for freeze protection of the system.

An outlet of the air, argon or nitrogen source 10010 may be connected to an inlet of the fifth (air, argon or nitrogen) valve 10012 via a pipe 10016*a*.

An outlet of the fifth (air, argon or nitrogen) valve 10012 may be connected to an inlet of the optional fifth (air, argon or nitrogen) shut-off valve 10014 or an inlet to the pipe 1008*b* via a pipe 10016*b*.

An outlet of the optional fifth (air, argon or nitrogen) shut-off valve 10014 may be connected to an inlet to the pipe 1008*b* via a pipe 10016*c*.

The air, argon or nitrogen source 10010 may be any suitable air, argon or nitrogen source. For example, a suitable air, argon or nitrogen source 10010 includes, but is not limited to, an air compressor, a high pressure air cylinder, a high pressure argon cylinder and a high pressure nitrogen cylinder.

In an embodiment, the air, argon or nitrogen may be any suitable purge pressure. For example a suitable purge pressure includes, but is not limited to, about 15-20 psig.

In an embodiment, the system 1000, 1100 may further comprise a fifth (air, argon or nitrogen) valve 10012. The fifth (air, argon or nitrogen) valve 10012 may be any suitable switching valve. Suitable fifth (air, argon or nitrogen) valves 10012 include, but are not limited to, ball valves. For example, a suitable fifth (air, argon or nitrogen) valve 10012 is available from GF Piping Systems. In an embodiment, the fifth (air, argon or nitrogen) valve 10012 may be a GF Piping Systems Type 546 Electric Actuated Ball Valve from GF Piping Systems. In an embodiment, the fifth (air, argon or nitrogen) valve 10012 may be automatic or manual. In an embodiment, the fifth (air, argon or nitrogen) valve 10012 may be electric or pneumatic actuation. In an embodiment, the fifth (air, argon or nitrogen) valve 10012 may be normally CLOSED. In an embodiment, the fifth (air, argon or nitrogen) valve 10012 may be normally OPEN.

In an embodiment, the fifth (air, argon or nitrogen) valve 10012 may have ¼-inch connections.

In an embodiment, the system 1000, 1100 may further comprise a fifth (air, argon or nitrogen) shut-off valve 10014. The fifth (air, argon or nitrogen) shut-off valve 10014 may be any suitable shut-off valve. Suitable fifth (air, argon or nitrogen) shut-off valves 10014 include, but are not limited to, ball valves and butterfly valves. For example, a suitable fifth (air, argon or nitrogen) shut-off valve 10014 is available from GF Piping Systems. In an embodiment, the fifth (air, argon or nitrogen) shut-off valve 10014 may be a GF Piping Systems Type 546 Ball Valve from GF Piping Systems. In an embodiment, the fifth (air, argon or nitrogen) shut-off valve 10014 may be automatic or manual. In an embodiment, the fifth (air, argon or nitrogen) shut-off valve 10014 may be normally CLOSED. In an embodiment, the fifth (air, argon or nitrogen) shut-off valve 10014 may be normally OPEN.

In an embodiment, the fifth (air, argon or nitrogen) shut-off valve 10014 may have ¼-inch connections.

The pipe 10016*a*, 10016*b*, 10016*c* may be made of any suitable corrosion-resistant pipe. The pipe 10016*a*, 10016*b*, 10016*c* may be made of any suitable corrosion-resistant metals or plastics. Suitable metals include, but are not limited to, brass, copper, stainless steel and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the pipe 10016*a*, 10016*b*, 10016*c* may be made of 316 stainless steel.

In an embodiment, the pipe 10016*a*, 10016*b*, 10016*c* may be ¼-inch pipe.

Optional Level Column

In an embodiment, the system 1000, 1100 may further comprise a level column 10000, a third shut-off valve 10003 and a fourth shut-off valve 10004.

A lower end of the level column 10000 may be fluidly connected to an inlet of the forth shut-off valve 10004 via pipe 10002*a* and to an inlet of the third shut-off valve 10003 via pipe 10006*b*. An outlet of the third shut-off valve 10003 is fluidly connected to a fourth inlet of the container 1039 at a seventh height of the container 1039 via pipe 10006*c*. In an embodiment, the seventh height of the container 1039 may be about four inches to about 1 foot (and any range or value there between). In an embodiment, the seventh height of the container 1039 may be about 6 inches.

The level column 10000 may be any suitable level column. Suitable level columns 10000, include but are not limited to, column level indicators.

The pipe 10006*a*, 10006*b*, 10006*c* may be made of any suitable corrosion-resistant pipe. The pipe 10006*a*, 10006*b*, 10006*c* may be any suitable corrosion-resistant metals or plastics. Suitable metals include, but are not limited to, plastic-coated carbon steel, stainless steel, super-duplex stainless steel, AL-6XN alloy, Ni—Al—Brz alloy, Hastelloy® alloy, Monel® alloy and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the pipe 10006*a*, 10006*b*, 10006*c* may be made of plastic-coated carbon steel. In an embodiment, the pipe 10006*a*, 10006*b*, 10006*c* may be made of Plasite 7159 HAR-coated carbon steel. In an embodiment, the pipe 10006*a*, 10006*b*, 10006*c* may be made of 316 stainless steel.

In an embodiment, the pipe 10006*a*, 10006*b*, 10006*c* may be 2-inch pipe.

Discharge System

In an embodiment, the system 1000, 1100 may further comprise a check valve 1063, a fourth (discharge) valve 1069 and a second (discharge) shut-off valve 1074. An outlet of a pipe 1020*a* may be connected to an inlet of the fourth (discharge) valve 1069 via a pipe 1020*b*; and an outlet of the fourth (discharge) valve 1069 may be connected to an inlet of the check valve 1063 or an inlet of the second (discharge) shut-off valve 1074 via a pipe 1072.

An outlet of the check valve 1063 or an outlet of the second (discharge) shut-off valve 1074 may be connected to an inlet of the second (discharge) flange 1076 via a pipe 1075.

In an embodiment, the system 1000, 1100 may further comprise a fourth (discharge) valve 1069. The fourth (discharge) valve 1069 may be any suitable switching valve. Suitable fourth (discharge) valves 1069 include, but are not limited to, ball valves. For example, a suitable fourth (discharge) valve 1069 is available from GF Piping Systems. In an embodiment, the fourth (discharge) valve 1069 may be a GF Piping Systems Type 546 Electric Actuated Ball Valve from GF Piping Systems. In an embodiment, the fourth (discharge) valve 1069 may be automatic or manual. In an embodiment, the fourth (discharge) valve 1069 may be electric or pneumatic actuation. In an embodiment, the fourth (discharge) valve 1069 may be normally CLOSED.

In an embodiment, the fourth (discharge) valve 1069 may have 2-inch connections.

In an embodiment, the system 1000, 1100 may further comprise a second (discharge) shut-off valve 1074. The second (discharge) shut-off valve 1074 may be any suitable shut-off valve. Suitable second (discharge) shut-off valves 1074 include, but are not limited to, ball valves and butterfly valves. For example, a suitable second (discharge) shut-off valve 1074 is available from GF Piping Systems. In an embodiment, the second (discharge) shut-off valve 1074 may be a GF Piping Systems Type 546 Ball Valve from GF Piping Systems. In an embodiment, the second (discharge) shut-off valve 1074 may be automatic or manual. In an embodiment, the second (discharge) shut-off valve 1074 may be normally CLOSED.

In an embodiment, the second (discharge) shut-off valve 1074 may have 2-inch connections.

The fourth (discharge) valve 1069 and the second (discharge) shut-off valve 1074 may be made of any suitable corrosion-resistant material. The fourth (discharge) valve 1069 and the second (discharge) shut-off valve 1074 may be made of any suitable corrosion-resistant metals or plastics. Suitable metals include, but are not limited to, plastic-coated carbon steel, stainless steel, Hastelloy® alloy, Monel® alloy and combinations thereof and suitable plastic include, but are not limited to, polyvinylchloride (PVC) polymers, chlorinated polyvinyl chloride (CPVC) polymers, fiberglass reinforced plastic (FRP), Kynar® polyvinylidene fluoride (PVDF) polymers, polyethylene polymers, polypropylene polymers, Teflon® perfluoroalkoxy (PFA) polymers, Teflon® polytetrafluroethylene (PTFE) polymers, and combinations thereof. In an embodiment, the fourth (discharge) valve 1069 and the second (discharge) shut-off valve 1074 (wetted components) may be made of polyvinyl chloride (PVC) and ethylene propylene diene monomer (EPDM) rubber.

In an embodiment, the system 1000, 1100 may further comprise a check valve 1063. The check valve 1063 may be any suitable check valve. Suitable check valves 1063 include, but are not limited to, one-way valves. An outlet of the fourth (discharge) valve 1069 may be connected to an inlet of a check valve 1063; and an outlet of the check valve 1063 may be connected to an inlet of a second (discharge) shut-off valve 1074. In an embodiment, the system 1000, 1100 may further comprise a seventh limit switch (not shown) and an eighth limit switch (not shown). (See e.g., FIGS. 1A-1B: 113 & 114). In an embodiment, the seventh limit switch (not shown) confirms that the fourth (discharge) valve 1069 is OPEN; and the eighth limit switch (not shown) confirms that the fourth (discharge) valve 1069 is CLOSED.

The pipe 1072, 1075 may be made of any suitable corrosion-resistant pipe. The pipe 1072, 1075 may be made of any suitable corrosion-resistant metals or plastics. Suitable metals include, but are not limited to, plastic-coated carbon steel, stainless steel, super-duplex stainless steel, AL-6XN alloy, Ni—Al—Brz alloy, Hastelloy® alloy, Monel® alloy and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the pipe 1072, 1075 may be made of plastic-coated carbon steel. In an embodiment, the pipe 1072, 1075 may be made of Plasite 7159 HAR-coated carbon steel. In an embodiment, the pipe 1072, 1075 may be made of 316 stainless steel.

In an embodiment, the pipe 1072, 1075 may be 2-inch pipe.

Optional Sensors and Meters

In an embodiment, the system 1000, 1100 may further comprise a first temperature sensor (not shown), a second temperature sensor 1043a, a third temperature sensor 1043b, a first conductivity meter (not shown), an optional second conductivity meter (not shown), and/or a third flow indicator or meter 1073. (See e.g., FIGS. 1A-1B: 130, 131, 132 & 173).

The first temperature sensor (not shown) may be fluidly connected to the first manifold 1028.

The second temperature sensor 1043a may be fluidly connected to an air outlet of the air preheater 1043.

The third temperature sensor 1043b may be fluidly connected to a headspace in the container 1039 above the drip system 1034 and adjacent to the demister element 1045.

The first temperature sensor (not shown) may be any suitable temperature measuring device. (See e.g., FIGS. 1A-1B: 130). For example, a suitable first temperature sensor is available from Ashcroft Inc. In an embodiment, the first temperature sensor may be a Bi-Metallic Dial Thermometer from Ashcroft Inc. In an embodiment, the first temperature sensor may be electrical or manual.

The second temperature sensor 1043a and the third temperature sensor 1043b may be any suitable temperature measuring device. For example, a suitable second temperature sensor 1043a and a third temperature sensor 1043b is available from Pyromation Inc. In an embodiment, the second temperature sensor 1043a and the third temperature sensor 1043b may be a Resistant Temperature Detector (RTD) temperature sensor from Pyromation Inc. In an embodiment, the second temperature sensor 1043a and the third temperature sensor 1043b may be electrical or manual.

The first conductivity meter (not shown) may be fluidly connected to the first manifold 1028; and the optional second conductivity meter (not shown) may be fluidly connected to the first manifold 1028. (See e.g., FIGS. 1A-1B: 131 & 132).

The first conductivity meter (not shown) monitors the conductivity of the inlet (feed) and/or condensed (recycled) wastewater from the external wastewater source. (See e.g., FIGS. 1A-1B: 131). If the first conductivity meter measures a predetermined minimum conductivity (e.g., indicating presence of oil in feed water), the system 1000 is shut off.

The first conductivity meter (not shown) may be any suitable conductivity meter. (See e.g., FIGS. 1A-1B: 131). For example, a suitable first conductivity meter is available from Cole-Parmer Instrument Company. In an embodiment, the first conductivity meter may be a Model ML-19504-04 Toroidal Conductivity Sensor from Cole-Parmer Instrument Company. In an embodiment, the first conductivity sensor may be electrically connected to the PLC or computing device 600. In an embodiment, the first conductivity sensor may have a range from about 0 µS/cm to about 1,000,000 µS/cm (and any range or value there between).

The optional second conductivity meter (not shown) monitors the conductivity of the inlet (feed) or condensed (recycle) wastewater from the external wastewater source. If the second conductivity meter indicates the condensed wastewater (brine) has reached a predetermined maximum conductivity, the third (discharge) shut-off valve 1074 is switched to the OPEN position.

The optional second conductivity meter (not shown) may be any suitable conductivity meter. For example, a suitable first conductivity meter (not shown) is available from Cole-Parmer Instrument Company. In an embodiment, the first conductivity meter (not shown) may be a Model ML-19504-04 Toroidal Conductivity Sensor electrically connected to a Model ML-94785-12 Process Meter from Cole-Parmer Instrument Company. In an embodiment, the second conductivity sensor (not shown) may be electrically connected to the PLC or computing device 600. In an embodiment, the second conductivity sensor (not shown) may have a range from about 0 µS/cm to about 1,000,000 µS/cm (and any range or value there between).

The third flow indicator or meter 1073 may be fluidly connected to pipe 1072. The third flow indicator or meter 1073 monitors the flow rate of the discharge to the discharge outlet 1076.

The third flow indicator or meter 1073 may be any suitable flow indicator or meter. Suitable third flow indicators or meters 1073 include, but are not limited to, magnetic, paddlewheel, ultrasonic vortex and insertion-type vortex flow meters. For example, a suitable third flow indicator or meter 1073 is available from Georg Fischer Signet LLC. In an embodiment, the third flow indicator or meter 1073 may be a Signet 2536 Rotor-X Paddlewheel Flow Sensor from Georg Fischer Signet LLC. In an embodiment, the third flow indicator or meter 1073 may be electrically connected to the PLC or computing device 600.

Optional Limit/Level, Pressure and Temperature Switches

In an embodiment, the system 1000, 1100 may further comprise a first pressure switch (not shown), an air temperature sensor (not shown), a second high differential pressure switch (not shown), a third high, high differential pressure switch (not shown), a first high, high limit switch 1049, a low limit switch (not shown), a high limit switch (not shown), a second high, high limit switch (not shown), and a second pressure switch (not shown). (See e.g., FIGS. 1A-1B: 110, 140, 147, 148, 149, 150, 151, 152 & 159).

The first pressure switch (not shown) monitors pressure of inlet wastewater to the pump 1018. (See e.g., FIGS. 1A-1B: 110). The first pressure switch may be any suitable pressure switch. For example, a suitable first pressure switch is available from AutomationDirect.com Inc. In an embodiment, the first pressure switch may be a ProSense® MPS25 Series Mechanical Pressure Switch from AutomationDirect.com Inc.

The first pressure switch (not shown) may be fluidly connected to the pipe 1008. (See e.g., FIGS. 1A-1B: 110).

The second high differential pressure switch (not shown) monitors the air pressure in the container 1039. (See e.g., FIGS. 1A-1B: 147). If the second high differential pressure switch is activated, the first air blower 1042 and/or the second air blower is operating. In an embodiment, the second high differential pressure switch may be set to +/−0.15 inches water column.

The second high differential pressure switch (not shown) may be any suitable differential pressure sensor. (See e.g., FIGS. 1A-1B: 147). For example, a suitable second high differential pressure switch is available from Dwyer Instruments Inc. In an embodiment, the second high differential pressure switch may be a Series 3000 Photohelic Differential Pressure Gage from Dwyer Instruments Inc. In an embodiment, the second high differential pressure switch has a range from about 0 to about 0.5 inches water column.

The second high differential pressure switch (not shown) may be fluidly connected to the container 1039. (See e.g., FIGS. 1A-1B: 147).

The third high, high differential pressure switch (not shown) also monitors air pressure in the container. (See e.g., FIGS. 1A-1B: 148). If the third high, high differential pressure switch is activated, the mist arresting system 1044 may be blocked due to flooding or scale build-up. In an embodiment, the third high, high differential pressure switch may be set to about +/−0.40 inches water column.

The third high, high differential pressure switch (not shown) may be any suitable differential pressure sensor. (See e.g., FIGS. 1A-1B: 148). For example, a suitable third high, high differential pressure switch is available from Dwyer Instruments Inc. In an embodiment, the third high, high differential pressure switch may be a Series 3000MR Photohelic Differential Pressure Gage from Dwyer Instruments Inc. In an embodiment, the third high, high differential pressure switch may have a range from about 0 to about 0.5 inches water column.

The third high, high differential pressure switch (not shown) may be fluidly connected to the container 1039. (See e.g., FIGS. 1A-1B: 148).

The first high, high limit switch (not shown), low limit switch (not shown) and high limit switch (not shown) monitor various water levels in the sump (bottom) of the container 1039. (See e.g., FIGS. 1A-1B: 149, 150 & 151). The second high, high limit switch (not shown) monitors water levels in a secondary containment. (See e.g., FIGS. 1A-1B: 152).

The high, high limit switches 1049, low limit switch (not shown), and high limit switch (not shown) may be any suitable water level switches. (See e.g., FIGS. 1A-1B: 149, 150, 151 & 152). Suitable water level switches include, but are not limited to, capacitive proximity, float, magnetic and vibrating fork. For example, the high, high limit switches 1049, low limit switch, and high limit switch are available from AutomationDirect.com Inc. In an embodiment, the high, high limit switches 1049, low limit switch, and high limit switch may be TU Series Model M18 Round Inductive Proximity Sensors from AutomationDirect.com Inc.

The first high, high limit switch 1049, low limit switch (not shown), and high limit switch (not shown) may be fluidly connected near the sump (bottom) of the container 1039. (See e.g., FIGS. 1A-1B: 149, 150, 151).

The second high, high limit switch (not shown) may be fluidly connected outside the container 1039 for monitoring water levels in the secondary containment. (See e.g., FIGS. 1A-1B: 152)

First Optional Acid Conditioning System

In an embodiment, the system 1000, 1100 may further comprise an optional acid conditioning system (not shown). (See e.g., FIGS. 1A-1B: 177). The acid conditioning system (not shown) comprises an acid tote (not shown) and an acid metering pump (not shown). (See e.g., FIGS. 1A-1B: 177, 178 & 180).

The acid may be any suitable acid. Suitable acids include, but are not limited to, hydrochloric acid and sulfuric acid. In an embodiment, the acid may be hydrochloric acid (20 baume). In an embodiment, the acid may be sulfuric acid (98%). In an embodiment, the desired pH of the wastewater is about 6.5 or below to minimize calcium carbonate scaling. In an embodiment, the desired pH of the wastewater may be above 6.5 if a scale inhibitor is added to minimize carbonate and non-carbonate scaling. In an embodiment, the amount of acid solution added varies, depending on inlet water conditions (e.g., pH, alkalinity).

In an embodiment, the desired pH of the wastewater may be above 6.5 if a scale inhibitor is added to minimize carbonate and non-carbonate scaling.

An outlet of the acid tote (not shown) may be fluidly connected to an inlet of the acid metering pump (not shown) via tubing (not shown); and an outlet of the acid metering pump (not shown) is fluidly connected to the container 1039 or to the pipe 1008 via tubing (not shown). (See e.g., FIGS. 1A-1B: 178, 179, 180 & 181).

The acid tote (not shown) may be any suitable acid tote or other bulk chemical storage unit. (See e.g., FIGS. 1A-1B: 178). Suitable acid totes include, but are not limited to, an industry standard shipping tote. For example, a suitable acid tote is available from National Tank Outlet. In an embodiment, the acid tote may be a 275 gallon or a 330 gallon industry standard shipping tote. In an embodiment, the acid tote may be a 55 gallon drum.

The acid metering pump (not shown) may be any suitable acid metering pump. (See e.g., FIGS. 1A-1B: 180). Suitable acid metering pumps include, but are not limited to, electronic diaphragm, peristaltic and positive displacement pumps. For example, a suitable acid metering pump is available from Anko Products, Inc. In an embodiment, the acid metering pump may be a self-priming peristaltic pump from Anko Products, Inc. In an embodiment, the acid metering pump may be a Mityflex Model 907 self-priming peristaltic pump from Anko Products, Inc.

The tubing (not shown) may be made of any suitable corrosion-resistant tubing. (See e.g., FIGS. 1A-1B: 179 & 181). The tubing may be made of any suitable corrosion-resistant metals or plastics. Suitable metals include but are not limited to, AL-6XN alloy, Hastelloy® alloy, Monel® alloy, and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. For example, suitable tubing may be made of Teflon® PFA or PTFE.

In an embodiment, the acid conditioning system (not shown) may further comprise an acid flow meter (not shown). (See e.g., FIGS. 1A-1B: 177). The acid flow meter (not shown) may be fluidly connected to tubing (not shown). (See e.g., FIGS. 1A-1B: 181). The acid flow meter measures the flow rate of the acid solution.

The acid flow meter may be any suitable flow meter. Suitable acid flow meters include, but are not limited to, paddlewheel, ultrasonic vortex and insertion-type vortex flow meters. For example, a suitable acid flow meter is available from ProMinent. In an embodiment, the acid flow meter may be a Model DulcoFlow DFMa from ProMinent with built-in signal transmission capability.

Second Optional Acid Conditioning System

In an embodiment, the system 1000, 1100 may further comprise an acid conditioning system (not shown). (See e.g., FIG. 4: 460). The acid conditioning system (not shown) comprises an acid tote (not shown) and an acid metering pump (not shown). (See e.g., FIGS. 4: 460, 462 & 466).

The acid may be any suitable acid. Suitable acids include, but are not limited to, hydrochloric acid and sulfuric acid. In an embodiment, the acid may be hydrochloric acid (20 baume). In an embodiment, the acid may be sulfuric acid (98%). In an embodiment, the desired pH of the wastewater is about 6.5 or below to minimize calcium carbonate scaling. In an embodiment, the amount of acid solution added varies, depending on inlet water conditions (e.g., pH, alkalinity).

An outlet of the acid tote (not shown) may be fluidly connected to an inlet of the acid metering pump (not shown) via tubing (not shown); and an outlet of the acid metering pump (not shown) may be fluidly connected to pipe (not shown) via tubing (not shown). (See e.g., FIGS. 4: 422, 462, 464, 466 & 472).

The acid tote (not shown) may be any suitable acid tote or other bulk chemical storage unit. (See e.g., FIG. 4: 462). Suitable acid totes include, but are not limited to, an industry standard shipping tote. For example, a suitable acid tote is available from National Tank Outlet. In an embodiment, the acid tote may be a 275 gallon or a 330 gallon industry standard shipping tote.

The acid metering pump (not shown) may be any suitable acid metering pump. (See e.g., FIG. 4: 466). Suitable acid metering pumps include, but are not limited to, peristaltic pumps. For example, a suitable acid metering pump is available from Blue-White Industries, Inc., Cole Palmer Instrument Company and Watson Marlow. In an embodiment, the acid metering pump may be a self-priming peristaltic pump from Blue-White Industries, Inc.

The tubing (not shown) may be made of any suitable corrosion-resistant tubing. (See e.g., FIGS. 4: 464 & 472). The tubing may be made of any suitable corrosion-resistant metals or plastics. Suitable metals include, but are not limited to, AL-6XN alloy, Hastelloy® alloy, Monel® alloy and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. For example, suitable tubing may be made of Teflon® PFA or PTFE.

In an embodiment, the acid conditioning system (not shown) may further comprise an acid flow meter (not shown). (See e.g., FIGS. 4: 460 & 470). The acid flow meter (not shown) may be fluidly connected to tubing (not shown). (See e.g., FIGS. 4: 470 & 472). The acid flow meter measures the flow rate of the acid solution.

The acid flow meter (not shown) may be any suitable flow meter. (See e.g., FIG. 4: 470). Suitable acid flow meters include, but are not limited to, paddlewheel, ultrasonic vortex and insertion-type vortex flow meters. For example, a suitable acid flow meter is available from ProMinent. In an embodiment, the acid flow meter may be a Model DulcoFlow DFMa from ProMinent with built-in signal transmission capability.

First Optional Bactericide Conditioning System

In an embodiment, the system 1000, 1100 may further comprise an optional bactericide conditioning system (not shown). (See e.g., FIGS. 1A-1B: 182). The bactericide conditioning system (not shown) comprises a bactericide tote (not shown) and a bactericide metering pump (not shown). (See e.g., FIGS. 1A-1B: 182, 183 & 185).

The bactericide may be any suitable bactericide. Suitable bactericide includes, but is not limited to, bleach, bromine, chlorine dioxide (generated), 2,2-dibromo-3-nitrilo-propionade (DBNPA), glutaraldehyde, isothiazolin (1.5%) and ozone (generated). In an embodiment, the bactericide may be selected from the group consisting of bleach (12.5%), bromine, chlorine dioxide (generated), DBNPA (20%), glutaraldehyde (50%), isothiazolin (1.5%) and ozone (generated). In an embodiment, the desired bactericide concentration is from about 10 ppm to about 1000 ppm (and any range or value there between). The amount of bactericide solution added to the wastewater varies, depending on inlet water condition.

An outlet of the bactericide tote (not shown) may be fluidly connected to an inlet of the bactericide metering pump (not shown) via tubing (not shown); and an outlet of the bactericide metering pump (not shown) may be fluidly connected to the container 1039 or to the pipe 1008 via tubing (not shown). (See e.g., FIGS. 1A-1B: 183, 184, 185 & 186).

The bactericide tote (not shown) may be any suitable bactericide tote or other bulk chemical storage unit. (See e.g., FIGS. 1A-1B: 183). Suitable bactericide totes include, but are not limited to, an industry standard shipping tote. For example, a suitable bactericide tote is available from National Tank Outlet. In an embodiment, the bactericide tote may be a 275 gallon or 330 gallon industry standard shipping tote. In an embodiment, the bactericide tote may be a 55 gallon drum or a 5 gallon pail.

In an alternative embodiment, the bactericide tote (not shown) may be replaced with a suitable bactericide generating apparatus (not shown). (See e.g., FIGS. 1A-1B: 183). For example, a suitable bactericide apparatus is available from Miox Corporation. In an embodiment, the bactericide generating apparatus (not shown) may be a Model AE-8 from Miox Corporation.

The bactericide metering pump (not shown) may be any suitable bactericide metering pump. (See e.g., FIGS. 1A-1B: 185). Suitable bactericide metering pumps include, but are not limited to, electronic diaphragm, peristaltic and positive displacement pumps. For example, a suitable bactericide metering pump is available from Anko Products, Inc. In an embodiment, the bactericide metering pump may be a self-priming peristaltic pump from Anko Products, Inc. In an embodiment, the bactericide metering pump may be a Mityflex Model 907 self-priming peristaltic pump from Anko Products, Inc.

The tubing (not shown) may be made of any suitable corrosion-resistant tubing. (See e.g., FIGS. 1A-1B: 184 & 186). The tubing may be made of any suitable corrosion-resistant metals or plastics. Suitable metals include, but are not limited to, AL-6XN alloy, Hastelloy® alloy, Monel® alloy and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the tubing may be made of Teflon® PFA or PTFE.

In an embodiment, the bactericide conditioning system (not shown) may further comprise an optional bactericide flow meter (not shown). (See e.g., FIGS. 1A-1B: 182). The bactericide flow meter (not shown) may be fluidly connected to tubing (not shown). (See e.g., FIGS. 1A-1B: 186). The bactericide flow meter measures the flow rate of the bactericide solution.

The bactericide flow meter may be any suitable flow meter. Suitable bactericide flow meters include, but are not limited to, paddlewheel, ultrasonic vortex and insertion-type vortex flow meters. For example, a suitable bactericide flow meter is available from ProMinent. In an embodiment, the bactericide flow meter may be a Model DulcoFlow DFMa from ProMinent with built-in signal transmission capability.

Second Optional Bactericide Conditioning System

In an embodiment, the system 1000, 1100 may further comprise a bactericide conditioning system (not shown). (See e.g., FIG. 4: 474). The bactericide conditioning system (not shown) comprises a bactericide tote (not shown) and a bactericide metering pump (not shown). (See e.g., FIGS. 4: 474, 476 & 480).

The bactericide may be any suitable bactericide. Suitable bactericide includes, but is not limited to, bleach, bromine, chlorine dioxide (generated), 2,2-dibromo-3-nitrilo-propionade (DBNPA), glutaraldehyde, isothiazolin (1.5%) and ozone (generated). In an embodiment, the bactericide may be selected from the group consisting of bleach (12.5%), bromine, chlorine dioxide (generated), DBNPA (20%), glutaraldehyde (50%), isothiazolin (1.5%) and ozone (generated). In an embodiment, the desired bactericide concentration is from about 10 ppm to about 1000 ppm (and any range or value there between). The amount of bactericide solution added to the wastewater varies, depending on inlet water condition.

An outlet of the bactericide tote (not shown) may be fluidly connected to an inlet of the bactericide metering pump (not shown) via tubing (not shown); and an outlet of the bactericide metering pump (not shown) may be fluidly connected to pipe (not shown) via tubing (not shown). (See e.g., FIGS. 4: 422, 476, 478, 480 & 482).

The bactericide tote (not shown) may be any suitable bactericide tote or other bulk chemical storage unit. (See e.g., FIG. 4: 476). Suitable bactericide totes include, but are not limited to, an industry standard shipping tote. For example, a suitable bactericide tote is available from National Tank Outlet. In an embodiment, the bactericide tote may be a 275 gallon or 330 gallon industry standard shipping tote.

In an alternative embodiment, the bactericide tote (not shown) may be replaced with a suitable bactericide generating apparatus (not shown). For example, a suitable bactericide apparatus is available from Miox Corporation. In an embodiment, the bactericide generating apparatus (not shown) may be a Model AE-8 from Miox Corporation.

The bactericide metering pump (not shown) may be any suitable bactericide metering pump. (See e.g., FIG. 4: 480). Suitable bactericide metering pumps include, but are not limited to, peristaltic pumps. For example, a suitable bactericide metering pump is available from Blue-White Industries, Inc., Cole-Palmer Instrument Company and Watson Marlow. In an embodiment, the bactericide metering pump may be a self-priming peristaltic pump from Blue-White Industries, Inc.

The tubing (not shown) may be made of any suitable corrosion-resistant tubing. (See e.g., FIGS. 478 & 482). The tubing may be any suitable metal or plastic. Suitable metals include, but are not limited to, AL-6XN alloy, Hastelloy® alloy, Monel® alloy and combinations thereof and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the tubing may be made of Teflon® PFA or PTFE.

In an embodiment, the bactericide conditioning system (not shown) may further comprise a bactericide flow meter (not shown). (See e.g., FIGS. 4: 474 & 484). The bactericide flow meter (not shown) may be fluidly connected to tubing (not shown). (See e.g., FIGS. 4: 482 & 484). The bactericide flow meter measures the flow rate of the bactericide solution.

The bactericide flow meter (not shown) may be any suitable flow meter. (See e.g., FIG. 4: 484). Suitable bactericide flow meters include, but are not limited to, paddlewheel, ultrasonic vortex and insertion-type vortex flow meters. For example, a suitable bactericide flow meter is available from ProMinent. In an embodiment, the bactericide flow meter may be a Model DulcoFlow DFMa from ProMinent with built-in signal transmission capability.

Optional Scale Inhibition Conditioning System

In an embodiment, the system 1000, 1100 may further comprise an optional scale inhibition conditioning system (not shown). (See e.g., FIGS. 1A-1B: 187). The scale inhibition conditioning system (not shown) comprises a scale inhibition tote (not shown) and a scale inhibition metering pump (not shown). (See e.g., FIGS. 1A-1B: 187, 188 & 190).

The scale inhibitor may be any suitable scale inhibitor or blend of scale inhibitors. A suitable scale inhibitor includes, but is not limited to, inorganic phosphates, organophosphorous compounds and organic polymers. In an embodiment, the scale inhibitor may be selected from the group consisting of organic phosphate esters, polyacrylates, phosphonates, polyacrylamides, polycarboxylic acids, polymalates, polyphosphincocarboxylates, polyphosphates and polyvinylsylphonates. In an embodiment, the desired scale inhibitor concentration is from about 10 ppm to about 100 ppm (and any range or value there between). In an embodiment, the desired scale inhibitor concentration is from about 2 ppm to about 20 ppm (and any range or value there between). The amount of scale inhibitor solution added to the wastewater varies, depending on inlet water condition.

An outlet of the scale inhibition tote (not shown) may be fluidly connected to an inlet of the scale inhibition metering pump (not shown) via tubing (not shown); and an outlet of the scale inhibition metering pump (not shown) may be fluidly connected to container 1039 via tubing (not shown). (See e.g., FIGS. 1A-1B: 188, 190, 191).

The scale inhibition tote (not shown) may be any suitable scale inhibition tote or other bulk chemical storage unit. Suitable scale inhibition totes include, but are not limited to, an industry standard shipping tote. (See e.g., FIGS. 1A-1B: 188). For example, a suitable scale inhibition tote is available from National Tank Outlet. In an embodiment, the scale inhibition tote may be a 275 gallon or 330 gallon industry standard shipping tote. In an embodiment, the scale inhibition tote may be a 55 gallon drum or a 5 gallon pail.

The scale inhibition metering pump (not shown) may be any suitable scale inhibitor metering pump. (See e.g., FIGS. 1A-1B: 190). Suitable scale inhibition metering pumps include, but are not limited to, electronic diaphragm, peristaltic and positive displacement pumps. For example, a suitable scale inhibition metering pump is available from Anko Products, Inc. In an embodiment, the scale inhibition metering pump may be a self-priming peristaltic pump from Anko Products, Inc. In an embodiment, the scale inhibition metering pump may be a Mityflex Model 907 self-priming peristaltic pump from Anko Products, Inc.

The tubing (not shown) may be made of any suitable corrosion-resistant tubing. (See e.g., FIGS. 1A-1B: 189 & 191). The tubing may be made of any suitable corrosion-resistant metals or plastics. Suitable metals include but are not limited to, plastic-coated carbon steel, stainless steel, super-duplex stainless steel, AL-6XN alloy, Hastelloy® alloy, Monel® alloy and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the tubing may be made of Teflon® PFA or PTFE.

In an embodiment, the scale inhibition conditioning system (not shown) may further comprise an optional scale inhibition flow meter (not shown). (See e.g., FIGS. 1A-1B:

187). The scale inhibition flow meter may be fluidly connected to tubing (not shown). (See e.g., FIGS. 1A-1B: 191). The scale inhibition flow meter measures the flow rate of the scale inhibitor solution.

The scale inhibitor flow meter may be any suitable flow meter. Suitable scale inhibitor flow meters include, but are not limited to, paddlewheel, ultrasonic vortex and insertion-type vortex flow meters. For example, a suitable scale inhibitor flow meter is available from ProMinent. In an embodiment, the scale inhibitor flow meter may be a Model DulcoFlow DFMa from ProMinent with built-in signal transmission capability.

Optional Defoamer System

In an embodiment, the system 1000, 1100 may further comprise an optional defoamer system (not shown). (See e.g., FIGS. 1A-1B: 192). The defoamer system (not shown) comprises a defoamer tote (not shown) and a defoamer pump (not shown). (See e.g., FIGS. 1A-1B: 192, 193 & 195).

The defoamer may be any suitable defoamer. Suitable defoamer includes, but is not limited to, alcohols, glycols, insoluable oils, silicone polymers and stearates. In an embodiment, the defoamer may be selected from the group consisting of fatty alcohols, fatty acid esters, fluorosilicones, polyethylene glycol, polypropylene glycol, silicone glycols and polydimethylsiloxane. In an embodiment, the desired defoamer concentration is from about 10 ppm to about 100 ppm (and any range or value there between). In an embodiment, the desired defoamer concentration is from about 2 ppm to about 20 ppm (and any range or value there between). The amount of defoamer solution added to the wastewater varies, depending on inlet water condition.

An outlet of the defoamer tote (not shown) may be fluidly connected to an inlet of the defoamer metering pump (not shown) via tubing (not shown); and an outlet of the defoamer metering pump (not shown) may be fluidly connected to container 1039 via tubing (not shown). (See e.g., FIGS. 1A-1B: 193, 194, 195, 196).

The defoamer tote (not shown) may be any suitable defoamer tote or other bulk chemical storage unit. (See e.g., FIGS. 1A-1B: 193). Suitable defoamer totes include, but are not limited to, an industry standard shipping tote. For example, a suitable defoamer tote is available from National Tank Outlet. In an embodiment, the scale defoamer tote may be a 275 gallon or 330 gallon industry standard shipping tote. In an embodiment, the defoamer tote may be a 55 gallon drum or a 5 gallon pail.

The defoamer metering pump may be any suitable defoamer metering pump. (See e.g., FIGS. 1A-1B: 195). Suitable defoamer metering pumps include, but are not limited to, electronic diaphragm, peristaltic, and positive displacement pumps. For example, a suitable defoamer metering pump is available from Anko Products, Inc. In an embodiment, the defoamer metering pump may be a self-priming peristaltic pump from Anko Products, Inc. In an embodiment, the defoamer metering pump may be a Mity-flex Model 907 self-priming peristaltic pump from Anko Products, Inc.

The tubing (not shown) may be made of any suitable corrosion-resistant tubing. (See e.g., FIGS. 1A-1B: 194 & 196). The tubing may be made of any suitable corrosion-resistant metals or plastics. Suitable metals include, but are not limited to, plastic-coated carbon steel, stainless steel, super-duplex stainless steel, AL-6XN alloy, Hastelloy® alloy, Monel® alloy and combinations thereof; and suitable plastics include, but are not limited to, chlorinated polyvinyl chloride (CPVC) polymers, fiberglass reinforced plastic (FRP), Kynar® polyvinylidene fluoride (PVDF) polymers, polyethylene polymers, polypropylene polymers, polyvinyl chloride (PVC) polymers, Teflon® perfluoroalkoxy (PFA) polymers, Teflon® polytetrafluroethylene (PTFE) polymers, and combinations thereof. In an embodiment, the tubing may be made of Teflon® PFA or PTFE.

In an embodiment, the defoamer conditioning system (not shown) may further comprise an optional defoamer flow meter (not shown). (See e.g., FIGS. 1A-1B: 192). The defoamer flow meter may be fluidly connected to tubing (not shown). (See e.g., FIGS. 1A-1B: 196). The defomer flow meter measures the flow rate of the defoamer solution.

The defoamer flow meter may be any suitable flow meter. Suitable defoamer flow meters include, but are not limited to, paddlewheel, ultrasonic vortex and insertion-type vortex flow meters. For example, a suitable defoamer flow meter is available from ProMinent. In an embodiment, the defoamer flow meter may be a Model DulcoFlow DFMa from ProMinent with built-in signal transmission capability.

Programmable Logic Controller or Other Computing Device for System for Spray Evaporation of Water In an embodiment, the system 100, 400, 1000, 1100 may further comprise a programmable logic controller (PLC) or other computing device 600. The PLC or computing device 600 may be any suitable PLC or other computing device. For example, a suitable PLC or other computing device 600 may be an Allan Bradley, Automation Direct, Seimens, or WAGO logic controllers. Alternatively, the PLC or other computing device 600 may be an engineered circuit board.

In an embodiment, the system 100, 400, 1000, 1100 may have a central programming logic controller (PLC) or other computing device 600 that controls all functions of the unit in an autonomous fashion from a central remote location. The PLC or other computing device 600 may be capable of opening and closing all valve, starting and stopping all pumps, monitoring all sensors and taking all logical actions without human intervention during normal operation. The PLC or other computing device 600 may be capable of filling the system 100, 400, 1000, 1100 with wastewater, running the system 100, 400, 1000, 1100 to evaporate the water, switching the system 100, 400, 1000, 1100 to divert the concentrated waste to a waste outlet, refilling the system 100, 400, 1000, 1100 with a new batch of water and running the system 100, 400, 1000, 1100 to continue the cycle. The PLC or other computing device 600 may be capable of operating the system 100, 400, 1000, 1100 in a batch process mode or in a "feed and bleed" mode. The PLC or other computing device 600 may also be capable of automatically shutting the system 100, 400, 1000, 1100 down during adverse conditions, and, under certain circumstances, it may be capable of automatically restarting the system 100, 400, 1000, 1100.

For example, the PLC or other computing device 600 may automatically shut the system 100, 400, 1000, 1000 down in during adverse conditions including, but not limited to, the following:

a high high sump level
a high high containment level
a high high client tank level
no wastewater feed is available from client
no water flow while a feed pump or a recirculation pump is running
no water pressure while a feed pump or a recirculation pump is running
no air flow when a fan is running
a motor overload fault has occurred
a VFD fault has occurred a loss of power has occurred
a loss of natural gas pressure has occurred
an emergency stop (Estop) is engaged
an extreme low ambient temperature For example, the PLC or other computing device 600 may also automatically restart the system 100, 400, 1000, 1100 down in certain conditions including, but not limited to, the following:
the loss of natural gas pressure is only temporary
a Gen set goes down If the Gen set goes down, the PLC or other computing device 600 may attempt to restart the Gen set; and, if the Gen set restarts, the PLC or other computing device 600 may attempt to restart the system 100, 400, 1000, 1100.

Further, the PLC or other computing device 600 may be used by an operator to manually override a programmed function of the system 100, 400, 1000, 1100 to allow any aspect of the system 100, 400, 1000, 1100 to be controlled manually (e.g., opening and closing valves, or starting and stopping pumps) for maintenance and troubleshooting purposes.

In an embodiment, the system 100, 400, 1000, 1100 may have the capability to remotely read and write to the central PLC or other computing device 600 that allows for full reporting of the system's 100, 400, 1000, 1100 operating conditions to a central remote location and/or that allows full control of the system's 100, 400, 1000, 1100 operating conditions from the central remote location. In an embodiment, the system 100, 400, 1000, 1100 may have the capability to send information/communications to the PLC or other computing device 600 at the central remote location. In an embodiment, the system 100, 400, 1000, 1100 may have the capability to send communications (e.g., to report error codes, inlet volumes, outlet volumes, etc.) to the PLC or other computing device 600 at the central remote location via a satellite antenna and modem or other communication technologies.

In an embodiment, the system 100, 400, 1000, 1100 may have the capability to receive commands/communications from the PLC or other computing device 600 at the central remote location. In an embodiment, the system 100, 400, 1000, 1100 may have the capability to receive commands/communications (e.g., to alter the operational behavior of the system 100, 400, 1000, 1100) from the PLC or other computing device 600 at the central remote location via the satellite antenna and modem or other communication technologies.

Any suitable satellite antenna and modem may be used. For example, a suitable satellite antenna and modem is available from Inmarsat.

Other communication technologies include, but are not limited to, any other satellite-based communication technology, any Mobile Data mode (e.g., LTE/4G), any radio- or laser-transmitted communication array or any hard-wired internet connection.

For example, the system 100, 400, 1000, 1100 may send communications to the PLC or other computing device 600 including, but not limited to, the following:
number of barrels of wastewater pumped into the system
number of barrels of concentrated waste pumped out of the system
ambient temperature and/or ambient humidity conditions at the system
alarms for abnormal system behavior
current operating mode
inlet pressure of natural gas
client tank levels
current system settings (e.g., burner setting, cold weather set points, target evaporation percentage, minimum water level, maximum water level, etc.)

For example, the system 100, 400, 1000, 1100 may receive commands/communications from the PLC or other computing device 600 including, but not limited to, the following:
a stop command
a start command
a clear command for alarms
an air, argon or nitrogen purge command for cold weather conditions
an increase or decrease command for burner temperature set point
an increase or decrease command(s) for acid pump, bactericide pump, defoamer pump and/or scale inhibitor pump dosage rates
an increase or decrease command for evaporation percentage (i.e., number of barrels evaporated divided by number of barrels available)
an increase or decrease command(s) for water level settings (e.g., low low, operating low, operating high, high high)

Figure 6:
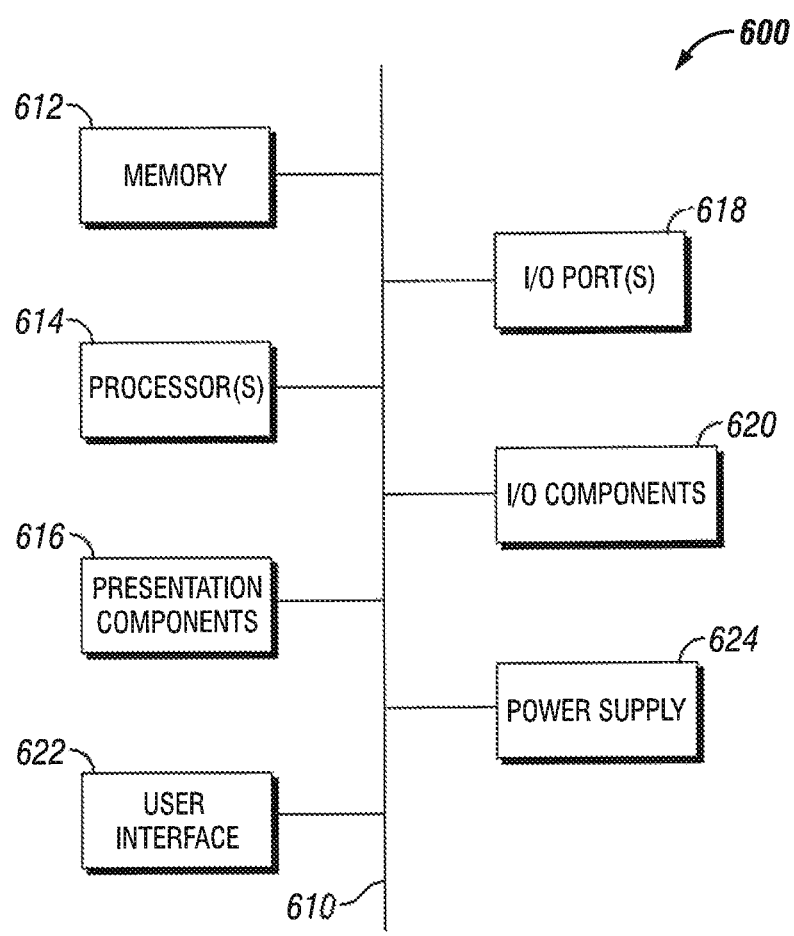
FIG. 6 illustrates a block diagram for a programmable logic controller (PLC) or computing device for an exemplary system for spray evaporation of water according to an embodiment of the present invention.

With reference to FIG. 6, the PLC or computing device 600 of the system 100, 400, 1000, 1100 may include a bus 610 that directly or indirectly couples the following devices: memory 612, one or more processors 614, one or more presentation components 616, one or more input/output (I/O) ports 618, I/O components 620, a user interface 622 and an illustrative power supply 624, and a battery backup (not shown). In an embodiment, the shut-off valve 106, the first pressure switch 110, the first (feed) valve 112, the first limit switch 113, the second limit switch 114, the first pump 118, the first flow meter 122, the first temperature sensor, 130, the first conductivity meter 131, the second conductivity meter 132 (not shown), the air temperature sensor 140, the air blower 142, the air heater with fan 143, the first high differential pressure switch 147, the second high, high differential pressure switch 148, the first high, high limit switch 149, the low limit switch 150, the high limit switch 151, a second high, high limit switch 152, the second pump 156, the second pressure switch 159, the pH meter 161, the second (recycle) valve 166, the third limit switch 167, the fourth limit switch 168, the third (discharge) valve 169, the fifth limit switch 170, the sixth limit switch 171, the second flow meter 173, the third shut-off valve 174, the acid metering pump 180, the acid flow meter (not shown), the bactericide metering pump 185, the bactericide flow meter (not shown), the scale inhibition metering pump 190, the scale inhibition flow meter (not shown), the defoamer pump 195, and/or the defoamer flow meter (not shown) couple directly or indirectly to a signal conditioning device. If the component's raw signal must be processed to provide a suitable signal for an I/O system, that component will couple indirectly to the signal conditioning device.

In another embodiment, the shut-off valve 406, 506, the first conductivity meter 410, 510, the first flow meter 412, 512, the hygrometer 414, the first 3-way valve 416, the pump 420, 520, the pressure sensor 425, the second conductivity meter 428, 528, the pH meter 430, the second 3-way valve 432, 532, the air blower 436, 536 (or the plurality of air blowers 436', 436"), the differential pressure sensor 445, the first temperature sensor 590, the second temperature sensor 592, the high-water level switch (not shown), the low-water level switch (not shown), the second flow meter 456, the acid metering pump 466, the acid flow meter 470, the bactericide metering pump 480 and/or the bactericide flow meter 484 couple directly or indirectly to a signal conditioning device. If the component's raw signal must be processed to provide a suitable signal for an I/O system, that component will couple indirectly to the signal conditioning device.

In an embodiment, the shut-off valve 1006, the first pressure switch (not shown) (see FIGS. 1A-1B: 110), the first (feed) valve 1012, the first limit switch (not shown) (see FIGS. 1A-1B: 113), the second limit switch (not shown) (see FIGS. 1A-1B: 114), the pump 1018, the flow indicator or meter 1022, the first temperature sensor (not shown) (see FIGS. 1A-1B: 130), the first conductivity meter (not shown) (see FIGS. 1A-1B: 131), the second conductivity meter (not shown), the air temperature sensor (not shown) (see FIGS. 1A-1B: 140), the first air blower 1042, the second air blower (not shown), the air preheater 1043, the first high differential pressure switch 1053, the second high differential pressure switch (not shown) (see FIGS. 1A-1B: 147), the third high, high differential pressure switch (not shown) (see FIGS. 1A-1B: 148), the first high, high limit switch 1049 (see FIGS. 1A-1B: 149), the low limit switch (not shown) (see FIGS. 1A-1B: 150), the high limit switch (not shown) (see FIGS. 1A-1B: 151), a second high, high limit switch (not shown) (see FIGS. 1A-1B: 152), the pH meter (not shown) (see FIGS. 1A-1B: 161), the third (discharge) valve 1069, the third limit switch (not shown) (see FIGS. 1A-1B: 170), the fourth limit switch (not shown) (see FIGS. 1A-1B: 171), the third flow indicator or meter 1073 (see FIGS. 1A-1B: 173, the third shut-off valve (not shown) (see FIGS. 1A-1B: 174), the acid metering pump (not shown) (see FIGS. 1A-1B: 180 & 4: 466), the acid flow meter (not shown) (see FIG. 4: 470), the bactericide metering pump (not shown) (see FIGS. 1A-1B: 185 & 4: 480), the bactericide flow meter (not shown) (see FIG. 4: 484), the scale inhibition metering pump (not shown) (see FIGS. 1A-1B: 190), the scale inhibition flow meter (not shown), the defoamer pump (not shown) (see FIGS. 1A-1B: 195), and/or the defoamer flow meter (not shown) couple directly or indirectly to a signal conditioning device. If the component's raw signal must be processed to provide a suitable signal for an I/O system, that component will couple indirectly to the signal conditioning device.

The bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be fuzzy. For example, one may consider a presentation component such as a display device to be an I/O component. Additionally, many processors have memory. The inventors recognize that such is the nature of the art, and reiterate that the diagram of FIG. 6 is merely illustrative of an exemplary computing device that can be used in connection with one or more embodiments of the present invention. Further, a distinction is not made between such categories as "workstation," "server," "laptop," "mobile device," etc., as all are contemplated within the scope of FIG. 6 and reference to "computing device."

The PLC or computing device 600 of the system 100, 400, 1000, 1100 typically includes a variety of computer-readable media. Computer-readable media can be any available media that can be accessed by the PLC or computing device 600 and includes both volatile and nonvolatile media, removable and non-removable media. By way of example, and not limitation, computer-readable media may comprise computer-storage media and communication media. By way of another example, and not limitation, computer readable media may also comprise radio, cellular, or satellite communication media for remote collection and/or manipulation of data contained within the PLC or computing device 600. The computer-storage media includes volatile and nonvolatile, removable and non-removable media implemented in any method or technology for storage of information such as computer-readable instructions, data structures, program modules or other data. Computer-storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the PLC or computing device 600.

The memory 612 includes computer-storage media in the form of volatile and/or nonvolatile memory. The memory 612 may be removable, non-removable, or a combination thereof. Suitable hardware devices include solid-state memory, hard drives, optical-disc drives, etc. The PLC or computing device 600 includes one or more processors 614 that read data from various entities such as the memory 612 or the I/O components 620.

The presentation component(s) 616 present data indications to a user or other device. In an embodiment, the PLC or computing device 600 outputs present data indications including conductivity(ies), differential pressure(s), flow rate(s), humidity, pH, pressure, temperature and/or the like to a presentation component 616. Suitable presentation components 616 include a display device, speaker, printing component, vibrating component, and the like.

The user interface 622 allows the user to input/output information to/from the PLC or computing device 600. Suitable user interfaces 622 include keyboards, key pads, touch pads, graphical touch screens, and the like. In some embodiments, the user interface 622 may be combined with the presentation component 616, such as a display and a graphical touch screen. In some embodiments, the user interface 622 may be a portable hand-held device. The use of such devices is well-known in the art.

In an embodiment, the one or more I/O ports 618 allow the PLC or computing device 600 to be logically coupled to other devices including the shut-off valve 106, the first pressure switch 110, a first (feed) valve 112, the first limit switch 113, the second limit switch 114, the first pump 118, the first flow meter 122, the first temperature sensor 130, the first conductivity meter 131, the second conductivity meter 132 (not shown), the air temperature sensor 140, the air blower 142, the air heater with fan 143, the first high differential pressure switch 147, the second high, high differential pressure switch 148, the first high, high limit switch 149, the low limit switch 150, the high limit switch 151, a second high, high limit switch 152, the second pump 156, the second pressure switch 159, the pH meter 161, the second (recycle) valve 166, the third limit switch 167, the fourth limit switch 168, the third (discharge) valve 169, the fifth limit switch 170, the sixth limit switch 171, the second flow meter 173, the third shut-off valve 174, the acid metering pump 180, the acid flow meter (not shown), the bactericide metering pump 185, the bactericide flow meter (not shown), the scale inhibition metering pump 190, the scale inhibition flow meter (not shown), the defoamer pump 195, and/or the defoamer flow meter (not shown), and other I/O components 620, some of which may be built in.

Examples of other I/O components 620 include a printer, scanner, wireless device, and the like.

In another embodiment, the one or more I/O ports 618 allow the PLC or computing device 600 to be logically coupled to other devices including the shut-off valve 406, 506, the first conductivity meter 410, 510, the first flow meter 412, 512, the hygrometer 414, the first 3-way valve 416, the pump 420, 520, the pressure sensor 425, the second conductivity meter 428, 528, the pH meter 430, the second 3-way valve 432, 532, the air blower 436, 536 (or the plurality of air blowers 436', 436"), the differential pressure sensor 445, the first temperature sensor 590, the second temperature sensor 592, the high-water level switch (not shown), the low-water level switch (not shown), the second flow meter 456, the acid metering pump 466, the acid flow meter 470, the bactericide metering pump 480 and/or the bactericide flow meter 484, and other I/O components 620, some of which may be built in. Examples of other I/O components 620 include a printer, scanner, wireless device, and the like.

In an embodiment, the one or more I/O ports 618 allow the PLC or computing device 600 to be logically coupled to other devices including the shut-off valve 1006, the first pressure switch (not shown) (see FIGS. 1A-1B: 110), a first (feed) valve 1012, the first limit switch (not shown) (see FIGS. 1A-1B: 113), the second limit switch (not shown) (see FIGS. 1A-1B: 114), the pump 1018, the first flow indicator or meter 1022, the first temperature sensor (not shown) (see FIGS. 1A-1B: 130), the first conductivity meter (not shown) (see FIGS. 1A-1B: 131), the second conductivity meter (not shown), the air temperature sensor 1040 (see FIGS. 1A-1B: 140), the first air blower 1042, the second air blower (not shown), the air preheater 1043, the first high differential pressure switch 1053, the second high differential pressure switch (not shown) (see FIGS. 1A-1B: 147), the second high, high differential pressure switch (not shown) (see FIGS. 1A-1B: 148), the first high, high limit switch (not shown) (see FIGS. 1A-1B: 149), the low limit switch (see FIGS. 1A-1B: 150), the high limit switch (not shown) (see FIGS. 1A-1B: 151), a second high, high limit switch (not shown) (see FIGS. 1A-1B: 152), the pH meter (not shown) (see FIGS. 1A-1B: 161), the third (discharge) valve 1069, the third limit switch (not shown) (see FIGS. 1A-1B: 170), the fourth limit switch (not shown) (see FIGS. 1A-1B: 171), the third flow indicator or meter 1073 (see FIGS. 1A-1B: 173), the second shut-off valve (not shown) (see FIGS. 1A-1B: 174), the acid metering pump (not shown) (see FIGS. 1A-1B: 180 & 4: 466), the acid flow meter (not shown) (see FIG. 4: 470), the bactericide metering pump (not shown) (see FIGS. 1A-1B: 185 & 4: 480), the bactericide flow meter (not shown) (see FIG. 4: 484), the scale inhibition metering pump (not shown) (see FIGS. 1A-1B: 190), the scale inhibition flow meter (not shown), the defoamer pump (not shown) (see FIGS. 1A-1B: 195), and/or the defoamer flow meter (not shown), and other I/O components 620, some of which may be built in. Examples of other I/O components 620 include a printer, scanner, wireless device, and the like.

In an embodiment (see FIGS. 1A-3), the PLC or computing device 600 controls the two-pump system 100 according to the following circumstances:

To initiate the process, the following occurs:
Initially, an air temperature sensor 140 is set to a predetermined minimum air temperature (e.g., typically from about 25° F. to about 35° F.). If the air temperature sensor 140 is activated, the system 100 will stop operations due to an inability of the air heater with fan 143 to raise the wastewater temperature in the sump (bottom) of the container 139, 339 above the freezing point.

Initially, the first (feed) valve 112 is in a CLOSED position. To begin processing wastewater, the first (feed) valve 112 is switched to the OPEN position, allowing the feedstock water to enter the first pump 118. In an embodiment, the first limit switch 113 confirms that the first (feed) valve 112 is OPEN; and the second limit switch 114 confirms that the first (feed) valve 112 is CLOSED.

The first pump 118 is started to fill the sump (bottom) of the container 139, 339 with an initial fill volume of wastewater. To aid the second (recycle) pump 156, the container 139, 339 is set at forward incline to allow maximum depth at the suction-end (front) of the container 139, 339 to provide minimal sump volume. If the first conductivity meter 131 measures a predetermined minimum conductivity (e.g., indicating presence of oil in feedwater), the system 100 is shut off.

When the high limit switch 151 (at an operational level) is activated, the first (feed) valve 112 is switched to the CLOSED position; and the first pump 118 is shut off. In an embodiment, the second limit switch 114 confirms that the first (feed) valve 112 is CLOSED. If the first high, high limit switch 149 (at a primary containment level) is activated, the first (feed) valve 112 and the second (recycle) valve 166 are switched to the CLOSED positions; and the first pump 118 and the second pump 156 are shut off to prevent overfilling of the sump (bottom) of the container 139, 339. In an embodiment, the second limit switch 114 confirms that the first (feed) valve 112 is CLOSED; and the third limit switch 167 confirms that the second (recycle) valve is CLOSED. If the second high, high limit switch 152 (at a secondary containment level) is activated, an alarm is sent to the PLC or computing device 600. Further, the first (feed) valve 112 and the second (recycle) valve 166 are switched to the CLOSED positions; and the first pump 118 and the second pump 156 are shut off to prevent overfilling of the sump (bottom) of the container 139, 339. In an embodiment, the second limit switch 114 confirms that the first (feed) valve 112 is CLOSED; and the third limit switch 167 confirms that the second (recycle) valve is CLOSED.

Optionally, acid may be added to the sump (bottom) of the container 139, 339 or to the pipe 154 via the acid conditioning system 177, bactericide may be added to the sump (bottom) of the container 139, 339 or to the pipe 154 via the bactericide conditioning system 182, scale inhibitor may be added to the sump of the container or to the pipe 154 via the scale inhibition system and/or defoamer may be added to the sump (bottom) of the container 139, 339 or to the pipe 154 via the defoamer system 192 based on the initial fill volume.

The air blower 142 is started. If the first high differential pressure switch 147 is activated, the air blower 142 is operating. If a flame is present in the natural gas burner, the air heater with fan 143 is started.

Initially, the second (recycle) valve 166 is in a CLOSED position. To allow recirculating wastewater to enter the spray system 134, 334, the second (recycle) valve 166 is switched to the OPEN position. In an embodiment, the third limit switch 167 confirms that the second (recycle) valve 166 is CLOSED; and the fourth limit switch 168 confirms that the second (recycle) valve 166 is OPEN.

Initially, the third (discharge) valve 169 is in a CLOSED position. In an embodiment, the fifth limit switch 170 confirms that the third (discharge) valve 169 is OPEN; and the sixth limit switch 171 confirms that the third (discharge) valve 169 is CLOSED.

The second pump 156 is started to recirculate the wastewater from the sump (bottom) of the container 139, 339 through the spray system 134, 334. If the second pressure switch 159 is activated, a minimum pressure has been obtained. If the first conductivity sensor/meter 131 measures a predetermined low conductivity (e.g., indicating presence of oil in recycle wastewater), the system 100 is shut off.

Optionally, acid may be added to the sump (bottom) of the container 139, 339 or to the pipe 154 via the acid conditioning system 177, bactericide may be added to the sump (bottom) of the container 139, 339 or to the pipe 154 via the bactericide conditioning system 182, scale inhibitor may be added to the sump of the container 139, 339 or to the pipe 154 via the scale inhibition system and/or defoamer may be added to the sump (bottom) of the container 139, 339 or to the pipe 154 via the defoamer system 192 based on wastewater condition as indicated by pH meter 161, the first conductivity meter 131, and/or the second conductivity meter 132 (not shown).

If the low limit switch 150 is activated, the following occurs:

To continue processing wastewater, the first (feed) valve 112 is switched to the OPEN position, allowing the feedstock water to enter the first pump 118. In an embodiment, the first limit switch 113 confirms that the first (feed) valve 112 is OPEN.

The first pump 118 is started to fill the sump (bottom) of the container 139, 339 with an initial fill volume of wastewater. If the first conductivity sensor/meter 131 measures a predetermined minimum conductivity (e.g., indicating presence of oil in feedwater), the system 100 is shut off.

When the high limit switch 151 (at an operational level) is activated, the first (feed) valve 112 is switched to the CLOSED position; and the first pump 118 is shut off. In an embodiment, the second limit switch 114 confirms that the first (feed) valve 112 is CLOSED.

Optionally, acid may be added to the sump (bottom) of the container 139, 339 or to the pipe 154 via the acid conditioning system 177, bactericide may be added to the sump (bottom) of the container 139, 339 or to the pipe 154 via the bactericide conditioning system 182, scale inhibitor may be added to the sump (bottom) of the container 139, 339 or to the pipe 154 via the scale inhibition system and/or defoamer may be added to the sump (bottom) of the container 139, 339 or to the pipe 154 via the defoamer system 192 based on the initial fill volume.

If the second conductivity meter 132 indicates the brine has reached a predetermined maximum conductivity, the following occurs:

To begin discharging brine, the third (discharge) valve 169 is switched to the OPEN position, allowing the brine to discharge from the waste outlet 176. In an embodiment, the fifth limit switch 170 confirms that the third (discharge) valve 169 is OPEN.

To prevent recycle of brine, the second (recycle) valve 166 is switched to the CLOSED position. In an embodiment, the third limit switch 167 confirms that the second (recycle) valve 166 is CLOSED.

When the second pressure switch 159 indicates a loss of pressure due to nearly complete discharge of brine from the discharge outlet 176, the second pump 156 will begin to lose prime.

To allow recycle of residual brine, the second (recycle) valve 166 is switched to the OPEN position. In an embodiment, the fourth limit switch 168 confirms that the second (recycle) valve 166 is OPEN.

To stop discharge of brine, the third (discharge) valve 169 is switched to the CLOSED position. In an embodiment, the fifth limit switch 171 confirms that the third (discharge) valve 169 is CLOSED.

To continue processing wastewater, the first (feed) valve 112 is switched to the OPEN position, allowing the feedstock water to enter the first pump 118. In an embodiment, the first limit switch 113 confirms that the first (feed) valve 112 is OPEN.

The first pump 118 is started to fill the sump (bottom) of the container 139, 339 with an initial fill volume of wastewater. If the first conductivity sensor/meter 131 measures a predetermined minimum conductivity (e.g., indicating presence of oil in feedwater), the system 100 is shut off.

When the high limit switch 151 (at an operational level) is activated, the first (feed) valve 112 is switched to the CLOSED position; and the first pump 118 is shut off. In an embodiment, the second limit switch 114 confirms that the first (feed) valve 112 is CLOSED.

Optionally, acid may be added to the sump (bottom) of the container 139, 339 or to the pipe 154 via the acid conditioning system 177, bactericide may be added to the sump (bottom) of the container 139, 339 or to the pipe 154 via the bactericide conditioning system 182, scale inhibitor may be added to the sump (bottom) of the container 139, 339 or to the pipe 154 via the scale inhibition system and/or defoamer may be added to the sump (bottom) of the container 139, 339 or to the pipe 154 via the defoamer system 192 based on the initial fill volume.

The system 100 runs continuously until shut off by an operator or by PLC or computing device 600 due to occurrence of one of the above-discussed situations.

In an embodiment, the PLC or computing device 600 monitors hygrometer 414 (e.g., barometric pressure, humidity, temperature) and controls operating conditions of the system 100 to maximize evaporation through the control of droplet size created by the spray system 134, 334 and air volume provided through the air blower and heater system 141, 241, 341, as discussed below.

In an embodiment, the PLC or computing device 600 monitors the pH meter 161 and controls the addition of acid introduced to the water to condition it for the prevention of scale (scaling), as discussed below.

In an embodiment, the PLC or computing device 600 controls the addition of bactericide introduced to the water to condition it for the prevention of microbial (e.g., algae, bacteria) growth, as discussed below.

In an embodiment, the PLC or computing device 600 controls the addition of scale inhibitor introduced to the water to condition it for the prevention of scale (e.g., mineral) build up, as discussed below.

In an embodiment, the PLC or computing device 600 controls the addition of defoamer introduced to the water to condition it for the prevention of foam, as discussed below.

In another embodiment (see FIGS. 4A-5D), the PLC or computing device 600 controls the first three-way valve 416 of the single pump system 400 according to the following circumstances:

If the low-water level switch (not shown) in the container 444, 544 is activated, the first 3-way valve 416 diverts suction of the pump 420, 520 to a water inlet 404, 504, allowing connection to a wastewater suction header 402. The first 3-way valve 416 will remain in this state until a high-water level switch (not shown) in the container 444, 544 is activated.

When the high-water level switch (not shown) in the container 444, 544 is activated, the first 3-way valve 416 diverts suction of the pump 420, 520 to a draw line 452, 552 for the container 444, 544, providing for a recycle of the water in the container 444, 544 through the spray system 440.

Further, the PLC or computing device 600 controls the second 3-way valve 432, 532 on the discharge side of the pump 420, 520 according to the following circumstances:

By default, the second 3-way valve 432, 532 will divert the discharge of water to the spray system 440.

If the conductivity of water in the conductivity meter 428, 528 reaches a predetermined maximum conductivity, the second 3-way valve 432, 532 will divert discharge of the concentrated waste to the waste outlet 458, 558 of the container 444, 544, allowing connection to an external waste disposal storage (e.g., tank, truck or pond) (not shown). The second 3-way valve 432, 532 will remain in this position until the low-water level switch (not shown) in the container 444, 544 is activated. At which point, the second 3-way valve 432, 532 is returned to its default position.

In an embodiment, the PLC or computing device 600 monitors hygrometer 414 (e.g., barometric pressure, humidity, temperature) and controls operating conditions of the system 400 to maximize evaporation through the control of droplet size created by the spray system 440 and air volume provided through the air blower system 434, 534, as discussed below.

In an embodiment, the PLC or computing device 600 monitors the pH meter and controls the addition of acid introduced to the water to condition it for the prevention of scale (e.g., mineral) build up, as discussed below.

In an embodiment, the PLC or computing device 600 controls the addition of bactericide introduced to the water to condition it for the prevention of microbial (e.g., algae, bacteria) growth, as discussed below.

In another embodiment (see FIGS. 10A-10C & 11A-11F), the PLC or computing device 600 controls the first (feed) shut-off valve 1006, the first (feed) valve 1012 and the second (feed/recirculating) valve 1054 of the single pump system 1000, 1100 according to the following circumstances:

If an optional low-water level (not shown) in the container 1039 is activated or if the first (feed) shut-off valve 1006 and the first (feed) valve 1012 are switched to the OPEN position (and the third (pump supply) valve 1055 is switched to the CLOSED position), the first (feed) shut-off valve 1006 and the first (feed) valve 1012 diverts suction of a pump 1018 to a flange to a water source or water inlet 1004, allowing connection to a wastewater suction header 1002. The first (feed) shut-off valve 1006 and the first (feed) valve 1012 will remain in this state until an optional high-water switch (not shown) is activated or until the first (feed) shut-off valve 1006 and the first (feed) valve 1012 are switched to a CLOSED position.

Further, the PLC or computing device 600 controls the second (feed/recirculating) valve 1054 of the single pump system 1000, 1100 according to the following circumstances:

If the second (feed/recirculating) valve 1054 is switched to the OPEN position (and the fourth (discharge) valve 1069 is switched to the CLOSED position), the second (feed/recirculating) valve 1054 will divert the discharge of water from the pump 1018 to the manifold 1028 or the drip system 1034. The second (feed/recirculating) valve 1054 will remain in this state until the second (feed/recirculating) valve 1054 is switched to the CLOSED position.

Further, the PLC or computing device 600 controls the third (pump supply) valve 1055 of the single pump system 1000, 1100 according to the following circumstances:

If the third (pump supply) valve 1055 is switched to the OPEN position (and the first (feed) valve 1012 and the fourth (discharge valve 1069 are switched to the CLOSED position), the third (pump supply) valve 1055 diverts suction of a pump 1018 to a draw line 1055*a*, providing for recirculation of the condensed water in the container 1039 through the drip system 1034. The third (pump supply) valve 1055 will remain in this state until the third (pump supply) valve 1055 is switched to the CLOSED position.

Further, the PLC or computing device 600 controls a fourth (discharge) valve 1069 of the single pump system 1000, 1100 according to the following circumstances:

If the conductivity of water in an optional second conductivity meter (not shown) reaches a predetermined maximum conductivity, the fourth (discharge) valve 1069 is switched to the OPEN position to divert discharge of the concentrated waster to a waste flange or discharge outlet 1076, allowing connection to an external waste disposal storage (e.g., tank, truck or pond). (See e.g., FIGS. 10A & 10C). The fourth (discharge) valve 1069 will remain in this position until an optional low level switch (not shown) in the container 1039 is activated. At which point, the fourth (discharge) valve 1069 is switched to the CLOSED position.

If the fourth (discharge) valve 1069 is switched to the OPEN position, the fourth (discharge) valve 1069 will divert discharge of the concentrated waster to a waste flange or discharge outlet 1076, allowing connection to an external waste disposal storage (e.g., tank, truck or pond). (See e.g., FIGS. 10A & 10C). The fourth (discharge) valve 1069 will remain in this position until the fourth (discharge) valve 1069 is switched to the CLOSED position.

In an embodiment, the PLC or computing device 600 controls the natural gas flow to the air preheater 1043 burner to control a resulting air temperature based on an ambient air temperature and a desired evaporation rate. In an embodiment, the natural gas flow control valve may be modulated from a fully OPEN position to a fully CLOSED position, and vice versa.

In an embodiment, the PLC or computing device 600 monitors hygrometer (e.g., barometric pressure, humidity, temperature) and controls operating conditions of the system 1000, 1100 to maximize evaporation through the control of droplet size created by the drip system 1034 and air volume provided through the air blower and preheater system 1041, as discussed below.

In an embodiment, the PLC or computing device 600 monitors the pH meter and controls the addition of acid introduced to the water to condition it for the prevention of scale (scaling), as discussed below.

In an embodiment, the PLC or computing device 600 controls the addition of bactericide introduced to the water to condition it for the prevention of microbial (e.g., algae, bacteria) growth, as discussed below.

In an embodiment, the PLC or computing device 600 controls the addition of scale inhibitor introduced to the water to condition it for the prevention of scale (e.g., mineral) build up, as discussed below.

In an embodiment, the PLC or computing device 600 controls the addition of defoamer introduced to the water to condition it for the prevention of foam, as discussed below.

Method for Using System for Spray Evaporation of Water

Figure 7A:
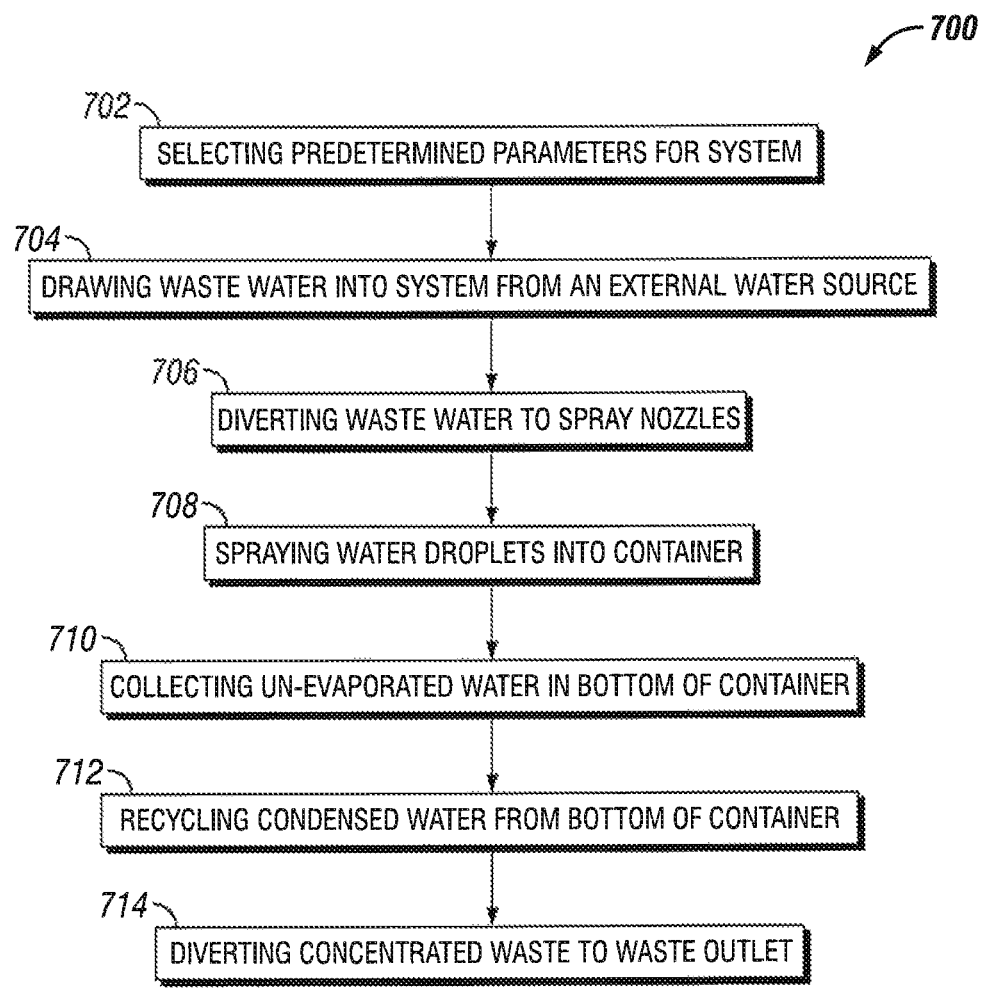
FIG. 7A illustrates a method of using an exemplary system for spray evaporation of water according to an embodiment of the present invention.
Figure 7B:
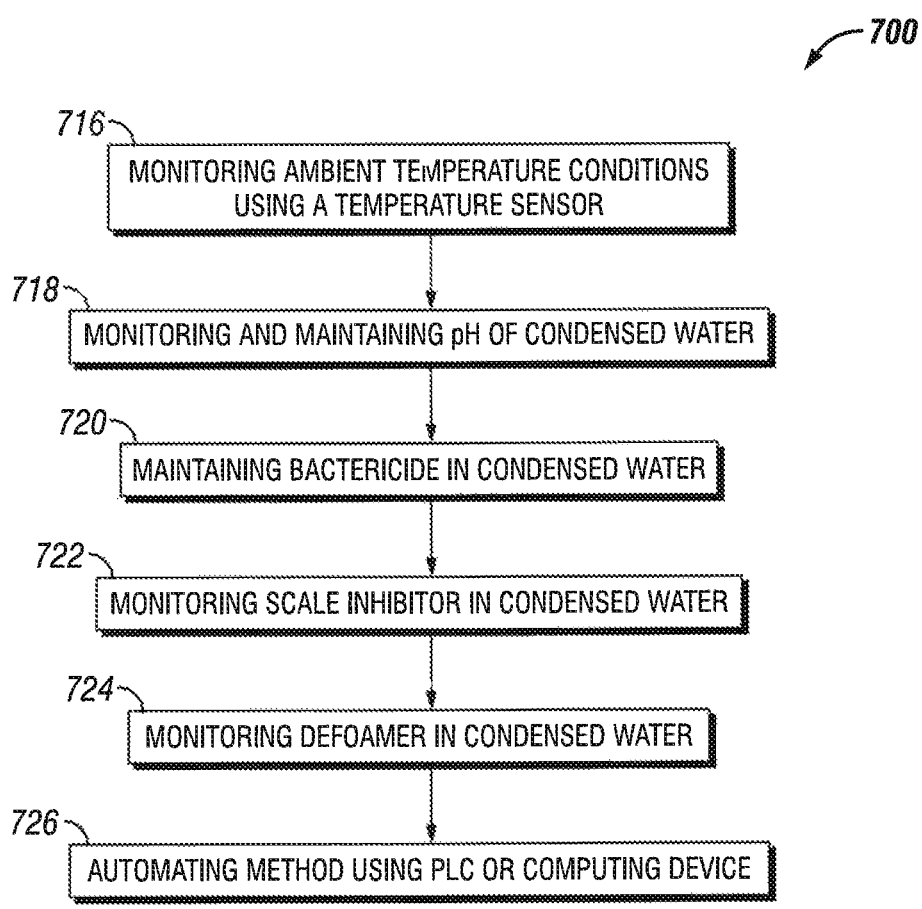
FIG. 7B illustrates additional, optional steps for the method of FIG. 7A.

A flow diagram for a method 700 of using a system for spray evaporation of water is shown in FIGS. 7A-7B. In an embodiment, the method 700 comprises selecting predetermined parameters (e.g., air flow rate, air heating rate, maximum conductivity, maximum humidity, maximum pH, minimum air temperature, minimum pH, water flow rate, water droplet size) for a system for spray evaporation of water, drawing wastewater into the system from an external water source using a first pump and a first valve, diverting the wastewater to a spray nozzle, spraying the wastewater through the spray nozzle to create water droplets, spraying the water droplets into a container of the system along with a large volume of air, collecting condensed water in the sump (bottom) of the container, recycling condensed water from the bottom of the container using a second pump and a second valve, and diverting the concentrated waste to a waste outlet using a third valve, as illustrated in FIGS. 7A-7B.

In an embodiment, the method 700 comprises a step 702 of selecting predetermined parameters (e.g., maximum conductivity, water droplet size, air flow rate, air heating rate, water flow rate, maximum humidity) for the system of spray evaporation of water. In an embodiment, the maximum conductivity may be about 1,000 micro μS/cm to about 400,000 μS/cm (and any range or value there between). In an embodiment, the water droplet size may be about 50 μm to about 1,000 μm (and any range or value there between). In an embodiment, the air flow rate may be about 60,000 cubic feet per minute (CFM) to about 150,000 CFM (and any range or value there between). In an embodiment, the air heating rate may be from about 0 million BTU per hour to about 4 million BTU per hour (and any range or value there between). In an embodiment, the water flow rate may be about 50 gallons per minute (GPM) to about 800 GPM (and any range or value there between).

In an embodiment, the method 700 comprises a step 704 of drawing wastewater into the system from an external water source using a first pump and a first valve. In an embodiment, a wastewater inlet permits connection to the external wastewater source. The water inlet may be connected to the external wastewater source via a hose, pipe or other means customary in the art.

In an embodiment, the method 700 comprises a step 706 of diverting inlet wastewater or condensed water to a spray nozzle and spraying the inlet wastewater through the spray nozzle to create water droplets. In an embodiment, the water droplets may be sized to create an optimal surface area for water evaporation, but large enough to minimize passage through the pores of the demister pads.

In an embodiment, the method 700 comprises a step 708 of spraying the water droplets into a container of the system. In an embodiment, the water droplets may be sprayed to a furthest point in the container to lengthen air contact and enhance water evaporation. In an embodiment, air may be blown counter to the sprayed water droplets to increase air contact and improve water evaporation.

In an embodiment, the method 700 comprises a step 710 of collecting condensed water in the sump (bottom) of the container. In an embodiment, un-evaporated water is condensed in a demister element of the system and condensed water is collected in the sump (bottom) of the container.

In an embodiment, the method 700 comprises a step 712 of recycling the condensed water from the sump (bottom) of container using a second pump and a second valve. In an embodiment, when the condensed water reaches a predetermined high-water level, the second pump draws condensed water from the sump (bottom) of the container and the second valve diverts the condensed water to the spray nozzle. In an embodiment, the second pump will continue recirculating the condensed water until the condensed water in the sump (bottom) of the container reaches a predetermined low-water level or a predetermined maximum conductivity as measured by a conductivity meter. In an embodiment, the first pump will draw wastewater into the system from the external water source when the condensed water in the sump (bottom) of the container reaches the predetermined low-water level.

In an embodiment, the method 700 comprises a step 714 of diverting concentrated water to a waste outlet using a third valve. In an embodiment, when the condensed wastewater reaches a predetermined maximum conductivity, the third valve diverts the concentrated waste to the waste outlet. In an embodiment, a waste outlet permits connection to an external waste disposal storage (e.g., tank, truck, pond). The waste outlet may be connected to the external waste disposal storage via a hose, pipe or other means customary in the art.

In an embodiment, the method 700 may further comprise a step 716 of monitoring ambient temperature using an air temperature sensor. In an embodiment, when the ambient temperature precludes water evaporation, the system is shut down, as discussed below.

In an embodiment, the method 700 may further comprise a step 718 of monitoring pH of the inlet wastewater or condensed water using a pH meter and adding acid solution to the inlet wastewater or condensed water to maintain the pH at about 6.5 or below to minimize calcium carbonate scaling. In an embodiment, the desired pH of the wastewater may be above 6.5 if a scale inhibitor is added to minimize carbonate and non-carbonate scaling.

The acid may be any suitable acid. Suitable acids include, but are not limited to, hydrochloric acid and sulfuric acid. In an embodiment, the acid may be hydrochloric acid (20 baume). In an embodiment, the acid may be sulfuric acid (98%). In an embodiment, the desired pH of the wastewater is about 6.5 or below to minimize carbonate scaling. In an embodiment, the desired pH of the wastewater may be above 6.5 if a scale inhibitor is added to minimize carbonate and non-carbonate scaling. In an embodiment, the amount of acid solution added to the wastewater varies, depending on inlet water conditions (e.g., pH).

In an embodiment, the method 700 may further comprise the step 720 of maintaining bactericide in inlet wastewater or condensed water. In an embodiment, a predetermined amount of bactericide solution may be added to the inlet wastewater or condensed water to prevent microbial growth.

The bactericide may be any suitable bactericide. Suitable bactericide includes, but is not limited to, bleach, bromine, chlorine dioxide (generated), 2,2-dibromo-3-nitrilo-propionade (DBNPA), glutaraldehyde, isothiazolin (1.5%) and ozone (generated). In an embodiment, the bactericide may be selected from the group consisting of bleach (12.5%), bromine, chlorine dioxide (generated), DBNPA (20%), glutaraldehyde (50%), isothiazolin (1.5%) and ozone (generated). In an embodiment, the desired bactericide concentration is from about 10 ppm to about 1000 ppm (and any range or value there between). The amount of bactericide solution added to the wastewater varies, depending on inlet water condition.

In an embodiment, the method 700 may further comprise the step 722 of maintaining scale inhibitor in the inlet wastewater or condensed water. In an embodiment, a predetermined amount of scale inhibitor solution may be added to the inlet wastewater or condensed water to prevent scale growth.

The scale inhibitor may be any suitable scale inhibitor or blend of scale inhibitors. Suitable scale inhibitor includes, but is not limited to, inorganic phosphates, organophosphorous compounds and organic polymers. In an embodiment, the scale inhibitor may be selected from the group consisting of organic phosphate esters, polyacrylates, phosphonates, polyacrylamides, polycarboxylic acids, polymalates, polyphosphincocarboxylates, polyphosphates and polyvinylsylphonates. In an embodiment, the desired scale inhibitor concentration is from about 10 ppm to about 100 ppm (and any range or value there between). In an embodiment, the desired scale inhibitor concentration is from about 2 ppm to about 20 ppm (and any range or value there between). The amount of scale inhibitor solution added to the wastewater varies, depending on inlet water conditions.

In an embodiment, the method 700 may further comprise the step 724 of maintaining defoamer in the inlet water or condensed water. In an embodiment, a predetermined amount of defoamer solution may be added to the inlet wastewater or condensed water to prevent foam.

The defoamer may be any suitable defoamer. Suitable defoamer includes, but is not limited to, alcohols, glycols, insoluable oils, silicone polymers and stearates. In an embodiment, the defoamer may be selected from the group consisting of fatty alcohols, fatty acid esters, fluorosilicones, polyethylene glycol, polypropylene glycol, silicone glycols and polydimethylsiloxane. In an embodiment, the desired defoamer concentration is from about 10 ppm to about 100 ppm (and any range or value there between). In an embodiment, the desired defoamer concentration is from about 2 ppm to about 20 ppm (and any range or value there between). The amount of defoamer solution added to the wastewater varies, depending on inlet water conditions.

In an embodiment, the method 700 may further comprise a step of 726 of automating the method 700 using a programmable logic controller (PLC) or computing device. In an embodiment, predetermined parameters (e.g., air flow rate, air heating rate, maximum conductivity, maximum humidity, maximum pH, minimum air temperature, minimum pH, water flow rate, water droplet size) are input into the PLC or computing device.

In an embodiment, when ambient air temperature is above a predetermined minimum air temperature, the PLC or computing device controls the system in an "External Source" mode according to the following circumstances:

A first valve diverts suction of a first pump to a water inlet, directing discharge of wastewater to a spray nozzle.

The first pump and the air blower and heater system are running.

The spray nozzles disperse the wastewater into water droplets into a container.

Any un-evaporated water droplets are retained by the pores of a demister element(s) and fall to the bottom of the container via gravity.

In an embodiment, the PLC or computing device will monitor pH of the inlet wastewater or condensed water via a pH meter and automatically add acid solution to the pump discharge using an acid metering pump in an acid conditioning system to maintain the pH at about 6.5 pH or below to minimize calcium carbonate scaling. In an embodiment, the PLC or computing device may add an amount of acid solution to the pump discharge using the acid metering pump and an acid flow meter.

In an embodiment, when condensed water in the sump (bottom) of the container reaches a predetermined high-water level, the PLC or computing device controls the system in a "Recycle" mode:

The first valve diverts suction of the second pump to a draw line connected to the bottom of the container.

The second valve diverts discharge of the condensed water to the spray nozzles.

The second pump and the air blower and heater system continue to run.

The condensed water will be sprayed by the spray nozzles into the container.

Any un-evaporated water droplets are retained by the pores of the demister element(s) and fall to the sump (bottom) of the container via gravity.

The PLC or computing device continues to operate the system in a "Recycle" mode until the condensed water level in the sump (bottom) of the container is at or below a low-water level switch or until the condensed water reaches a predetermined maximum conductivity.

In an embodiment, the PLC or computing device will monitor pH of the inlet wastewater or condensed water via a pH meter and automatically add acid solution to the pump discharge using an acid metering pump in an acid conditioning system to maintain the pH at about 6.5 pH or below to minimize calcium carbonate scaling. In an embodiment, the desired pH of the wastewater may be above 6.5 if a scale inhibitor is added to minimize carbonate and non-carbonate scaling.

In an embodiment, the PLC or computing device will monitor conductivity of the inlet wastewater or condensed water using a conductivity meter.

In an embodiment, when the condensed water reaches a predetermined maximum conductivity, the PLC or computing device controls the system in a "Waste Discharge" mode according to the following circumstances:

The first valve continues to divert suction of the second pump to a draw line connected to the bottom of the container.

The third valve diverts discharge of the concentrated waste to a waste outlet.

The second pump continues to run; however, the air blower and heater system, and the acid pump are shut off.

Neither conductivity nor pH is being monitored.

The PLC or other computing device continues to operate the system in a "Discharge" mode until the water level in the sump (bottom) of the container is at or below a low-water level switch. At that point, the PLC or other computing device reverts to operate the system in an "External Source" mode, and proceeds as described above.

In an embodiment, when ambient air temperature reaches a predetermined minimum air temperature, the PLC or computing device controls the system in a "Suspend" mode according to the following circumstances:

The pump(s) and air blower and heater system are shut off.

The first valve diverts suction of the second pump to a draw line connected to the sump (bottom) of the container.

The second valve diverts discharge of wastewater to the spray nozzles.

In an embodiment, when ambient air temperature reaches a level above the predetermined minimum level, the PLC or computing device reverts to operate the system in the "External Source" mode, and proceeds as described above.

Figure 8A:
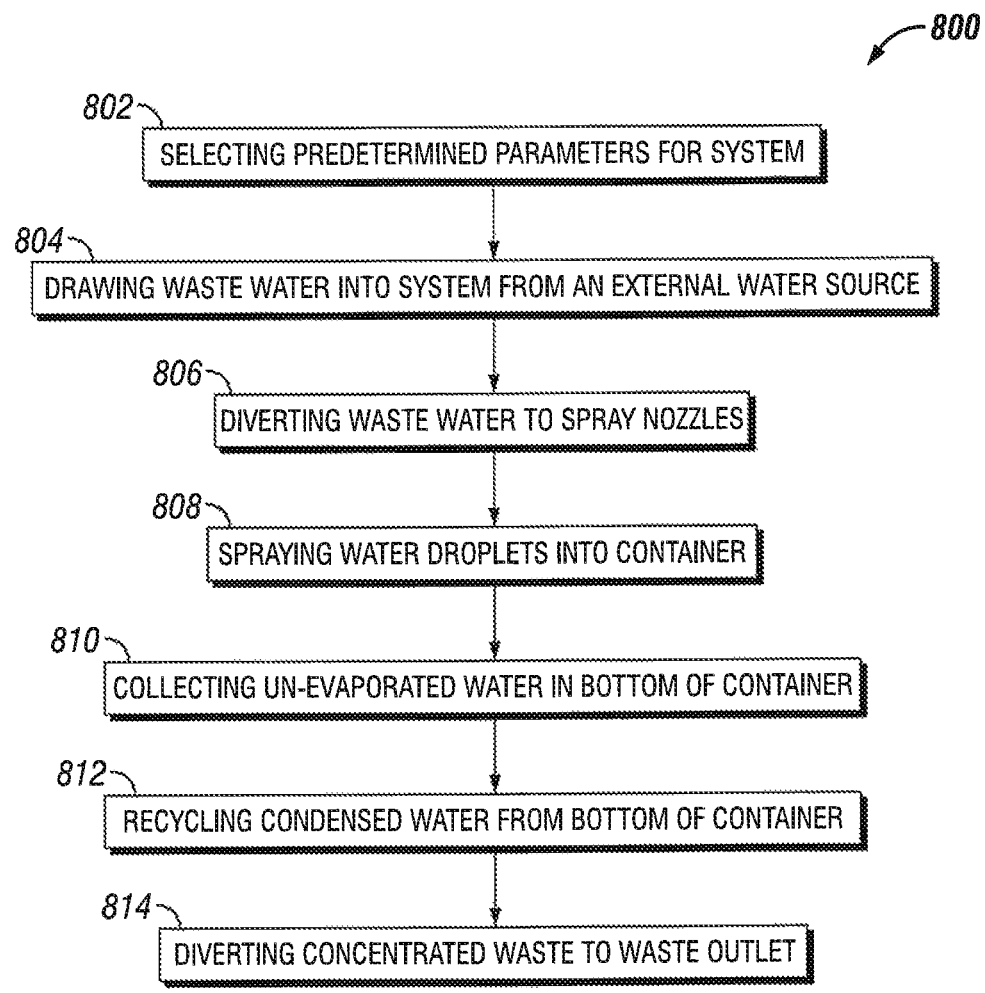
FIG. 8A illustrates a method of using an exemplary system for spray evaporation of water according to an embodiment of the present invention.
Figure 8B:
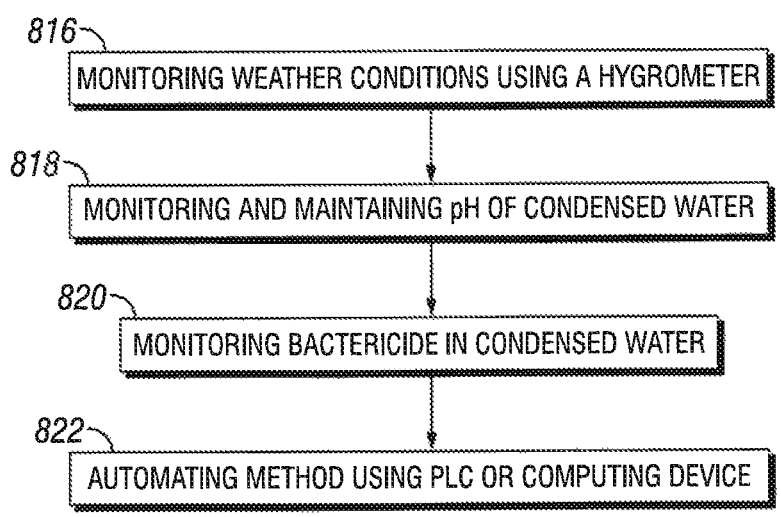
FIG. 8B illustrates additional, optional steps for the method of FIG. 8A.
Figure 9:
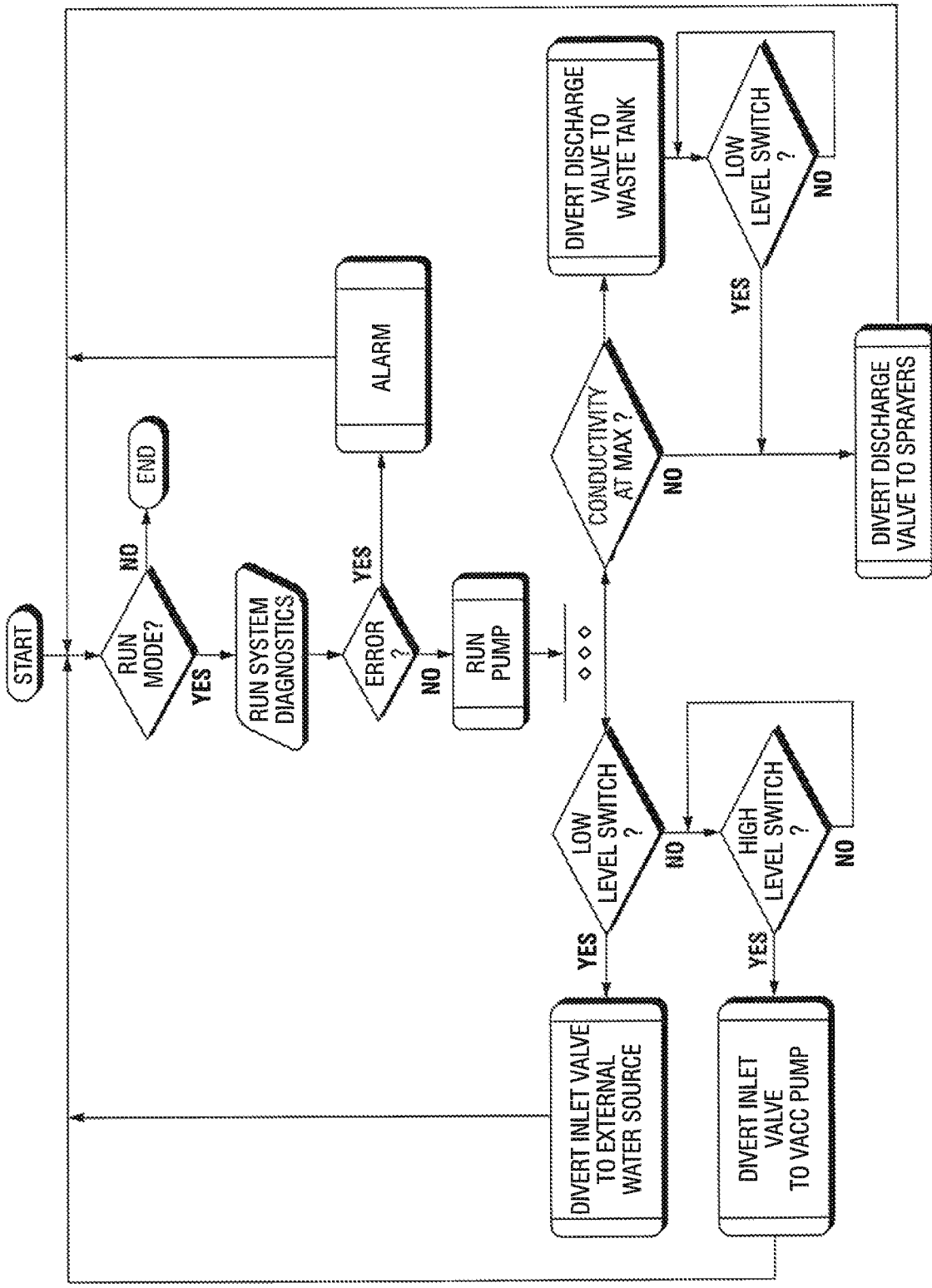
FIG. 9 illustrates a flow diagram for a PLC or computing device for an exemplary system for spray evaporation of water according to an embodiment of the present invention.

Method of Using System for Spray Evaporation of Water Illustrating Alternative Embodiments

First Alternative Embodiment

A flow diagram for a method 800 of using a first alternative system for spray evaporation of water is shown in FIGS. 8A-8B. In an embodiment, the method 800 comprises selecting predetermined parameters (e.g., air flow rate, air heating rate, maximum conductivity, maximum humidity, maximum pH, minimum air temperature, minimum pH, water flow rate, water droplet size) for a system for spray evaporation of water, drawing wastewater into the system from an external water source using a pump, diverting the wastewater to a spray nozzle, spraying the wastewater through the spray nozzle to create water droplets, blowing the water droplets and air into a container of the system using an air blower, collecting condensed water in the sump (bottom) of the container, recycling condensed water from the bottom of the container using the pump, and diverting the concentrated waste to a waste outlet, as illustrated in FIGS. 8A-8B.

In an embodiment, the method 800 comprises a step 802 of selecting predetermined parameters (e.g., maximum conductivity, water droplet size, air flow rate, air heating rate, water flow rate, maximum humidity) for the system of spray evaporation of water. In an embodiment, the maximum conductivity may be about 1,000 micro μS/cm to about 400,000 μS/cm (and any range or value there between). In an embodiment, the water droplet size may be about 50 μm to about 1,000 μm (and any range or value there between). In an embodiment, the air flow rate may be about 60,000 cubic feet per minute (CFM) to about 150,000 CFM (and any range or value there between). In an embodiment, the water flow rate may be about 50 gallons per minute (GPM) to about 800 GPM (and any range or value there between). In an embodiment, the water flow rate may be about 15 GPM to about 100 GPM (and any range or value there between).

In an embodiment, the method 800 comprises a step 804 of drawing wastewater into the system from an external water source using a pump. In an embodiment, a wastewater inlet permits connection to the external wastewater source. The water inlet may be connected to the external wastewater source via a hose, pipe or other means customary in the art.

In an embodiment, the method 800 comprises a step 806 of diverting inlet wastewater or condensed water to a spray nozzle using a 3-way valve and spraying the inlet wastewater or condensed water through the spray nozzle to create water droplets. In an embodiment, the water droplets may be sized to create an optimal surface area for water evaporation.

In an embodiment, the method 800 comprises a step 808 of blowing the water droplets and air into a container of the system. In an embodiment, the water droplets and air may be blown to a furthest point in the container to lengthen air contact and enhance water evaporation.

In an embodiment, the method 800 comprises a step 810 of collecting condensed water in the sump (bottom) of the container. In an embodiment, un-evaporated water is condensed in a demister element of the system and condensed water is collected in the sump (bottom) of the container.

In an embodiment, the method 800 comprises a step 812 of recycling the condensed water from the sump (bottom) of the container using the pump. In an embodiment, when the condensed water reaches a predetermined high-water level, the pump draws condensed water from the sump (bottom) of the container instead of drawing wastewater into the system from the external water source. In an embodiment, the pump will continue recirculating the condensed water until the condensed water in the sump (bottom) of the container reaches a predetermined low-water level or a predetermined maximum conductivity as measured by a conductivity meter. In an embodiment, the pump will draw wastewater into the system from the external water when the condensed water in the sump (bottom) of the container reaches the predetermined low-water level.

In an embodiment, the method 800 comprises a step 814 of diverting concentrated water to a waste outlet using a 3-way valve. In an embodiment, when the condensed wastewater reaches a predetermined maximum conductivity, a 3-way valve diverts the concentrated waste to the waste outlet. In an embodiment, a waste outlet permits connection to an external waste disposal storage (e.g., tank, truck, pond). The waste outlet may be connected to the external waste disposal storage via a hose, pipe or other means customary in the art.

In an embodiment, the method 800 may further comprise a step 816 of monitoring weather conditions using a hygrometer. In an embodiment, when the weather conditions (e.g., barometric pressure, humidity, temperature) preclude water evaporation, the system is shut down, as discussed below.

In an embodiment, the method 800 may further comprise a step 818 of monitoring pH of the inlet wastewater or condensed water using a pH meter and adding acid solution to the inlet wastewater or condensed water to maintain the pH at about 6.5 or below to minimized calcium carbonate scaling. In an embodiment, the desired pH of the wastewater may be above 6.5 if a scale inhibitor is added to minimize carbonate and non-carbonate scaling.

The acid may be any suitable acid. Suitable acids include, but are not limited to, hydrochloric acid and sulfuric acid. In an embodiment, the acid may be hydrochloric acid (20 baume). In an embodiment, the acid may be sulfuric acid (98%). In an embodiment, the desired pH of the wastewater is about 6.5 or below to minimize calcium carbon scaling. In an embodiment, the amount of acid solution added to the wastewater varies, depending on inlet water conditions (e.g., pH, alkalinity).

In an embodiment, the method 800 may further comprise the step 820 of adding a predetermined amount of bactericide solution to the inlet wastewater or condensed water to minimize microbial growth.

The bactericide may be any suitable bactericide. Suitable bactericide includes, but is not limited to, bleach, bromine, chlorine dioxide (generated), 2,2-dibromo-3-nitrilo-propionade (DBNPA), glutaraldehyde, isothiazolin (1.5%) and ozone (generated). In an embodiment, the bactericide may be selected from the group consisting of bleach (12.5%), bromine, chlorine dioxide (generated), DBNPA (20%), glutaraldehyde (50%), isothiazolin (1.5%) and ozone (generated). In an embodiment, the desired bactericide concentration is from about 10 ppm to about 1000 ppm (and range or value there between). The amount of bactericide solution added to the wastewater varies, depending on inlet water conditions.

In an embodiment, the method 800 may further comprise a step of 822 of automating the method 800 using a programmable logic controller (PLC) or computing device. In an embodiment, predetermined parameters (e.g., air flow rate, air heating rate, maximum conductivity, maximum humidity, maximum pH, minimum air temperature, minimum pH, water flow rate, water droplet size) are input into the PLC or computing device.

In an embodiment, when ambient humidity is below a predetermined maximum humidity, the PLC or computing device controls the system in an "External Source" mode according to the following circumstances:

A first 3-way valve diverts suction of a pump to a water inlet.
A second 3-way valve diverts discharge of wastewater to a spray nozzle.
The pump and air blower are running.
The spray nozzles atomize the wastewater into water droplets and the air blower blows the water droplets and air into a container.
Any un-evaporated water droplets are retained by the pores of a demister element(s) and fall to the bottom of the container via gravity.

In an embodiment, the PLC or computing device will monitor pH of the inlet wastewater or condensed water via a pH meter and automatically add acid solution to the pump discharge using an acid metering pump in an acid conditioning system to maintain the pH at about 6.5 pH or below to minimize calcium carbonate scaling. In an embodiment, the PLC or computing device may add an amount of acid solution to the pump discharge using the acid metering pump and an acid flow meter.

In an embodiment, when condensed water in the sump (bottom) of the container reaches a predetermined high-water level, the PLC or computing device controls the system in a "Recycle" mode:

The first 3-way valve diverts suction of the pump to a draw line connected to the bottom of the container.
The second 3-way valve continues to divert discharge of condensed water to the spray nozzles.
The pump and air blower continue to run.
The condensed water will be atomized by the spray nozzles and blown by the air blower from the front to the back of the container according to the predetermined parameters (e.g., water droplet size, air flow rate).
Any un-evaporated water droplets are retained by the pores of the demister element(s) and fall to the sump (bottom) of the container via gravity.

The PLC or computing device continues to operate the system in a "Recycle" mode until the condensed water level in the sump (bottom) of the container is at or below a low-water level switch or until the condensed water reaches a predetermined maximum conductivity.

In an embodiment, the PLC or computing device will monitor pH of the inlet wastewater or condensed water via a pH meter and automatically add an acid solution to the pump discharge using an acid metering pump in an acid conditioning system to maintain the pH at about 6.5 pH or below, if required, based on waste water quality.

In an embodiment, the PLC or computing device will monitor conductivity of the inlet wastewater or condensed water using a conductivity meter.

In an embodiment, when the condensed water reaches a predetermined maximum conductivity, the PLC or computing device controls the system in a "Waste Discharge" mode according to the following circumstances:

The first 3-way valve continues to divert suction of the pump to a draw line connected to the bottom of the container.
The second 3-way valve diverts discharge of the concentrated waste to a waste outlet.
The pump continues to run; however, the air blower and the acid pump are shut off.
Neither conductivity nor pH is being monitored.

The PLC or other computing device continues to operate the system in a "Discharge" mode until the water level in the sump (bottom) of the container is at or below a low-water level switch. At that point, the PLC or other computing device reverts to operate the system in an "External Source" mode, and proceeds as described above.

In an embodiment, when ambient humidity reaches a predetermined maximum humidity, the PLC or computing device controls the system in a "Suspend" mode according to the following circumstances:

The pump(s) and air blower are shut off
The first 3-way valve diverts suction of the pump to a draw line connected to the sump (bottom) of the container.
The second 3-way valve diverts discharge of wastewater to the spray nozzles.

In an embodiment, when ambient humidity reaches a level below the predetermined maximum level, the PLC or computing device reverts to operate the system in the "External Source" mode, and proceeds as described above.

Second Alternative Embodiment

Figure 12A:
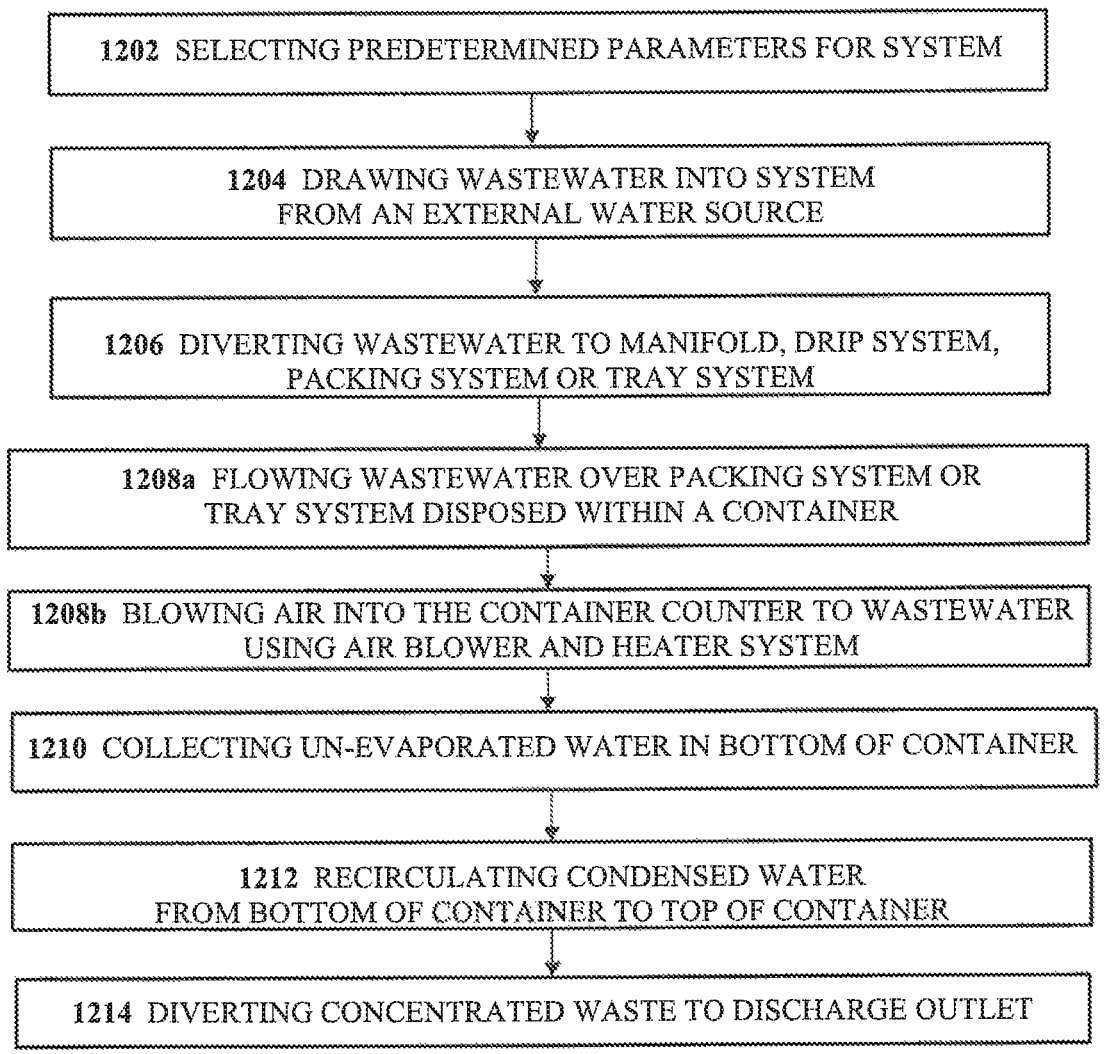
FIG. 12A illustrates a method of using an exemplary system for spray evaporation of water according to an embodiment of the present invention.
Figure 12B:
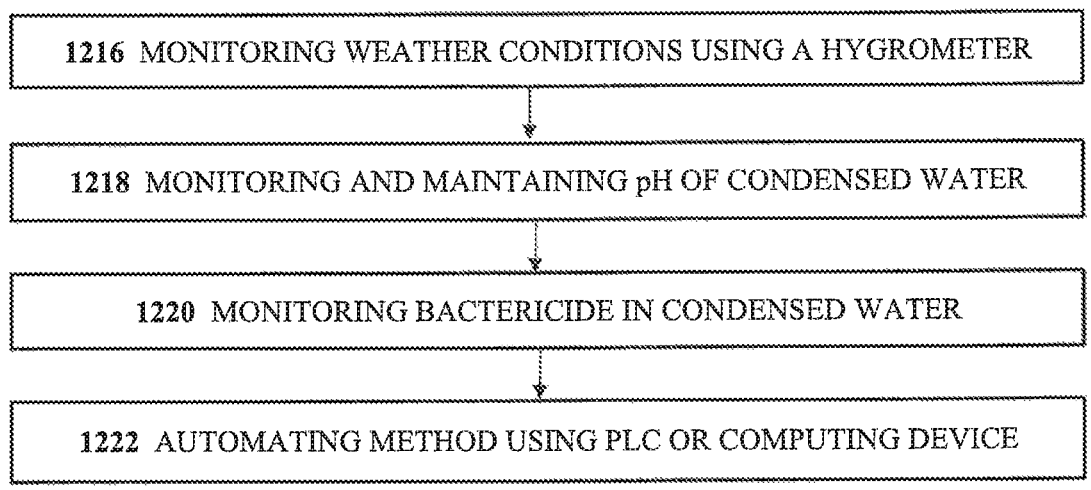
FIG. 12B illustrates additional, optional steps for the method of FIG. 12A.

A flow diagram for a method 1200 of using a second alternative system for spray evaporation of water is shown in FIGS. 12A-12B. In an embodiment, the method 1200 comprises selecting predetermined parameters (e.g., air flow rate, air heating rate, ambient temperature, discharge air temperature, maximum conductivity, maximum humidity, maximum pH, minimum air temperature, minimum pH, total suspended solids, volatile organic carbon (VOC), water flow rate at feed inlet, water flow rate at discharge outlet, water droplet size) for a system for spray evaporation of water, drawing wastewater into the system from an external water source using a pump, diverting the wastewater to a manifold, a drip system, a packing system or a tray system, flowing the wastewater or water droplets over the packing system or the tray system disposed within a container of the system, blowing air into the container counter to flow of the wastewater or the water droplets from the drip system using an air blower and heater system, collecting condensed water in the sump (bottom) of the container, recirculating condensed water from the bottom of the container to the top of the container using the pump, and diverting the concentrated waste to a waste outlet, as illustrated in FIGS. 12A-12B.

In an embodiment, the method 1200 comprises a step 1202 of selecting predetermined parameters (e.g., air flow rate, air heating rate, ambient temperature, discharge air temperature, maximum conductivity, maximum humidity, maximum pH, minimum air temperature, minimum pH, total suspended solids, volatile organic carbon (VOC), water flow rate at feed inlet, water flow rate at discharge outlet, water droplet size) for the system of spray evaporation of water. In an embodiment, the maximum conductivity may be about 1,000 micro μS/cm to about 400,000 μS/cm (and any range or value there between). In an embodiment, the air flow rate may be about 5,000 cubic feet per minute (CFM) to about 28,000 CFM (and any range or value there between). In an embodiment, the air flow rate may be about 5,400 CFM.

In an embodiment, the water flow rate may be about 15 gallons per minute (GPM) to about 100 GPM (and any range or value there between). In an embodiment, the water flow rate may be about 50 GPM at about 20 psi pressure.

In an embodiment, the method 1200 comprises a step 1204 of drawing wastewater into the system from an external water source using a pump. In an embodiment, a wastewater inlet permits connection to the external wastewater source. The water inlet may be connected to the external wastewater source via a hose, pipe or other means customary in the art.

In an embodiment, the method 1200 comprises a step 1206 of diverting inlet wastewater or condensed water to a manifold, a drip system, a packing system or a tray system using a 2-way valve and flowing the inlet wastewater or condensed water through the drip orifice to create wastewater rivulets and/or water droplets.

In an embodiment, the method 1200 comprises a step 1208*a* of flowing the wastewater and/or water droplets over a packing system and/or a tray system disposed within a container of the system, and a step 1208*b* of blowing air into the container of the system using an air blower and heater system. In an embodiment, air may be blown counter to the flowed water droplets to increase air contact and improve water evaporation.

In an embodiment, the method 1200 comprises a step 1210 of collecting condensed water in the sump (bottom) of the container. In an embodiment, un-evaporated water is condensed in a demister element of the system and condensed water is collected in the sump (bottom) of the container.

In an embodiment, the method 1200 comprises a step 1212 of recirculating the condensed water from the sump (bottom) of the container using the pump. In an embodiment, when the condensed water reaches a predetermined high-water level, the pump draws condensed water from the sump (bottom) of the container instead of drawing wastewater into the system from the external water source. In an embodiment, the pump will continue recirculating the condensed water until the condensed water in the sump (bottom) of the container reaches a predetermined low-water level or a predetermined maximum conductivity as measured by a conductivity meter. In an embodiment, the pump will draw wastewater into the system from the external water when the condensed water in the sump (bottom) of the container reaches the predetermined low-water level.

In an embodiment, the method 1200 comprises a step 1214 of diverting concentrated water to a waste outlet using a 2-way valve. In an embodiment, when the condensed wastewater reaches a predetermined maximum conductivity, a 2-way valve diverts the concentrated waste to the waste outlet. In an embodiment, a waste outlet permits connection to an external waste disposal storage (e.g., tank, truck, pond). (See e.g., FIGS. 10A & 10C). The waste outlet may be connected to the external waste disposal storage via a hose, pipe or other means customary in the art.

In an embodiment, the method 1200 may further comprise an optional step 1216 of monitoring weather conditions using a hygrometer. In an embodiment, when the weather conditions (e.g., barometric pressure, humidity, temperature) preclude water evaporation, the system is shut down, as discussed below.

In an embodiment, the method 1200 may further comprise an optional step 1218 of monitoring pH of the inlet wastewater or condensed water using a pH meter and adding acid solution to the inlet wastewater or condensed water to maintain the pH at about 6.5 or below to minimized calcium carbonate scaling. In an embodiment, the desired pH of the wastewater may be above 6.5 if a scale inhibitor is added to minimize carbonate and non-carbonate scaling.

The acid may be any suitable acid. Suitable acids include, but are not limited to, hydrochloric acid and sulfuric acid. In an embodiment, the acid may be hydrochloric acid (20 baume). In an embodiment, the acid may be sulfuric acid (98%). In an embodiment, the desired pH of the wastewater is about 6.5 or below to minimize calcium carbon scaling. In an embodiment, the amount of acid solution added to the wastewater varies, depending on inlet water conditions (e.g., pH, alkalinity).

In an embodiment, the method 1200 may further comprise an optional step 1220 of adding a predetermined amount of bactericide solution to the inlet wastewater or condensed water to minimize microbial growth.

The bactericide may be any suitable bactericide. Suitable bactericide includes, but is not limited to, bleach, bromine, chlorine dioxide (generated), 2,2-dibromo-3-nitrilo-propionade (DBNPA), glutaraldehyde, isothiazolin (1.5%) and ozone (generated). In an embodiment, the bactericide may be selected from the group consisting of bleach (12.5%), bromine, chlorine dioxide (generated), DBNPA (20%), glutaraldehyde (50%), isothiazolin (1.5%) and ozone (generated). In an embodiment, the desired bactericide concentration is from about 10 ppm to about 1000 ppm (and range or value there between). The amount of bactericide solution added to the wastewater varies, depending on inlet water conditions.

In an embodiment, the method 1200 may further comprise an optional step of 1222 of automating the method 1200 using a programmable logic controller (PLC) or computing device. In an embodiment, predetermined parameters (e.g., air flow rate, air heating rate, maximum conductivity, maximum humidity, maximum pH, minimum air temperature, minimum pH, water flow rate, water droplet size) are input into the PLC or computing device.

In an embodiment, when ambient humidity is below a predetermined maximum humidity, the PLC or computing device controls the system in an "External Source" mode according to the following circumstances:

A first (shut-off) valve and a first (feed) valve diverts suction of a pump to a water inlet.

A second (feed/recirculating) valve diverts discharge of wastewater to a drip orifice via the pump.

The pump and air blower are running.

The outlet of the drip orifice discharges water droplets and the air blower blows the water droplets and air into a container.

Any un-evaporated water droplets are retained by the pores of a demister element(s) and fall to the bottom of the container via gravity.

In an embodiment, the PLC or computing device will monitor pH of the inlet wastewater or condensed water via a pH meter and automatically add acid solution to the pump discharge using an acid metering pump in an acid conditioning system to maintain the pH at about 6.5 pH or below to minimize calcium carbonate scaling. In an embodiment, the PLC or computing device may add an amount of acid solution to the pump discharge using the acid metering pump and an acid flow meter.

In an embodiment, when condensed water in the sump (bottom) of the container reaches a predetermined high-water level, the PLC or computing device controls the system in a "Recirculation" mode:

The second (feed/recirculating) valve and the third (recirculating) valve divert discharge of condensed water to the drip orifice via the pump.

The pump and air blower continue to run.

The condensed water will be distributed by the drip orifice and blown by the air blower from the bottom to the top of the container according to the predetermined parameters (e.g., water droplet size, air flow rate).

Any un-evaporated water droplets are retained by the pores of the demister element(s) and fall to the sump (bottom) of the container via gravity.

The PLC or computing device continues to operate the system in a "Recirculation" mode until the condensed water level in the sump (bottom) of the container is at or below a low-water level switch or until the condensed water reaches a predetermined maximum conductivity.

In an embodiment, the PLC or computing device will monitor pH of the inlet wastewater or condensed water via a pH meter and automatically add an acid solution to the pump discharge using an acid metering pump in an acid conditioning system to maintain the pH at about 6.5 pH or below, if required, based on waste water quality.

In an embodiment, the PLC or computing device will monitor conductivity of the inlet wastewater or condensed water using a conductivity meter.

In an embodiment, when the condensed water reaches a predetermined maximum conductivity, the PLC or computing device controls the system in a "Waste Discharge" mode according to the following circumstances:

The pump, air blower and acid pump are shut off

The fourth (discharge) valve diverts discharge of the concentrated waste to a waste outlet.

Neither conductivity nor pH is being monitored.

The PLC or other computing device continues to operate the system in a "Waste Discharge" mode until the water level in the sump (bottom) of the container is at or below a low-water level switch. At that point, the PLC or other computing device reverts to operate the system in an "External Source" mode, and proceeds as described above.

In an embodiment, when ambient humidity reaches a predetermined maximum humidity, the PLC or computing device controls the system in a "Suspend" mode according to the following circumstances:

The pump and air blower are shut off.

The second (feed/recirculating) valve and the third (recirculating) valve divert discharge of condensed water to the drip orifice via the pump.

In an embodiment, when ambient humidity reaches a level below the predetermined maximum level, the PLC or computing device reverts to operate the system in the "External Source" mode, and proceeds as described above.

The embodiments set forth herein are presented to best explain the present invention and its practical application and to thereby enable those skilled in the art to make and utilize the invention. However, those skilled in the art will recognize that the foregoing description has been presented for the purpose of illustration and example only. The description as set forth is not intended to be exhaustive or to limit the invention to the precise form disclosed. Many modifications and variations are possible in light of the above teaching without departing from the spirit and scope of the following claims. The invention is specifically intended to be as broad as the claims below and their equivalents.

Definitions

As used herein, the terms "a," "an," "the," and "said" mean one or more, unless the context dictates otherwise.

As used herein, the term "about" means the stated value plus or minus a margin of error or plus or minus 10% if no method of measurement is indicated.

As used herein, the term "or" means "and/or" unless explicitly indicated to refer to alternatives only or if the alternatives are mutually exclusive.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided above.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the phrase "consisting of" is a closed transition term used to transition from a subject recited before the term to one or more material elements recited after the term, where the material element or elements listed after the transition term are the only material elements that make up the subject.

As used herein, the term "simultaneously" means occurring at the same time or about the same time, including concurrently.

Incorporation by Reference

All patents and patent applications, articles, reports, and other documents cited herein are fully incorporated by reference to the extent they are not inconsistent with this invention.

What is claimed is:

1. A wastewater evaporation system for spray evaporating water comprising:
  a. a wastewater feed inlet;
  b. a pump, wherein an outlet of the wastewater inlet is fluidly connected to an inlet of the pump and wherein an outlet of the pump is fluidly connected to an inlet of a manifold;
  c. a drip manifold comprising a drip orifice, wherein an outlet of the manifold is fluidly connected to an inlet of the drip manifold;
  d. a container, wherein a first portion of a ceiling of the container is constituted by a demister element such that the first portion of the ceiling is entirely configured as an outlet for evaporated water and wherein a second portion of the ceiling is adjacent to an upper edge of a wall of the container, and wherein the demister element is a crossflow cellular drift eliminator;

e. a packing system and/or a tray system disposed within the container, wherein the drip orifice discharges wastewater and/or water droplets onto the packing system and/or tray system;
f. a discharge outlet, wherein a bottom of the container is fluidly connected to the discharge outlet; and
g. an air system comprising an air blower and an air preheater;
wherein the air system is disposed through the wall of the container and wherein the air system discharges air flow counter to the wastewater and/or water droplets from the drip orifice, wherein the air blower produces an air flow rate from about 2,500 CFM to about 20,000 CFM; and
h. wherein the wastewater evaporation system is capable of evaporating between about 30 barrels and about 100 barrels of wastewater per day.

2. The system of claim 1, further comprising;
a. a first valve, wherein the wastewater feed inlet is fluidly connected to an inlet of the first valve and an outlet of the first valve is fluidly connected to the inlet of the pump;
b. a second valve, wherein the outlet of the pump is fluidly connected to an inlet of the second valve and wherein an outlet of the second valve is fluidly connected to the inlet of the manifold;
c. a third valve, wherein the bottom of the container is fluidly connected to an inlet of the third valve and wherein an outlet of the third valve is fluidly connected to the inlet of the pump;
d. a fourth valve, wherein the outlet of the pump is fluidly connected to an inlet of the fourth valve and wherein an outlet of the fourth valve is fluidly connected to the discharge outlet.

3. The system of claim 1, wherein the pump produces a water flow rate into the system from about 15 GPM to about 100 GPM.

4. The system of claim 1, wherein the demister element is from about 4-inches to about 12-inches thick.

5. The system of claim 1, wherein the demister element is about 10-inches thick.

6. The system of claim 1, wherein the packing system and/or tray system comprises random packing, structured packing, or combinations thereof.

7. The system of claim 1, wherein the packing system and/or tray system comprises a porous tray.

8. The system of claim 1, wherein the packing system comprises:
a. a porous tray; and
b. a packing, wherein the packing is disposed on the porous tray.

9. The system of claim 8, wherein the packing system comprises random packing, structured packing, or combinations thereof.

10. The system of claim 8, wherein the packing is a random packing, wherein the packing is made of ceramics, plastics, metals, or combinations thereof.

11. The system of claim 8, wherein the packing is a structured packing, wherein the packing is made of ceramics, plastics, metals, or combinations thereof.

12. The system of claim 8, wherein the packing is a containerized packing.

13. The system of claim 1, wherein the tray system comprises:
a. a first porous tray; and
b. a second porous tray, wherein the first porous tray discharges water droplets onto the second porous tray.

14. The system of claim 1, wherein the air preheater comprises a natural gas burner.

15. The system of claim 1, wherein the air preheater comprises a natural gas burner, wherein the natural gas burner is adapted to be moved relative to the packing system.

16. The system of claim 1, wherein the air preheater comprises a natural gas burner and a natural gas powered electric generator.

17. The system of claim 1, wherein the air preheater comprises a natural gas burner and a natural gas control valve and wherein the natural gas control valve is capable of providing fixed flow or modulated flow.

18. The system of claim 1, wherein air flow from the air blower disperses water droplets from the drip orifice.

19. The system of claim 1, wherein the air blower produces an air flow rate of about 3,500 CFM.

20. The system of claim 1, wherein an air flow inlet of the air preheater is fluidly connected to an air flow outlet of the air blower.

21. The system of claim 1, wherein the air preheater produces an air heating rate from about 0 million BTU per hour to about 5 million BTU per hour.

22. The system of claim 1, wherein the air preheater produces air temperatures from about 50° F. to about 400° F.

23. The system of claim 1, wherein the air system is disposed through the wall of the container upstream of the demister element.

24. The system of claim 1, wherein the air system is disposed through the wall of the container downstream of the demister element.

25. The system of claim 1, further comprising a deflector or a diffuser, wherein the deflector or diffuser is disposed within the container to redirect air flow in the container.

26. The system of claim 1, further comprising a vane, wherein the vane is disposed within the container to redirect the air flow in the container.

27. The system of claim 26, wherein the vane extends across a cross-section of the container.

28. The system of claim 1, further comprising a vane, wherein the vane is disposed in an air duct between an air discharge outlet of air system and an air inlet to the container.

29. The system of claim 1, further comprising a programmable logic controller (PLC) or other computing device, wherein the PLC or other computing device controls the air flow rate from the air blower.

30. The system of claim 1, further comprising an acid conditioning system, wherein the acid conditioning system adds an acid solution to the wastewater.

31. The system of claim 1, further comprising a bactericide conditioning system, wherein the bactericide conditioning system adds bactericide to the wastewater.

32. The system of claim 1, further comprising a scale inhibition conditioning system, wherein the scale inhibition conditioning system adds scale inhibitor to the wastewater.

33. The system of claim 1, further comprising a defoamer system, wherein the defoamer system adds defoamer to the wastewater.

34. The system of claim 1, further comprising a skid, wherein the wastewater evaporation system is mounted on the skid.

35. The system of claim 1, further comprising a skid mounted on or removably secured to a trailer or a truck, wherein the wastewater evaporation system is mounted on the skid.

36. The system of claim 1, further comprising a containment system, wherein the containment system comprises a skid surrounded by a liner and wherein the wastewater evaporation system is mounted on the skid.

37. The system of claim 36, further comprising a draw line, wherein an inlet of the draw line is disposed in the liner and an outlet of the draw line is fluidly connected to an inlet of the container.

38. The system of claim 36, further comprising a draw line, wherein an inlet of the draw line is disposed within the footprint of the liner and an outlet of the draw line is fluidly connected to the inlet of the pump.

39. The system of claim 1, further comprising insulation and/or heat tracing disposed around the pump.

40. The system of claim 2, further comprising insulation and/or heat tracing disposed around the pump, the first valve, the second valve, the third valve and the fourth valve.

41. The system of claim 1, further comprising a heated enclosure disposed around the pump, optionally a lower portion of the container, optionally an electric generator, and optionally a nitrogen purge system.

42. The system of claim 1, further comprising an air, argon or nitrogen purge system comprising an air, argon or nitrogen source, wherein an outlet of the air, argon or nitrogen purge system is fluidly connected to the inlet of the pump.

43. A method for spray evaporating water comprising:
  a. providing the wastewater evaporation system of claim 1;
  b. selecting predetermined parameters for the wastewater evaporation system for spray evaporating water;
  c. drawing wastewater into the wastewater evaporation system from an external water source using the pump;
  d. diverting wastewater to the drip orifice;
  e. flowing the wastewater through the drip orifice to create water droplets;
  f. flowing the water droplets onto the packing system and/or tray system disposed within the container of the wastewater evaporation system;
  g. blowing air into the container counter to the water droplets from the drip orifice using the air blower;
  h. collecting condensed wastewater in the bottom of the container;
  i. recycling the condensed wastewater from the bottom of the container, and
  j. diverting concentrated wastewater to the discharge outlet.

44. The method of claim 43, further comprising monitoring the conductivity of the condensed wastewater using a conductivity meter.

45. The method of claim 43, wherein the predetermined parameters comprise air flow rate and air heating rate.

46. The method of claim 43, further comprising monitoring an ambient air temperature using a temperature sensor, wherein the predetermined parameters further comprise a minimum air temperature.

47. The method of claim 46, wherein the system is shut down when the ambient air temperature reaches the minimum air temperature.

48. The method of claim 43, further comprising monitoring the pH of the condensed wastewater using a pH meter and adding acid solution to the condensed water to maintain the pH of the condensed wastewater at about 6.5 or below.

49. The method of claim 43, further comprising adding bactericide to the condensed water.

50. The method of claim 43, further comprising adding scale inhibitor to the condensed water.

51. The method of claim 43, further comprising adding defoamer to the condensed water.

52. The method of claim 49, further comprising monitoring the pH of the condensed water using a pH meter and adding acid solution to the condensed wastewater to maintain the pH of the condensed wastewater at about 6.5 or below.

53. The method of claim 43 further comprising using a programmable logic controller or other computing device to control the system.

54. The method of claim 43, wherein the system is capable of evaporating from about 30 to about 100 barrels of wastewater per day.

55. The method of claim 43, wherein the pump produces a water flow rate into the system from about 15 GPM to about 100 GPM.

56. The method of claim 43, wherein the demister element is about 4-inches to about 12-inches thick.

57. The method of claim 43, wherein the packing system and/or the tray system comprises pall rings, random packing or combinations thereof.

58. The method of claim 43, wherein the packing system and/or the tray system comprises a porous tray.

59. The method of claim 43, wherein the packing system comprises:
  a. a porous tray; and
  b. a packing, wherein the packing is disposed on the porous tray.

60. The method of claim 59, wherein the packing is selected from random packing, structured packing, and combinations thereof.

61. The method of claim 43, wherein the tray system comprises:
  a. a first porous tray; and
  b. a second porous tray, wherein the first porous tray discharges water droplets onto the second porous tray.

62. The method of claim 43, wherein the air blower produces an air flow rate from about 2,500 CFM to about 6,500 CFM.

63. The method of claim 43, wherein an air flow inlet of the air preheater is fluidly connected to an air flow outlet of the air blower.

64. The method of claim 43, wherein the air preheater produces an air heating rate from about 0 million BTU per hour to about 2.1 million BTU per hour.

65. The method of claim 43, wherein the air preheater produces air temperatures from about 50° F. to about 400° F.

66. The method of claim 43, further comprising pretreating the wastewater to reduce or remove volatile organic compounds upstream of a wastewater feed inlet of the wastewater evaporation system.

67. The method of claim 43, further comprising discharging the evaporated water through the evaporated water outlet.

68. The method of claim 67, further comprising collecting the evaporated water from the evaporated water outlet and condensing the evaporated water in a low pressure conduit.

69. The method of claim 67, further comprising heating the evaporated water upstream of the evaporated water outlet.

70. The method of claim 67, further comprising heating the evaporated water downstream of the evaporated water outlet.

71. A wastewater evaporation system for spray evaporating water comprising:
  a. a wastewater inlet;
  b. a pump, wherein an outlet of the wastewater inlet is fluidly connected to an inlet of the pump and wherein an outlet of the pump is fluidly connected to an inlet of a manifold;

c. a spray nozzle, wherein an outlet of the manifold is fluidly connected to an inlet of the spray nozzle;
d. a horizontal container, wherein a portion of a ceiling of the horizontal container is constituted by a demister element such that the portion of the ceiling is entirely configured as an outlet for evaporated water, wherein the demister element is a crossflow cellular drift eliminator and wherein the outlet of the spray nozzle discharges water droplets into the container;
e. a discharge outlet, wherein a bottom of the container is fluidly connected to the discharge outlet; and
f. an air system comprising an air blower and an air preheater, wherein the air system is disposed through the wall of the container and wherein the air system discharges air flow counter to the water droplets from the spray nozzle;
g. wherein the wastewater evaporation system is capable of evaporating between about 2,000 gallons and about 10,000 gallons of wastewater per day.

72. The system of claim 71, further comprising a tapered insert, wherein the tapered insert is disposed within the container to redirect the air flow from the wall of the container to the center region of the container.

73. The system of claim 71, further comprising a vane, wherein the vane is disposed within the container to redirect the air flow in the container.

74. The system of claim 73, wherein the vane extends across a cross-section of the container.

75. The system of claim 71, further comprising a deflector or a diffuser, wherein the defector or diffuser is disposed within the container to redirect air from a center region to a wall of the container.

76. The system of claim 71, wherein the pump produces a water flow rate into the system from about 15 GPM to about 100 GPM.

77. The system of claim 71, wherein the spray nozzle is selected from the group consisting of plain-orifice nozzles, shaped-orifice nozzles, surface impingement spray nozzles, spiral spray nozzles, and pressure swirl spray nozzles.

78. The system of claim 71, wherein the spray nozzle is a surface impingement spray nozzle.

79. The system of claim 71, wherein the spray nozzle produces water droplet sizes from about 50 μm to about 1,000 μm.

80. The system of claim 71, wherein the air blower produces an air flow rate from about 60,000 CFM to about 150,000 CFM.

81. The system of claim 80, further comprising a programmable logic controller (PLC) or other computing device, wherein the PLC or other computing device controls the air flow rate from the air blower.

82. A method for spray evaporating water comprising:
a. providing the wastewater evaporation system of claim 71;
b. selecting predetermined parameters for the wastewater evaporation system for spray evaporating water;
c. drawing wastewater into the system from an external water source using the pump;
d. diverting wastewater to the spray nozzle;
e. spraying the wastewater through the spray nozzle to create the water droplets;
f. dispersing the water droplets into the container of the system;
g. collecting condensed wastewater in the sump of the container;
h. recycling the condensed wastewater from the sump of the container, and
i. diverting concentrated wastewater to a discharge outlet.

83. The method of claim 82, further comprising monitoring the conductivity of the condensed wastewater using a conductivity meter.

84. The method of claim 82, wherein the predetermined parameters comprise air flow rate, air heating rate, and wastewater flow rate.

85. The method of claim 82, wherein the water flow rate into the system is from about 50 GPM to about 100 GPM, and wherein the water flow rate recycling in or discharging from the system is from about 500 GPM to about 800 GPM.

86. The method of claim 82, wherein the air flow rate is from about 60,000 CFM to about 150,000 CFM.

87. The method of claim 82, wherein the water droplet size is from 50 μm to about 1,000 μm.

88. The method of claim 82, further comprising monitoring an ambient air temperature using a temperature sensor, wherein the predetermined parameters further comprise a minimum air temperature.

89. The method of claim 88, wherein the system is shut down when the ambient air temperature reaches the minimum air temperature.

90. The system of claim 82, further comprising using a programmable logic controller or other computing device to control the system.

91. A wastewater evaporation system for spray evaporating water comprising:
a. a wastewater inlet comprising wastewater;
b. a first valve, wherein an outlet of the wastewater inlet is fluidly connected to an inlet of the first valve;
c. a first pump, wherein an outlet of the first valve is fluidly connected to an inlet of the first pump;
d. a horizontal container, wherein a portion of a ceiling of the horizontal container is constituted by a demister element such that the portion of the ceiling is entirely configured as an outlet for evaporated water, wherein the demister element is a crossflow cellular drift eliminator;
e. a spray nozzle, wherein an outlet of the first pump is fluidly connected to a first inlet of a manifold, wherein an outlet of the manifold is fluidly connected to an inlet of the spray nozzle, and wherein an outlet of the spray nozzle discharges water droplets into the container;
f. an air system comprising an air blower and an air heater, wherein the air system is disposed through the wall of the container and wherein the air system discharges air flow counter to the water droplets from the spray nozzle;
g. a second pump, wherein an outlet of a sump is fluidly connected to an inlet of the second pump;
h. a second valve; wherein an outlet of the second pump is fluidly connected to an inlet of the second valve and wherein an outlet of the second valve is fluidly connected to a second inlet of the manifold; and
i. a third valve, wherein a second outlet of the manifold is fluidly connected to an inlet of the third valve and wherein an outlet of the third valve is fluidly connected to a discharge outlet.

92. The system of claim 91, wherein the first pump produces a water flow rate into the system from about 50 GPM to about 100 GPM, and wherein the second pump produces a water flow rate from about 500 GPM to about 800 GPM.

93. The system of claim 91, wherein the spray nozzle is selected from the group consisting of plain-orifice nozzles, shaped-orifice nozzles, surface impingement spray nozzles, spiral spray nozzles, and pressure swirl spray nozzles.

94. The system of claim 91, wherein the spray nozzle is a spiral spray nozzle, wherein the spiral spray nozzle is capable of from about 50 GPM to about 70 GPM.

95. The system of claim 91, wherein the spray nozzle produces water droplet sizes from about 50 µm to about 1,000 µm.

96. The system of claim 91, wherein the air blower produces an air flow rate from about 60,000 CFM to about 150,000 CFM.

97. The system of claim 96, further comprising a programmable logic controller (PLC) or other computing device, wherein the PLC or other computing device controls the air flow rate from the air blower.

98. A method for spray evaporating water comprising:
   a. providing the wastewater evaporation system of claim 91;
   b. selecting predetermined parameters for the wastewater evaporation system for spray evaporating water;
   c. drawing wastewater into the system from an external water source using the pump;
   d. diverting wastewater to the spray nozzle;
   e. spraying the wastewater through the spray nozzle to create water droplets;
   f. dispersing the water droplets into the container of the system;
   g. collecting condensed wastewater in the sump of the container;
   h. recycling the condensed wastewater from the sump of the container; and
   i. diverting concentrated wastewater to a discharge outlet.

\* \* \* \* \*